United States Patent
Kim et al.

(10) Patent No.: US 10,665,355 B2
(45) Date of Patent: May 26, 2020

(54) NUCLEAR POWER PLANT

(71) Applicant: KOREA ATOMIC ENERGY RESEARCH INSTITUTE, Daejeon (KR)

(72) Inventors: Young In Kim, Daejeon (KR); Suhn Choi, Daejeon (KR); Keung Koo Kim, Daejeon (KR); Young Min Bae, Daejeon (KR); Hun Sik Han, Seoul (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 366 days.

(21) Appl. No.: 15/513,278

(22) PCT Filed: Sep. 9, 2015

(86) PCT No.: PCT/KR2015/009498
§ 371 (c)(1),
(2) Date: Mar. 22, 2017

(87) PCT Pub. No.: WO2016/047937
PCT Pub. Date: Mar. 31, 2016

(65) Prior Publication Data
US 2018/0233240 A1    Aug. 16, 2018

(30) Foreign Application Priority Data

Sep. 22, 2014  (KR) .......................... 10-2014-0126073

(51) Int. Cl.
*G21C 9/00*   (2006.01)
*G21C 15/18*   (2006.01)
(Continued)

(52) U.S. Cl.
CPC ........... *G21C 15/182* (2013.01); *G21C 1/326* (2013.01); *G21C 9/012* (2013.01); *G21C 15/02* (2013.01);
(Continued)

(58) Field of Classification Search
CPC ........ G21C 1/32; G21C 15/02; G21C 15/182; G21C 15/185; G21C 15/243; G21D 3/04
See application file for complete search history.

(56) References Cited

U.S. PATENT DOCUMENTS 4,665,975 A    5/1987   Johnston
2013/0044851 A1    2/2013   Winters et al.

FOREIGN PATENT DOCUMENTS

JP    2977234 B2    11/1999
KR    20090105540 A    10/2009
(Continued)

OTHER PUBLICATIONS

International Search Report dated Dec. 18, 2015 issued in PCT/KR2015/009498.

*Primary Examiner* — Marshall P O'Connor
(74) *Attorney, Agent, or Firm* — Scully, Scott, Murphy & Presser, P.C.

(57) ABSTRACT

Disclosed is a nuclear power plant which drives a Stirling engine by means of heat generated in nuclear power plant safety systems during an accident, uses the resulting power directly or generates electric power so as to supply the power to the safety systems, and thus can improve economic efficiency as well as the reliability of safety systems, such as a passive safety system, by operating the safety systems without an emergency diesel generator or external electric power.

30 Claims, 20 Drawing Sheets

(51) Int. Cl.
  *G21C 1/32*       (2006.01)
  *G21C 15/26*      (2006.01)
  *G21C 9/012*      (2006.01)
  *G21D 1/02*       (2006.01)
  *G21D 1/04*       (2006.01)
  *G21C 15/02*      (2006.01)
  *G21C 15/243*     (2006.01)
  *G21D 3/04*       (2006.01)
  *F02G 1/043*      (2006.01)

(52) U.S. Cl.
  CPC ........... *G21C 15/243* (2013.01); *G21C 15/26* (2013.01); *G21D 1/02* (2013.01); *G21D 1/04* (2013.01); *G21D 3/04* (2013.01); *F02G 1/043* (2013.01); *G21C 1/32* (2013.01); *G21C 15/185* (2019.01); *Y02E 30/40* (2013.01)

(56) References Cited

FOREIGN PATENT DOCUMENTS

| KR | 20140009835 A | 1/2014 |
| KR | 20140054266 A | 5/2014 |
| WO | WO 2013035921 A1 | 3/2013 |

NUCLEAR POWER PLANT

CROSS-REFERENCE TO RELATED APPLICATIONS

This application is the National Stage filing under 35 U.S.C. 371 of International Application No. PCT/KR2015/009498, filed on Sep. 9, 2015, which claims the benefit of earlier filing date and right of priority to Korean Application No. 10-2014-0126073, filed on Sep. 22, 2014, the contents of which are all hereby incorporated by reference herein in their entirety.

BACKGROUND OF THE INVENTION

1. Field of the Invention

The present invention relates to a nuclear power plant, and more particularly, to a nuclear power plant capable of recycling heat to be removed from a nuclear safety system at the time of an accident into the operation of the nuclear safety system.

2. Description of the Related Art

Nuclear power plants produce electricity using heat generated by a reactor. A typical nuclear reaction occurring in a reactor is nuclear fission by uranium (U)-235 (atomic number 92, mass number 235). When neutrons collide with U-235 and are absorbed therein, a nucleus becomes unstable and is split into two small nuclei (fission fragments), and during this process, about 2.5 neutrons and about 200 MeV ($3.2 \times 10^{-11}$ J) of energy are emitted.

The characteristics of the reactor will be described as follows from the viewpoint of safety.

First, a large amount of radioactive materials (fission products) are accumulated in a fuel rod as the reactor is operated.

Second, when the reactor is not properly cooled, barriers blocking radioactive materials from an outside may be damaged to leak the radioactive materials to the outside.

Third, even when the reactor is shut down, the fission products emit radiation and energy (decay heat) is generated at a fairly high level, requiring continuous cooling for a significant period of time.

As described from the viewpoint of safety on the characteristics of the reactor, nuclear reactors generate a large amount of radioactive materials inside the nuclear reactor, and thus it is very important to ensure the safety of the reactor in terms of nuclear power development and utilization.

Therefore, nuclear power plants have safety systems such as the purpose of preventing accidents in advance and the purpose of minimizing accidents even if accidents occur.

On the other hand, up to this day, a large-sized light water reactor route in which an active safety function is mainly employed, such as an emergency core cooling system (ECCS), has been established based on the concept of multi-barriers protection design.

However, due to strengthening safety regulations caused by the occurrence of accidents (TMI-2 power plant accident in 1979, Chernobyl-4 power plant accident in 1986, and Fukushima nuclear power plant accident in 2011), environmental pollution (acid rain, greenhouse effect, etc.), and a low growth rate of electric power demand caused by stagnation of economic growth in developed countries, there is a growing interest in nuclear reactors with high safety and easy operation and maintenance aiming at diversification of applications, pioneering of demand, and the like.

In particular, in the wake of the Chernobyl-4 power plant accident in 1986, the concept of an innovative small and medium-sized nuclear reactor, which emphasizes some "passive safeties," has been proposed.

Passive safety refers to a feature having safety functions based on simple physical principles such as natural circulation of liquid or natural convection ventilation of atmosphere, evaporation of water, thermal expansion or gravity drop of materials, thermal radiation of materials, accumulated energy, and the like.

Passive safety systems to which such passive safeties are applied have been developed.

The passive safety system may include a passive residual heat removal system, a passive containment cooling system, and the like.

In the nuclear industry field, the passive residual heat removal system is a system for removing heat in a reactor coolant system (sensible heat in a reactor coolant system and residual heat in a core) to an outside of the containment by a fluid circulation method or the like when an accident occurs in various nuclear power plants.

The fluid circulation system of the passive residual heat removal system generally uses natural circulation due to a difference between densities of steam and water, and two types are mainly used, such as a system of directly circulating primary cooling water in a reactor coolant system to cool the reactor (AP1000: Westinghouse, USA), and a system of circulating secondary cooling water using a steam generator to indirectly cool the reactor (SMART reactor: Korea), and a system of injecting primary cooling water into a tank to perform direct condensation (CAREM: Argentina) is partially used.

In addition, the passive containment cooling system is a system of condensing internal steam in the containment and cooling atmosphere to maintain the integrity of the containment when coolant or steam is discharged due to a loss of coolant accident or break accident to increase a pressure inside the containment in various reactors.

As a system used for the purpose similar to the passive containment cooling system, a system of using a suppression tank (Commercial BWR, CAREM: Argentina, IRIS: Westinghouse, USA etc.), a system of applying a steel containment and cooling (spray, air) an outer wall (AP1000: Westinghouse, USA), a system of using a heat exchanger (SW1000; France Pramatom ANP, AHWR: India, SBWR: GE, USA) and the like are used.

However, in the existing passive safety system, heat removed to an outside of the containment is discarded to an external environment of the containment, and thus efforts to recycle such waste heat are required.

In addition, the passive safety system is very excellent in terms of safety because it is driven by natural power even when there is no emergency AC power or external power supply, but configuration options for designing the safety system are very limited, and a driving force of the system is typically very low, and thus there is a disadvantage of a high probability of reducing economic efficiency.

Furthermore, in case of a heat exchanger in a passive safety system, for example, a circulating flow of fluid inside or outside the heat exchanger depends on natural circulation mainly caused by a density difference, and thus there is a problem of reducing heat exchange performance.

In addition, according to a heat exchanger in a passive safety system, heat transfer is carried out between two fluids, and for example, when the types of two fluids are different, such as water or air, or the flow conditions of the two fluids are different, a size of the heat exchanger is determined by a fluid with a low heat transfer coefficient, and thus there is a problem of increasing the size of the heat exchanger.

SUMMARY OF THE INVENTION

Accordingly, an object of the present disclosure is to provide a nuclear power plant capable of generating power using heat removed to an outside of the containment at the time of an accident, and recycling the generated power for the operation of a nuclear power plant safety system as a Stirling engine is applied to a passive safety system.

Another object of the present disclosure is to provide a nuclear power plant capable of supplying power obtained by the generation of power obtained from a Stirling engine as a power source for a circulation fan and a circulation pump, thereby providing circulation power to a circulating fluid without supplying an external power source such as a small-scale charger or the like.

Furthermore, still another object of the present disclosure is to provide a nuclear power plant having a wide variety of configuration options for designing a passive safety system and capable of enhancing a driving force and heat exchange performance of the system.

In addition, yet still object of the present disclosure is to provide a nuclear reactor capable of reducing a size of a heat exchanger to enhance economic efficiency.

In order to accomplish an object of the present disclosure, a nuclear power plant according to the present disclosure may include a nuclear safety system configured to remove at least one of heat in a reactor coolant system and heat transferred from the reactor coolant system to a containment to an outside of the containment when an accident occurs in the nuclear power plant; a power generator provided with a heat exchange unit to receive heat removed to an outside of the containment, and provided with a cylinder to generate power by heat received through the heat exchange unit; and a heat transfer portion configured to provide a flow path of heat transfer fluid between the reactor coolant system and the power generator or between the containment and the power generator to transfer the heat removed to an outside of the containment to the power generator.

According to an example associated with the present disclosure, the nuclear safety system may include a passive safety system configured to remove heat in the reactor coolant system or heat transferred from the reactor coolant system to the containment by fluid circulation, and the passive safety system may include at least one of an air-cooling and a water-cooling heat exchanger.

According to an example associated with the present disclosure, the heat exchanger may be a plate type or shell-and-tube type heat exchanger.

According to an example associated with the present disclosure, the fluid may be at least one of air, cooling water, steam, and a mixed fluid obtained by mixing air with steam or steam with cooling water.

According to an example associated with the present disclosure, the power generator may include a high-temperature section and a low-temperature section filled therein with working gases, respectively, and formed as separate independent spaces in two cylinders, respectively, or formed as spaces partitioned from each other within one cylinder; a plurality of pistons movably provided within the two cylinders, respectively, or movably provided within the one cylinder in an independent manner from each other; a working flow path connecting the high-temperature section and the low-temperature section to allow the working gases filled in the high-temperature section and the low-temperature section to communicate with each other; a rotating portion configured to receive the power of the piston to rotate; and a connection member connecting the piston and the rotating portion to transfer the power of the piston to the rotating portion so as to generate mechanical kinetic energy due to a rotational movement.

According to an example associated with the present disclosure, the power generator may further include a regenerative heat exchanger provided on the working flow path to store the heat of the working gas when the working gas moves from the high-temperature section to the low-temperature section, and transfer the stored heat to the working gas when the working gas returns from the low-temperature section to the high-temperature section.

According to an example associated with the present disclosure, the power generator may further include a generator connected to the rotating portion to convert the mechanical kinetic energy into electric energy.

According to an example associated with the present disclosure, the power generator may further include a charger configured to charge the electric energy converted by the generator.

According to an example associated with the present disclosure, the power generator may be initially driven by electric energy stored in the charger.

According to an example associated with the present disclosure, the power generator may be provided with a Stirling engine.

According to an example associated with the present disclosure, the nuclear safety system may include a passive residual heat removal system configured to operate according to an accident occurrence related signal to remove heat in the reactor coolant system by fluid circulation, and the passive residual heat removal system may include a heat exchanger disposed at an outside of the containment to receive steam from a steam generator forming a boundary between a primary system and a secondary system so as to cool and condense the steam, and transfer the condensed cooling water to the steam generator; a heat exchange casing disposed at an outside of the containment to accommodate the heat exchanger therein so as to guide the external atmosphere of the containment to pass through the heat exchanger; and a circulation fan provided within the heat exchange casing to provide forced flow of the external atmosphere so as to introduce the external atmosphere of the containment into the heat exchange casing, and the power generator is disposed at an inside or outside of the heat exchange casing and provided with a power transmission portion to directly drive the circulation fan or provided with a generator to generate the electric powerelectric power to drive the circulation fan by the electric energy.

According to an example associated with the present disclosure, the passive residual heat removal system may include a steam pipe connecting the steam generator and the heat exchanger to transfer steam generated from the steam generator to the heat exchanger, and the steam pipe may pass through a heat exchange unit of the power generator to transfer the heat of steam from the steam generator to the power generator, and the power generator may receive the heat of steam flowing through the steam pipe to generate power.

According to an example associated with the present disclosure, the power generator may be provided at an inlet side of the heat exchanger, and the circulation fan may be disposed between the power generator and the heat exchanger.

According to an example associated with the present disclosure, the passive residual heat removal system may include a feedwater line connecting the heat exchanger and the steam generator to transfer cooling water condensed in the heat exchanger to the steam generator, and the feedwater line may pass through a heat exchange unit of the power generator to transfer the heat of the condensed cooling water from the heat exchanger to the power generator, and the power generator may receive heat of cooling water flowing through the feedwater line to generate power.

According to an example associated with the present disclosure, the nuclear safety system may include a passive residual heat removal system configured to operate according to an accident occurrence related signal to remove heat in the reactor coolant system, and the passive residual heat removal system may include an emergency cooling water storage section disposed at an outside of the containment; a heat exchanger provided within the emergency cooling water storage section to receive steam from a steam generator forming a boundary between a primary system and a secondary system to cool and condense the steam by emergency cooling water stored in the emergency cooling water storage section, and transfer the condensed cooling water to the steam generator; and a circulation pump provided on a feedwater line to transfer the cooling water condensed in the heat exchanger to the steam generator, and provide forced flow of the cooling water, and the power generator may be disposed at an outside or inside of the emergency cooling water storage section, and provided with a power generator to generate the electric power so as to drive the circulation pump by the electric energy.

According to an example associated with the present disclosure, the heat transfer portion may include a steam pipe connecting the steam generator, the heat exchange unit of the power generator, and the heat exchanger to transfer steam generated in the steam generator to the heat exchanger through the power generator, and the power generator may receive the heat of steam through the steam pipe to generate power.

According to an example associated with the present disclosure, the emergency cooling water storage section may be provided with an emergency cooling water heat exchange unit for connecting with the heat exchange unit of the power generator in a heat exchangeable manner to transfer the heat of steam generated in the emergency cooling water storage section to the power generator.

According to an example associated with the present disclosure, the heat transfer portion may include a first connection pipe, one end portion of which is connected to the steam generator, and the other end portion of which is extended to an inside of the containment to introduce steam from the steam generator thereinto; and a second connection pipe communicated with an inside of the containment, one end portion of which is disposed adjacent to the first connection pipe to introduce the internal atmosphere of the containment along with steam discharged from the first connection pipe, and the other end portion of which is connected to the power generator to transfer a mixed fluid obtained by mixing the steam with the internal atmosphere of the containment to the power generator, and the passive residual heat removal system may be provided with a circulation induction unit configured to induce the internal atmosphere circulation of the containment, and the circulation induction unit may include a jet nozzle formed at the other end portion of the first connection pipe to jet the steam into the second connection pipe so as to introduce the internal atmosphere of the containment into the second connection pipe by a jet speed of the steam; and an inlet guide formed at one end portion of the second connection pipe to gradually increase an inflow cross-sectional area of the internal atmosphere of the containment toward an inside of the containment so as to guide the inflow of the internal atmosphere of the containment.

According to an example associated with the present disclosure, the nuclear safety system may include a passive containment cooling system configured to operate according to an accident occurrence related signal to remove heat transferred from the reactor coolant system to an inside of the containment by fluid circulation to an outside of the containment, and the passive containment cooling system may include a heat exchanger disposed at an inside or outside of the containment to be positioned higher than the reactor so as to condense steam discharged from the steam line to an inside of the containment and cool the internal atmosphere of the containment when a loss of coolant accident or a steam line break accident occurs in the reactor; and an emergency cooling water storage section disposed at an outside of the containment to be positioned higher than the heat exchanger so as to cool and condense the internal atmosphere of the containment transferred from the heat exchanger by emergency cooling water stored therein, and supply the emergency cooling water to the heat exchanger, and the emergency cooling water storage section may be provided with an emergency cooling water heat exchange unit on which the power generator is mounted to exchange heat at an upper end portion thereof, and the power generator may receive the heat of the emergency cooling water or the heat of steam evaporated in the emergency cooling water through the emergency cooling water heat exchange unit to generate power.

According to an example associated with the present disclosure, the passive containment cooling system may further include a circulation fan provided at an inlet header formed at an upper end portion of the heat exchanger to provide forced flow of the internal atmosphere so as to introduce the internal atmosphere of the containment into the heat exchanger, and the power generator may be provided with a power transmission portion to directly drive the circulation fan or provided with a generator to generate the electric power so as to drive the circulation fan by the electric energy.

According to an example associated with the present disclosure, the passive containment cooling system may include a supply pipe connecting the emergency cooling water storage section and the heat exchanger to transfer the emergency cooling water to the heat exchanger; and a circulation pump provided on the supply pipe to provide forced flow of the emergency cooling water, and the power generator may be provided with a power transmission portion to directly drive the circulation pump or provided with a generator to generate the electric power so as to drive the circulation pump by the electric energy.

According to an example associated with the present disclosure, the passive containment cooling system may further include a first containment connection pipe, one end portion of which is communicated with an inside of the containment and the other end portion of which is connected to a heat exchanger to transfer the internal atmosphere of the containment to the heat exchanger disposed at an outside of the containment; a second containment connection pipe, one end portion of which is connected to the heat exchanger and the other end portion of which is communicated with an inside of the containment to transfer non-condensable gas or condensed cooling water generated in the heat exchanger to an inside of the containment; and a circulation fan provided at one end portion of the first containment connection pipe to provide forced flow of the internal atmosphere of the containment to the first containment connection pipe, and the power generator may be provided with a power transmission portion to directly drive the circulation fan or provided with a generator to generate the electric power so as to drive the circulation fan by the electric energy.

According to an example associated with the present disclosure, the nuclear safety system may include a passive containment cooling system configured to operate according to an accident occurrence related signal to remove heat transferred from the reactor coolant system by fluid circulation to an outside of the containment, and the passive containment cooling system may include a heat exchanger disposed at an outside of the containment to be positioned higher than the reactor so as to condense steam discharged from the steam line to an inside of the containment and cool the internal atmosphere of the containment when a loss of coolant accident or a steam line break accident occurs in the reactor; a heat exchange casing disposed at an outside of the containment to accommodate the heat exchanger therein to guide the external atmosphere of the containment to pass through the heat exchanger; a first containment connection pipe, one end portion of which is communicated with an inside of the containment and the other end portion of which is connected to the heat exchanger to transfer the internal atmosphere of the containment to the heat exchanger; and a circulation fan provided at one end portion of the first containment connection pipe to provide forced flow of the internal atmosphere of the containment to an inside of the first containment connection pipe, and the first containment connecting pipe may pass through a heat exchange unit of the power generator to transfer the heat of steam transferred to an inside of the containment to the power generator disposed at an outside of the containment, and the power generator may be disposed at an inside of the heat exchange casing and provided with a power transmission portion to directly drive the circulation fan or provided with a generator to generate the electric power to drive the circulation fan by the electric energy.

According to an example associated with the present disclosure, the nuclear safety system may include a passive containment cooling system configured to operate according to an accident occurrence related signal to remove heat transferred from the reactor coolant system by fluid circulation to an outside of the containment, and the passive containment cooling system may include a heat exchanger disposed at an inside of the containment to be positioned higher than the reactor so as to condense steam discharged from the steam line to an inside of the containment and cool the internal atmosphere of the containment when a loss of coolant accident or a steam line break accident occurs in the reactor; a heat exchange casing disposed at an outside of the containment to guide the external atmosphere of the containment to pass through an inside thereof; a first external atmosphere connection pipe, one end portion of which is communicated with an outside of the containment and the other end portion of which is connected to the heat exchanger to supply the external atmosphere of the containment to the heat exchanger; and a second external atmosphere connection pipe connecting the heat exchanger and the heat exchange casing to discharge steam generated in the heat exchanger to the heat exchange casing; and a circulation fan provided on the first external atmosphere connection pipe or at an inside of the heat exchange casing to provide forced flow of the external atmosphere of the containment to an inside of the heat exchanger or the heat exchange casing, and the second external atmosphere connection pipe passes through a heat exchange unit of the power generator to transfer the heat of steam transferred from the heat exchanger to the heat exchange casing to the power generator, and the power generator is disposed at an inside or outside of the heat exchange casing and provided with a power transmission portion to directly drive the circulation fan or provided with a generator to generate the electric power to drive the circulation fan by the electric energy.

According to an example associated with the present disclosure, the passive containment cooling system may further include an emergency cooling water storage section disposed at an outside of the containment to be positioned higher than the heat exchanger so as to supply emergency cooling water stored therein to the heat exchanger, and the heat exchanger may be cooled in a water-cooling manner, and then cooled in an air-cooling manner when an accident occurs.

According to an example associated with the present disclosure, the nuclear safety system may include a passive safety injection system configured to inject safety injection water by gravity when a pressure within the reactor coolant system and the containment reaches a pseudo-equilibrium state after an accident, and the passive safety injection system may include a first cooling water storage section disposed at an inside of the containment; a second cooling water storage section provided at an inside of the containment to be positioned lower than the first cooling water storage section so as to store cooling water therein; a cooling water connection pipe connecting the heat exchanger and the first cooling water storage section to transfer cooling water condensed in the heat exchanger to the first cooling water storage section; a cooling water injection pipe connecting the first cooling water storage section and the reactor to inject safety injection water stored in the first cooling water storage section into an inside of the reactor; a cooling water makeup pipe connecting the first and second cooling water storage sections to replenish cooling water stored in the second cooling water storage section to the first cooling water storage section; and a safety injection water makeup pump provided on the cooling water makeup pipe to forcibly circulate cooling water for the makeup of safety injection water, and the power generator may be provided with a generator to generate the electric power to drive the safety injection water makeup pump by the electric energy.

According to an example associated with the present disclosure, the nuclear safety system may include a passive containment spray system provided with a distribution pipe formed with a plurality of spray nozzles spaced apart from each other to spray water into the internal atmosphere of the containment by gravity from the spray nozzles so as to reduce an internal pressure of the containment when an accident increasing internal pressure of the containment occurs, and the passive containment spray system may include a second cooling water storage section provided on a bottom surface of the containment; a spray storage portion disposed at an upper portion of the containment; a spray makeup pipe connecting the second cooling water storage section and the spray storage portion to replenish cooling water stored in the second cooling water storage section to the spray storage portion; and a spray makeup pump provided on the spray makeup pipe to provide forced flow of spray makeup cooling water, and the power generator may be provided with a generator to generate the electric power so as to drive the spray makeup pump by the electric energy.

According to an example associated with the present disclosure, the passive safety system may include a second cooling water storage section provided at an outside of a bottom surface of the containment; an emergency cooling water storage section disposed at an outside of the containment to be positioned higher than the heat exchanger; an emergency cooling water makeup pipe connecting the second cooling water storage section and the emergency cooling water storage section to replenish cooling water stored in the second cooling water storage section to the emergency cooling water storage section; and an emergency cooling water makeup pump provided on the emergency cooling water makeup pipe to provide forced flow of cooling water for emergency cooling water makeup, and the power generator may be provided with a power generator to generate the electric power so as to drive the emergency cooling water makeup pump by the electric energy.

A nuclear power plant according to an example associated with the present disclosure may further include a charger configured to charge electricity generated from the generator.

According to an example associated with the present disclosure, electric energy charged to the charger may be supplied to an emergency power system or an emergency charger to replenish the power of the emergency power system or the emergency charger.

According to an example associated with the present disclosure, the emergency power system or the emergency charger may be used as a power source for operating the nuclear safety system or switching a valve for the operation of the nuclear safety system or monitoring the nuclear safety system.

According to the present disclosure configured as described above, during the process of discharging at least one of heat in a reactor coolant system and heat transferred from the reactor coolant system to the containment to an outside of the containment in the event of an accident, part thereof may be collected, and reused for the operation of a nuclear safety system by incorporating a Stirling engine or the like into the nuclear safety system.

In addition, it may be possible to obtain various advantages through a combination of a nuclear safety system and a Stirling engine or the like.

First, heat removed by the passive safety system may by supplied to a power generator such as a Stirling engine or the like to drive the engine, and electric power is produced through power generated by driving the engine or power generation thereof to operate the safety system without an emergency diesel generator or external power, thereby further enhancing the reliability of the safety system.

Second, the power of an engine may be directly used to drive a fan or a pump, or electric power produced by power generation may be used as a power source for a fan or a pump to provide forced flow of a fluid so as to increase the efficiency and performance of a heat exchanger in a passive safety system that removes heat by a fluid circulation method, and configure the heat exchanger in a compact size, thereby enhancing economic efficiency.

Third, electric power produced by the power or an engine or power generation may be used to replenish a passive safety injection system, replenish spray water in a passive containment spray system, and replenish emergency cooling water in a passive residual heat removal system, thereby greatly contributing to safety enhancement in a passive safety system.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
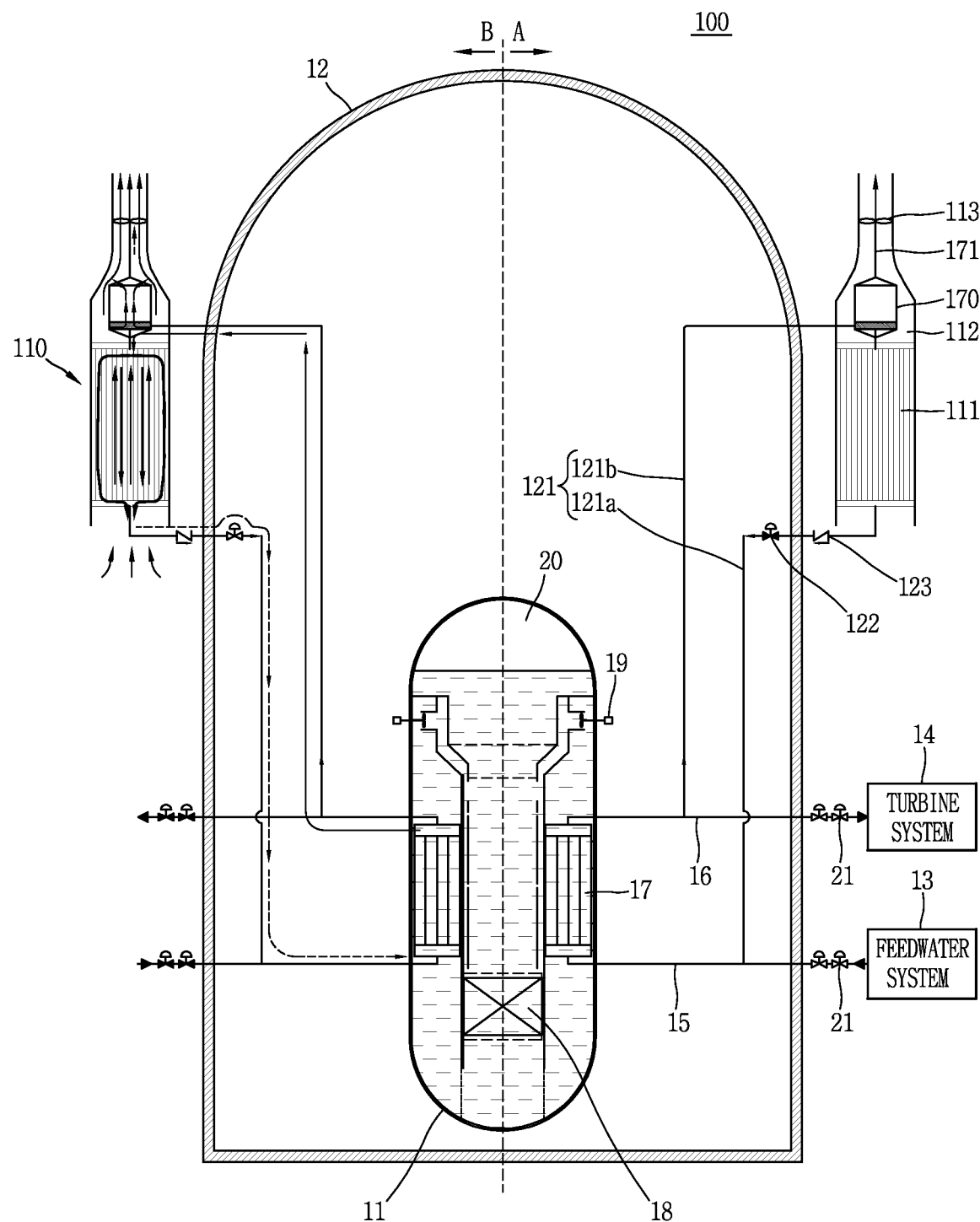
FIG. 1 is a conceptual view illustrating a passive residual heat removal system to which a Stirling engine associated with a first embodiment of the present disclosure is applied, and a nuclear power plant having the same.

Hereinafter, a nuclear power plant associated with the present disclosure will be described in more detail with reference to the accompanying drawings. Even in different embodiments according to the present disclosure, the same or similar reference numerals are designated to the same or similar configurations, and the description thereof will be substituted by the earlier description. Unless clearly used otherwise, expressions in the singular number used in the present disclosure may include a plural meaning.

A brief description of terms disclosed herein will be summarized in connection with the present disclosure.

1. Glossary of Terms

In connection with the present disclosure, "reactor" is divided into an active reactor using an active force such as a pump and a passive reactor using a passive force such as gravity or a gas pressure according to a configuration method of a safety system. On the other hand, the "reactor" is divided into a separate type reactor (e.g., Korean pressurized water reactor) in which main devices such as a steam generator, a pressurizer, and a pump impeller are provided at an outside of the reactor, and an integral type reactor (for example, Korean pressurized water reactor) (e.g., SMART reactor) in which main devices are installed inside the reactor vessel according to the installation position of the main devices.

Furthermore, in general, a containment structure for protecting an outside of the reactor vessel (or a reactor coolant system of the separate type reactor) is referred to as a containment building (or reactor building) when manufactured and constructed using reinforced concrete, and referred to as a containment vessel (safeguard vessel in case of a small size) when manufactured and constructed using steel. According to the present disclosure, a containment building, a reactor building, a containment vessel, the safeguard vessel, or the like are generally referred to as a "containment."

A heat exchanger used in a passive safety system in the related art in connection with the present disclosure is mainly a shell-and-tube type heat exchanger or a condenser (SBWR: U.S. GE Company, etc.), and depends on natural circulation.

For a method of cooling an outside of a heat exchanger (condensation heat exchanger) in a passive safety system in the related art in connection with the present disclosure, a water-cooled method (U.S. AP1000), a partially-air-cooled method (Russian WWER1000), and a water-air-combined-cooled method (IMR: Japan) are used. A heat exchanger of a passive residual heat removal system may perform a function of transferring heat received from a reactor to an outside (final heat sink) thereof through an emergency cooling tank, or the like, and employ a condensation heat exchanger using a steam condensation phenomenon with an excellent heat transfer efficiency as a heat exchanger system.

In connection with the present disclosure, a printed circuit heat exchanger has been developed by U. K. Heatric (U.S. Pat. No. 4,665,975, 1987) and is widely used in general industrial fields. The printed circuit heat exchanger is a heat exchanger having a structure in which welding between plates of a heat exchanger is eliminated using a dense flow path arrangement and diffusion bonding technique by a photo-chemical etching technique. Accordingly, the printed circuit heat exchanger is applicable to a high-temperature and high-pressure environment, and has a high degree of integration and excellent heat exchange performance. The printed circuit heat exchanger has advantages such as durability against a high-temperature and high-pressure environment, and excellent high-density heat exchange performance, and thus the scope of its application expands toward a wide variety of fields such as evaporators, condensers, coolers, radiators, heat exchangers, reactors, and the like in cooling and heating systems, fuel cells, automobiles, chemical processes, medical devices, nuclear systems, information and communication devices, cryogenic environments, and the like.

On the other hand, a plate type heat exchanger to be used as one example of the present disclosure has been widely used in industries for over 100 years. Plate type heat exchangers generally presses plates to form a flow channel and combine the plates using a gasket or using typical welding or brazing welding. Accordingly, the application fields of plate type heat exchangers are similar to those of printed circuit heat exchangers, but used more in a low-pressure environment with a low pressure. The heat exchange performance of plate type heat exchangers is lower than that of printed circuit plate heat exchangers but superior to that of shell-and-tube heat exchangers. In addition, compared to printed circuit heat exchangers, they are easy to manufacture.

A plate type heat exchanger in the present disclosure collectively refers to all heat exchangers in case where there is a difference in a method of processing or joining plates as well as a typical plate type heat exchanger and a printed circuit heat exchanger unless otherwise specified.

In connection with the present disclosure, a "Stirling engine" is an external combustion engine developed by Robert Stirling (1816), which tightly holds a gas in a closed cylinder and drives the cylinder depending on cycles such as heating-expansion-cooling-compression, and the like to produce power.

Stirling engines are classified into $\alpha$, $\beta$, $\gamma$, and dual-acting types according to the configuration of the cylinder and piston, and classified into a mechanical driven Stirling engine (Kinematic engine) and a free piston Stirling engine (FPSE) according to the movement of the piston.

The Stirling engine has advantages such as operating with a small temperature difference (e.g., 2° C.), having a very high theoretical efficiency, and having a low noise and low vibration compared to internal combustion engines.

In addition, the Stirling engine has advantages capable of using various heat sources such as solar heat, geothermal heat, and achieving low pollution emissions when using environmentally friendly heat sources.

2. Summary of Present Disclosure

A nuclear power plant according to the present disclosure may include a nuclear safety system configured to remove at least one of heat of a reactor coolant system (which may be a reactor in case of an integral type reactor) and heat transferred from a reactor coolant system to a containment in the event of an accident, a power generator configured to generate power using heat removed by the nuclear safety system in the event of an accident, and a heat transfer portion configured to provide a flow path of heat transfer fluid between the nuclear safety system and the power generator.

The nuclear safety system may include a passive safety system configured to remove at least one of heat in the reactor coolant system and heat transferred from the reactor coolant system to the containment by fluid circulation in the event of an accident.

The passive safety system may include a passive residual heat removal system for removing residual heat in the reactor core and a passive containment cooling system due to an internal pressure increase of the containment.

The power generator may be a heat engine configured to receive heat from a high-temperature heat source (a heat source of the nuclear safety system) to generate power.

The heat engine repeats a series of processes (1 cycle) of receiving heat from a high-temperature heat source (step 1), converting the heat into power (work) (step 2), discharging the remaining heat to an external low-temperature heat source (step 3) and returning to an original state (step 4).

Furthermore, the power generator may be a Stirling engine capable of performing a continuous operation through heating and cooling.

The Stirling engine may have a high-temperature section and a low-temperature section within the cylinder, in which two pistons are used to allow working gas to reciprocate between the high-temperature section and the low-temperature section, thereby performing a continuous operation.

According to the present disclosure, a power generator such as a Stirling engine or the like may be applied together to a passive safety system of the nuclear power plant to drive the Stirling engine by the heat of the passive safety system, and generate electric energy by directly using the engine power or through power generation.

Particularly, in case of an accident, sensible heat and residual heat may be generated from the reactor coolant system, and the heat of the reactor coolant system should be removed to securely maintain the reactor core, and according to the present disclosure, power or electricity may be produced using the heat of the nuclear power plant that should be removed during an accident, and thus employed as a very useful configuration option of the safety system.

In addition, according to the present disclosure, a forced flow may be formed using a fan or a pump on a flow path having a low heat transfer coefficient or having difficulty in forming a circulating flow using power or electricity produced by a Stirling engine or the like, thereby solving a problem of increasing a size of the heat exchanger due to different heat transfer coefficients between two fluids. As a result, a size of the heat exchanger may be reduced to enhance economic efficiency.

On the other hand, moreover, when the heat exchanger is downsized, the problems of arrangement and structural load of an inside and outside of the containment may be greatly alleviated. For example, when a gravity-actuated passive spray system is applied to a nuclear power plant to reduce an internal pressure of the containment during an accident, a large amount of water should be stored in an upper portion of the containment during a normal operation of the nuclear power plant. However, it requires a lot of space to store a large amount of water in an upper portion of the containment, and a large load acts on the structure due to the stored water, and thus it is very difficult in reality to install a water tank that can be used for a long time. Similar problems may also occur with a passive safety injection system.

Accordingly, power and electricity generated from a Stirling engine combined with the passive safety system proposed by the present disclosure may be used as a power source for a pump for replenishing the cooling water of the passive containment spray system or the passive safety injection system to easily solve an arrangement and structural load problem, and moreover, it may be also possible to produce power or electricity from the plant itself in the event of an accident without the help of an emergency diesel generator or external power source, thereby greatly contributing to enhancement of safety.

As described above, when the technology of the present disclosure is applied, it has advantages of using power or electricity produced by a method of combining heat in a passive safety system with a Sterling engine for the performance enhancement of a heat exchanger, the cooling water safety injection, spray makeup or emergency cooling water makeup of the passive safety system, and the securing of a power supply device required for the operation of a safety system.

Hereinafter, prior to providing the detailed description of the present disclosure for each embodiment to help the understanding of the present disclosure, a Stirling engine commonly applied to the embodiments of the present disclosure will be first described.

3. Stirling Engine Applied to Passive Safety System of Present Disclosure

Figure 17:
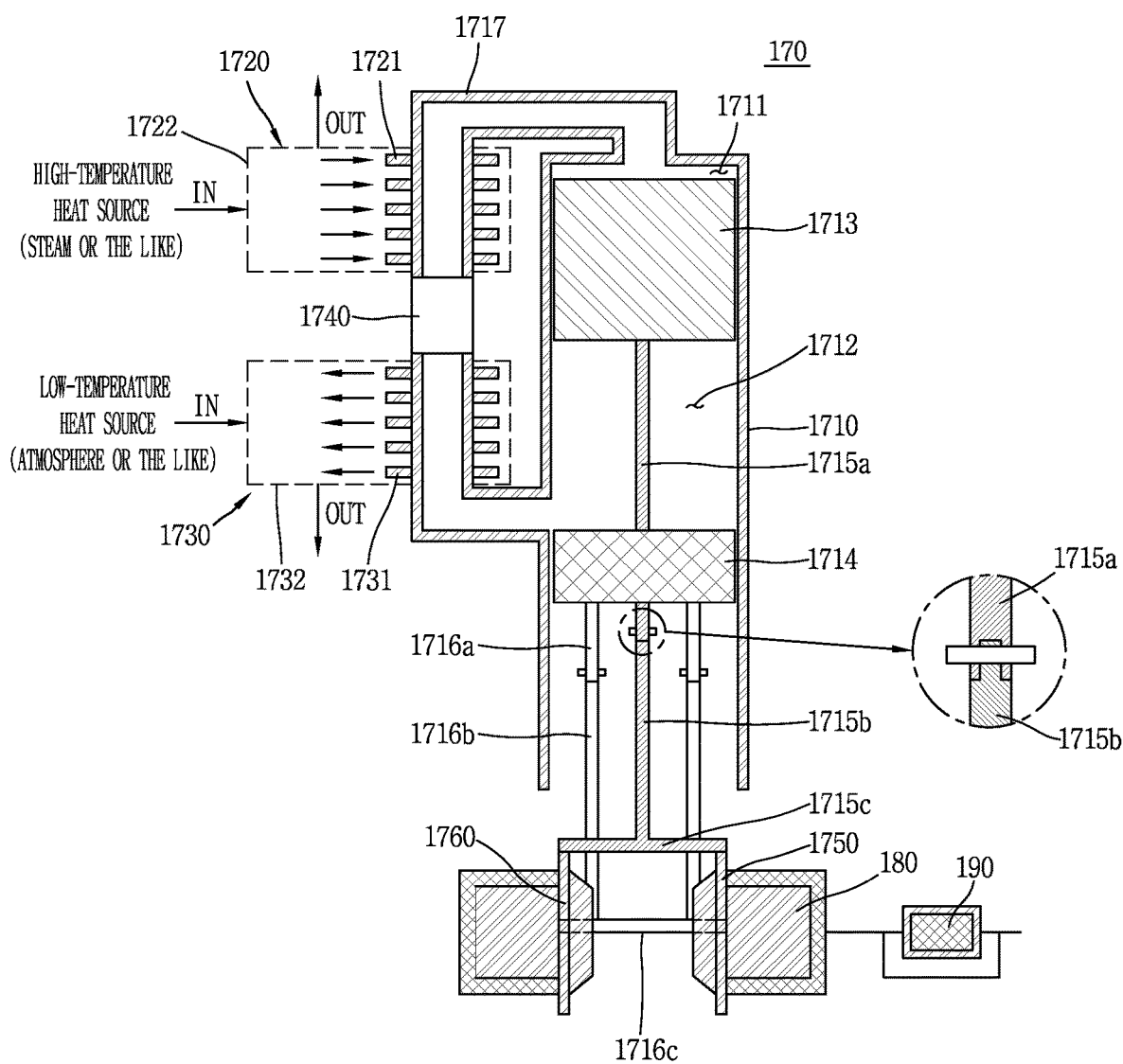
FIG. 17 is a conceptual view illustrating a Stirling engine applied to a passive safety system of the present disclosure.

FIG. 17 is a conceptual view illustrating a Stirling engine 170 applied to a passive safety system of the present disclosure.

The Stirling engine 170 may include a high-temperature section 1711, a low-temperature section 1712, and two pistons 1713, 1714.

The high-temperature section 1711 and the low-temperature section 1712 are respectively formed in a closed space within the cylinder 1710, and working gas is respectively filled into the high-temperature section 1711 and the low-temperature section 1712. The Stirling engine 170 may be separately formed with the high-temperature section 1711 and the low-temperature section 1712, respectively, within two cylinders 1710 or the high-temperature section 1711 and the low-temperature section 1712 may be formed as spaces partitioned from each other within one cylinder 1710.

The Stirling engine 170 illustrated in FIG. 17 exhibits a shape in which two pistons 1713, 1714 are respectively provided within one cylinder 1710 (Beta system).

Here, the Stirling engine 170 may be used in such a manner that each one of two pistons is provided in two cylinders, respectively.

However, when the Stirling engine 170 in which two pistons 1713, 1714 are independently moved within one cylinder 1710 is employed as illustrated in FIG. 17, it has advantages capable of greatly facilitating the structure compared to the Stirling engine 170 that uses two cylinders 1710 and two pistons 1713, 1714 as well as manufacturing with high efficiency, high reliability and low cost.

The configuration of the Stirling engine 170 will be described in more detail as follows.

The cylinder 1710 may include a cylindrically-shaped cylinder body 1710 one side of which is open, a first piston 1713 disposed at a boundary position between the high-temperature section 1711 and the low-temperature section 1712 within the cylinder body 1710 to partition it into the high-temperature section 1711 and the low-temperature section 1712, and a second piston 1714 disposed within the cylinder body 1710 to be spaced apart from the first piston 1713.

The first piston 1713 and the second piston 1714 may be independently moved along an inside of the cylinder body 1710 by working gas.

The Stirling engine 170 may include rotating portions 1750, 1760 rotatably disposed to be spaced from the side of an opening portion of the cylinder 1710, and a plurality of connecting members 1715b, 1716b independently connecting the first and the second piston 1713,1714 to the rotating portions 1750, 1760, respectively.

The first and the second pistons 1713, 1714 may include connection rods 1715a, 1716a extended in axial directions, respectively.

The connecting members 1715b, 1716b may be provided with a first connecting member 1715b and a second connecting member 1716b individually formed in a separate manner to connect the first piston 1713 and the rotating portions 1750, 1760 through the first connecting member 1715b, and connect the second piston 1714 and the rotating portions 1750,1760 through the second connection member 1716b.

One end portion of the first connecting member 1715b may be hinge-coupled to a connecting rod 1715a of the first piston 1713, and the other end portion of the first connecting member 1715b may be hinge-coupled to one side of an outer circumferential portion of the rotating portions 1750, 1760.

One end portion of the second connecting member 1716b may be hinge-coupled to a connecting rod 1716a of the second piston 1714, and the other end portion of the second connecting member 1716b may be hinge-coupled to the other side of an outer circumferential portion of the rotating portions 1750, 1760.

The first connecting member 1715b and the second connecting member 1716b may be coupled to the outer circumferential portion of the rotating portions 1750, 1760 at different phase angles.

The first connecting member 1715b and the second connecting member 1716b may be in a rod shape.

According to a connection relationship between the first and the second connecting member 1715b, 1716b, the reciprocating linear kinetic energy of the first and the second piston 1713, 1714 may be independently transmitted to the rotating portions 1750, 1760 to convert them into a rotational movement, and the first and the second piston 1713, 1714 may be connected to the rotating portions 1750, 1760, thereby implementing a continuous operation of the Stirling engine 170.

The rotating portion 1750, 1760 may be provided as a crankshaft, and may further include a flywheel to stabilize the rotational movement.

The working gas may be any one of air, helium, and hydrogen.

Furthermore, the high-temperature section 1711 and the low-temperature section 1712 may be connected to each other to communicate by a working flow path 1717. For example, one end portion of the working flow path 1717 may be connected to the high-temperature section 1711, and the other end portion of the working flow path 1717 may be connected to the low-temperature section 1712, and thus allowing working gas to move from the high-temperature section 1711 to the low-temperature section 1712 or move from the low-temperature section 1712 to the high-temperature section 1711 through working flow path 1717.

The Stirling engine 170 may further include a regenerative heat exchanger 1740 (regenerator).

The regenerative heat exchanger 1740 is a constituent element for increasing the performance and efficiency of the Stirling engine 170 and may be disposed on a path of working gas reciprocating between the high-temperature section 1711 and the low-temperature section 1712, namely, working flow path 1717.

The regenerative heat exchanger 1740 preferably satisfies the following two requirements.

First, the regenerative heat exchanger 1740 blocks heat flowing from the high-temperature section 1711 to the low-temperature section 1712 as much as possible to maintain a large temperature difference.

Second, when working gas flows from the high-temperature section 1711 to the low-temperature section 1712, the regenerative heat exchanger 1740 may store the heat of the working gas, and then when the working gas flows again from the low-temperature section 1712 to the high-temperature section 1711, the regenerative heat exchanger 1740 should be able to exchange heat with the working gas to transfer heat to the working gas again.

It is because an efficiency of the engine is determined by a temperature difference between the high-temperature section 1711 and the low-temperature section 1712, and gas returned to the high-temperature section 1711 from the low-temperature section 1712 should not be reheated to maximize performance. In this regard, the regenerative heat exchanger 1740 is most closely related to the performance of the engine.

The basic operation of the Stirling engine 170 by a Stirling cycle principle will be described as follows.

(1) Heating: When the high-temperature section 1711 mainly collected with working gas is heated, a high-temperature section piston (hereinafter, referred to as a first piston 1713) is pushed out while the temperature rises to generate work or power.

(2) Expansion: Subsequently, as the temperature of the high-temperature section 1711 rises, the first piston 1713 is pushed out while at the same time moving working gas to the low-temperature section 1712, and a low-temperature section piston (hereinafter, referred to as a second piston 1714) is pushed out. At this time, working gas stores heat in the regenerative heat exchanger 1740 and at the same time starts to cool down while passing through the working flow path 1717 at the side of the low-temperature section 1712.

(3) Cooling: While working gas continues to move to the low-temperature section 1712, the second piston 1714 is pushed out, but as the working gas of the high-temperature section 1711 becomes insufficient, the first piston 1713 starts to return to its original position.

(4) Compression: When working gas is mainly collected in the low-temperature section 1712, the temperature of the working gas is lowered and gradually compressed, and thus the second piston 1714 also returns to its original position and the working gas gradually moves to the high-temperature section 1711.

In this manner, the Stirling engine 170 moves through heating-expansion-cooling-compression processes in one cycle, and as the two pistons 1713, 1714 are mechanically connected to each other, the rotating portions 1750, 1760 are rotated to achieve a continuous cycle operation.

Furthermore, according to the present disclosure, though it has been described with respect to a type of the Stirling engine, the present disclosure may not be necessarily limited to the Stirling engine, and various types of Stirling engines may be applied thereto.

In particular, the Stirling engine 170 according to the present disclosure uses a high-temperature heat source to be removed by the nuclear safety system as a power source.

In other words, heat to be removed to an outside of the containment through the nuclear safety system in the event of an accident is used as a power source of the Stirling engine 170, and then the remaining heat is released to an external environment of the containment.

The Stirling engine 170 of the present disclosure is provided with heat exchange units 1720, 1730 to receive a high-temperature heat source from the nuclear safety system when an accident occurs.

The heat exchange units 1720, 1730 may include a first heat exchange unit 1720 for receiving a high-temperature heat source from the nuclear safety system and a second heat exchange unit 1730 for discharging heat to an external environment from the Stirling engine.

The first heat exchange unit 1720 may provide a high-temperature heat source to the high-temperature section 1711 of the cylinder 1710 for the power generation of the Stirling engine 170, and the second heat exchange unit 1730 may release heat from the low-temperature section 1712 of the cylinder 1710 to an external environment.

Here, the purpose of discharging heat from the low-temperature section 1712 of the cylinder 1710 is to continue the operation of the Stirling engine 170. It is because subsequent to moving the two pistons 1713, 1714 by heating and expansion during the Stirling cycle, heat should be released from the low-temperature section 1712 of the cylinder 1710 to return the positions of the pistons 1713, 1714 to their original positions, respectively, and restart the cycle.

The first heat exchange unit 1720 and the second heat exchange unit 1730 may be integrally formed into the cylinder 1710 or independently formed at an outside of the cylinder 1710.

As illustrated in FIG. 17, the heat exchange units 1720, 1730 may be a plurality of heat exchange fins 1721, 1731 formed integrally with the working flow path 1717 of the cylinder 1710.

Figure 17A:
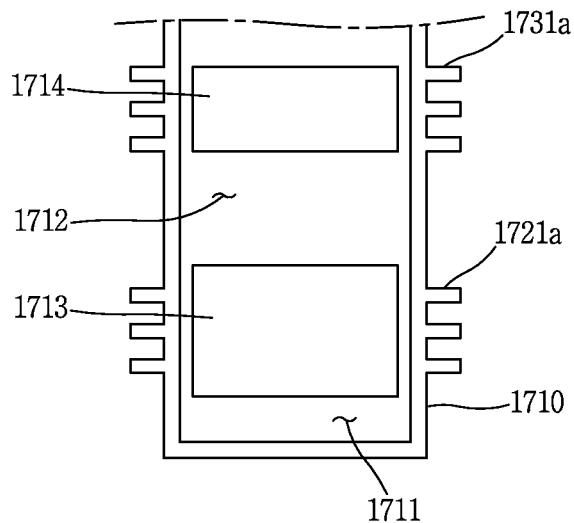
FIG. 17A is a conceptual view illustrating another embodiment of a heat exchange unit according to the present disclosure.
Figure 17B:
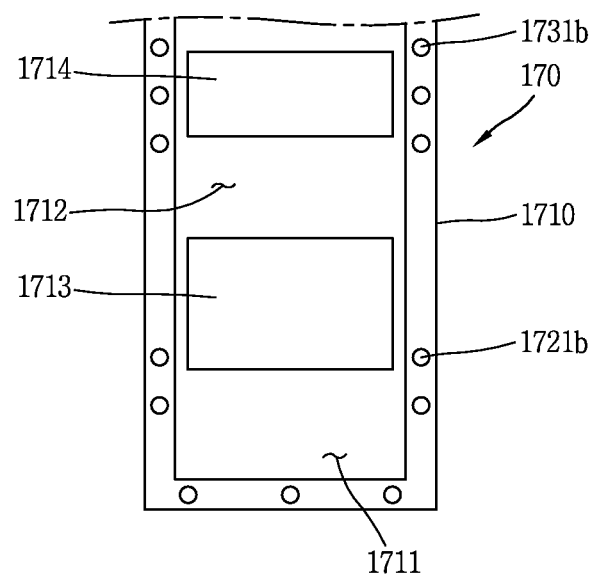
FIG. 17B is a conceptual view illustrating still another embodiment of a heat exchange unit according to the present disclosure.

FIG. 17A is a conceptual view illustrating another embodiment of a heat exchange unit according to the present disclosure, and FIG. 17B is a conceptual view illustrating still another embodiment of a heat exchange unit according to the present disclosure.

Furthermore, for the heat exchange unit, a plurality of heat exchange fins 1721a, 1731a may be integrally formed on an outer surface of the cylinder 1710 as illustrated in FIG. 17A or formed in a shape in which flow paths, 1721b, 1731b are formed within the cylinder 1710 or a shape (not shown) that surrounds an outside of the cylinder 1710 by a heat exchange unit flow path or a shape (not shown) that is formed in a separate space from the cylinder 1710 as illustrated in FIG. 17B.

The Stirling engine 170 of the present disclosure may include a generator 180 configured to convert power into electric energy.

The generator 180 may include a rotor mechanically connected to the rotating portions 1750, 1760 to receive power and a stator configured to electrically interact with the rotor to convert kinetic energy into electrical energy.

The generator 180 may be connected to the rotating portions 1750, 1760 through direct or separate power transmission devices (which may include gears, belts, chains, pulleys, etc.) to receive power so as to produce electric energy.

The generator 180 may include a rotor and a stator to generate electrical energy by electrical interaction.

Furthermore, the Stirling engine 170 may be directly provided with a charger 190 in the generator 180 or provided with a separate charger 190 to store electricity generated by the generator 180.

When electric energy is stored in the charger 190, there is an advantage capable of securely supply power.

As an example of the generator 180, an alternator, a motor, or the like may be provided.

The charger 190 may be a rechargeable secondary cell (battery).

When electricity is generated through the generator 180 using the power of the Stirling engine 170 and electric energy is charged to the charger 190 through power generation, it may be possible to operate the safety system itself without external assistance such as an emergency diesel generator or an external AC power source using the charger 190 in the event of an accident.

In addition, the Stirling engine 170 may be separately provided for an initial drive or configured to be started using the power of the charger 190.

The electrical energy of the charger 190 may be used as an emergency battery power source for the operation (valve), monitoring and management, and the like of a passive safety system, which are essential during an accident.

As described above, when the power of the Stirling engine 170 is used, a capacity of the emergency power system (e.g., emergency battery) of a nuclear power plant required for an accident may be reduced, thereby enhancing economic efficiency.

The Stirling engine 170 may be provided with a power transmission portion externally to directly transfer power to a circulation fan and a circulation pump.

The power transmission portion may include links, a shaft, a coupling, and the like for connecting each component, and further include a belt, a chain, a pulley, gears, and the like for transmitting the rotational power of the rotating portions 1750, 1760.

The generator 180 and charger 190 may be omitted when the power of the Stirling engine 170 is directly used in a fan or pump.

The Stirling engine 170 illustrated in FIG. 17 has an advantage capable of generating power using heat that should be removed from the nuclear safety system in the event of an accident.

Furthermore, the Stirling engine 170 illustrated in FIG. 17 may include a plurality of cylinders 1710 for increasing a power generation efficiency of the engine and may include a plurality of rotating portions 1750, 1760 and generators 180 for each cylinder 1710.

For example, as illustrated in FIG. 17, each of the pistons 1713, 1714 may be connected to a plurality of generators 180 through a multi-type connector 1715c extended in a curved shape such as a T-shape or an elbow shape at the end portions of the connecting members 1715b, 1716b.

Therefore, according to the Stirling engine 170 illustrated in FIG. 17, since two power generators 180 are driven in conjunction with the rotating portions 1750, 1760, it may be possible to double an amount of power generation amount to the extent.

Figure 18:
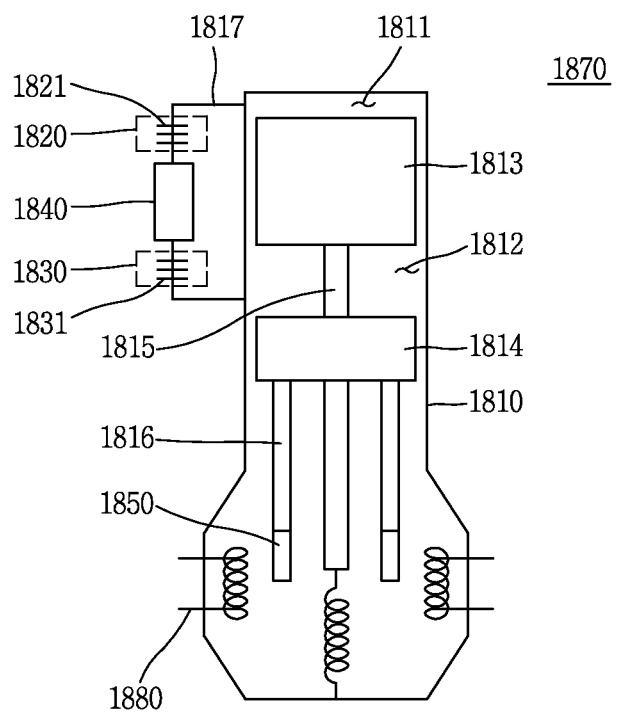
FIG. 18 is a conceptual view illustrating another embodiment of a Stirling engine according to the present disclosure.

FIG. 18 is a conceptual view illustrating another embodiment of a Stirling engine 1870 according to the present disclosure.

The Stirling engine 1870 illustrated in FIG. 18 may remove a mechanical connection between two moving pistons 1813, 1814 in the manner of pre-pistons 1813, 1814, and connect the movements of the two pistons 1813, 1814 by a resonant motion due to the movement of working gas.

The Stirling engine 1870 illustrated in FIG. 18 may connect a magnet 1850 to the second piston 1814 to move it within a coil 1880 when connected to a linear alternator, and thus an engine output may be very easily converted into electric power, and there is no need for the shaft to protrude, and as a result, there is no sealing problem around the rotating portion in the engine filled with a high-pressure gas.

In addition, since the Stirling engine 1870 illustrated in FIG. 18 does not generate a lateral force on the two pistons 1813, 1814, the two pistons 1813, 1814 may move in a state of no lateral force (lateral direction force), thereby minimizing a mechanical loss.

Hereinafter, the present disclosure will be described in detail for each embodiment with reference to the drawings to facilitate the implementation thereof.

First Embodiment

FIG. 1 is a conceptual view illustrating a passive residual heat removal system 110 to which a Stirling engine 170 according to a first embodiment of the present disclosure is applied, and a nuclear power plant 100 having the same.

Although the nuclear power plant 100 illustrated in FIG. 1 is illustrated for an integral type nuclear reactor, the present disclosure may not be necessarily limited to an integral nuclear reactor, and may also be applicable to a separate type nuclear reactor. Furthermore, the present disclosure may not be necessarily limited to a pressurized water reactor, and may also be applicable to various types of nuclear power plants including gas furnaces, liquid metal furnaces or the like.

According to the first embodiment of FIG. 1, for the sake of convenience of explanation, the passive residual heat removal system 110 and the nuclear power plant 100 having the same are illustrated symmetrically with respect to a reactor coolant system 11. A normal operation of the nuclear power plant 100 is illustrated on the right side (direction of arrow A) of the first embodiment, and a flow path of heat transfer fluid and a heat transfer path are illustrated when an accident occurs in the nuclear power plant 100 on the left side (direction of arrow B). It is the same as the other drawings illustrated below to be symmetrical to each other unless otherwise described.

The nuclear power plant 100 may include various safety systems for maintaining the integrity of the nuclear power plant 100 in preparation for a normal operation and the occurrence of an accident, and further include a structure such as the containment 12 or the like.

The containment 12 is formed to surround the reactor coolant system 11 at an outside of the reactor coolant system 11 to prevent the leakage of radioactive materials. The containment 12 serves as a final barrier to prevent the leakage of radioactive materials from the reactor coolant system 11 to an external environment.

When feedwater is supplied from a feedwater system 13 to a steam generator 17 through a main feedwater line 15 during a normal operation of the nuclear power plant 100, the steam generator 17 generates steam using heat transferred from a core 18. The steam is supplied to a turbine system 14 through a main steam line 16, and the turbine system 14 produces electricity using the supplied steam. Isolation valves 21 installed on the main feedwater line 15 and the main steam line 16 are open during a normal operation of the nuclear power plant 100, but closed by an actuation signal when an accident occurs.

A primary system fluid is filled within the reactor coolant system 11, and the primary system fluid transfers heat transferred from the core 18 to the secondary system fluid through the steam generator 17. A primary system of the nuclear power plant 100 is a system configured to directly receive heat from the core 18 to cool the core 18, and a secondary system thereof is a system configured to receive heat from the primary system while maintaining a pressure boundary with the primary system to produce electricity using the received heat. In particular, a pressure boundary should be maintained between the primary system and the secondary system for the integrity of a pressurized water reactor type nuclear power plant 100.

The reactor coolant system 11 is provided with a reactor coolant pump 19 for circulating the primary system fluid and a pressurizer 20 for suppressing the boiling of the coolant and controlling an operating pressure. The steam generator 17 is disposed at a boundary between the primary system and the secondary system to induce heat exchange between the primary system fluid and the secondary system fluid.

The passive residual heat removal system 110 as one of core systems for securing the safety of the nuclear power plant 100 when an accident occurs in the nuclear power plant 100 is a system configured to remove sensible heat in the reactor coolant system 11 and residual heat in the core 18 and release them to an outside.

Hereinafter, the structure of a passive residual heat removal system 110 will be first described, and subsequently, the operation of the passive residual heat removal system 110 when an accident occurs in the nuclear power plant 100 will be described.

The passive residual heat removal system 110 may include a heat exchanger 111 and a circulation pipe 121 and may include a heat exchange casing 112, a circulation fan 113 and a power generator 170.

The heat exchanger 111 may be provided in at least one of an inside or outside of the containment 12. The heat exchanger 111 may allow the primary system fluid or secondary system fluid that has received the sensible heat and residual heat to remove the sensible heat of the reactor coolant system 11 and the residual heat of the core 18 to exchange heat with a cooling fluid introduced from an outside of the containment 12.

The heat exchanger 111 illustrated in FIG. 1 is provided at an outside of the containment 12 and configured to allow the secondary system to exchange heat with a cooling fluid at an outside of the containment 12.

The circulation pipe 121 connects the reactor coolant system 11 to the heat exchanger 111 to form a circulating flow path of the primary system fluid or secondary system fluid or connects the steam generator 17 between the primary system and the secondary system to the heat exchanger 111. According to a first embodiment, the circulation pipe 121 connecting the steam generator 17 and the heat exchanger 111 to form a circulating flow path for the secondary system fluid is illustrated.

The heat exchanger 111 may include a plurality of channels arranged on a plate to be distinguished from each other so as to allow the primary system fluid or the secondary system fluid supplied through the circulation pipe 121 to exchange heat with the cooling fluid while maintaining a pressure boundary.

The channels may include a first flow path and a second flow path for allowing different fluids to pass therethrough. A plurality of first flow paths are arranged to be spaced apart from one another on a plate so as to allow a cooling fluid for cooling the primary system fluid or secondary system fluid to pass therethrough. The second flow path is formed to allow the primary system fluid or secondary fluid to pass therethrough, and a plurality of second flow paths are arranged alternately with the first flow paths to induce heat exchange with the cooling fluid while maintaining a pressure boundary.

Since the heat exchanger 111 of the first embodiment uses the circulation of the secondary system fluid, the secondary system fluid may flow through the second flow path, and a cooling fluid flowing through the first flow path, namely, air introduced from the external environment of the containment 12, may cool the secondary system fluid.

An inlet header and an outlet header may be formed at each entrance of the heat exchanger 111. The inlet header is formed at an inlet of the first flow path and the second flow path to distribute fluids supplied to the heat exchanger 111 to each of the channels. The outlet header is formed at an outlet of the first flow path and the second flow path to collect fluids passing through each of the channels. The fluids supplied to the heat exchanger 111 include a cooling fluid passing through the first flow path, a primary system fluid or secondary system fluid passing through the second flow path. In particular, the fluids supplied to the heat exchanger 111 in the passive residual heat removal system 110 according to the first embodiment are the cooling fluid and the secondary system fluid.

In the first embodiment, an inlet header and an outlet header of the second flow path may be provided to maintain a pressure boundary. However, since the first flow path has a structure in which the entrance is open to an outside environment of the containment 12 or an inside of the heat exchange casing 112, the inlet header and outlet header are selectively provided to efficiently perform the entrance flow of the first flow path. Therefore, the first flow path may not be provided with an inlet header and an outlet header, and may be replaced with an inlet guide structure and an outlet guide structure in a shape of extending outwardly from the first flow path.

The inlet of the first flow path is disposed adjacent to the outlet of the second flow path and the outlet of the first flow path may be disposed adjacent to the inlet of the second flow path since the cooling fluid and the secondary system fluid exchange heat while flowing in different directions. Furthermore, the inlet header of the first flow path may be disposed adjacent to the outlet header of the second flow path, and the outlet header of the first flow path may be disposed adjacent to the inlet header of the second flow path.

The circulation pipe 121 may include a steam pipe 121*b* for supplying the secondary system fluid to the heat exchanger 111 and a feedwater pipe 121*a* for supplying the secondary system fluid from the heat exchanger 111.

The steam pipe 121*b* is branched from the main steam line 16 and connected to the inlet of the second flow path to receive the secondary system fluid from the main steam line 16 extended from the outlet of the steam generator 17. The feedwater pipe 121*a* is branched from the main feedwater line 15 extended from the inlet of the steam generator 17 and connected to the outlet of the second flow path to transfer heat to the cooling fluid and circulate the cooled and condensed secondary system fluid, namely, the cooling water, to the steam generator 17 again.

The passive residual heat removal system 110 may include a heat exchange casing 112 for cooling the heat exchanger 111 by the external atmosphere of the containment 12.

The heat exchange casing 112 is provided at an outside of the containment 12. In addition, the heat exchange casing 112 provides a receiving space formed therein to surround an outside of the heat exchanger 111.

An inlet is formed at a lower end portion of the heat exchange casing 112 to introduce the external atmosphere of the containment 12 into the inlet of the first flow path of the heat exchanger 111. Furthermore, a through-hole for inserting the steam pipe 121*b* is formed on an upper lateral surface of the heat exchange casing 112 to introduce the primary system fluid or secondary system fluid into the inlet of the second flow path of the heat exchanger 111. In addition, an outlet is formed at an upper end portion of the heat exchange casing 112 to discharge the external atmosphere of the containment 12 that has exchanged heat in the heat exchanger 111 to an outside of the heat exchange casing 112.

Since the entrance of the heat exchange casing 112 are formed at an upper and a lower end portion of the casing 112, respectively, in a gravity direction, it is designed such a manner that the external atmosphere of the containment 12 introduced through the inlet of the casing 112 is discharged to the outlet of the casing 12 as moves upward due to a density difference or the like by receiving the heat of the primary system fluid or secondary system fluid.

Here, the heat exchange casing 112 guides external atmosphere to allow the external atmosphere of the containment 12 to pass through the first flow path of the heat exchanger 111.

Furthermore, at least part of the outlet of the heat exchange casing 112 may be formed to be smaller in cross-sectional area and higher in height than the inlet formed at a lower end of the casing 112, thereby increasing a circulation flow rate of the external atmosphere of the containment 12 by a chimney effect.

The heat exchanger 111 may be provided to be accommodated into the heat exchange casing 112. In this case, part of at least one of the steam pipe 121*b* and the feedwater pipe 121*a* may be connected to the main steam line 16 and the main feedwater line 15, respectively, through the heat exchange casing 112 within the containment 12.

The heat exchanger 111 illustrated in FIG. 1 cools the secondary system fluid using a cooling fluid of the heat exchange casing 112 (external atmosphere of the containment 12) (air-cooling type).

The Stirling engine 170 may be provided on the flow path through which the external atmosphere of the containment 12 moves, namely, on the outlet side of the first flow path of the heat exchanger 111.

The heat exchanger 111, the Stirling engine 170, and the circulation fan 113 may be provided within the heat exchange casing 112 to move the external atmosphere of the containment 12 to the inlet of the heat exchange casing 112, the heat exchanger 111, the Stirling engine 170, the circulation fan 113 and the outlet of the heat exchange casing 112.

Furthermore, the steam pipe 121b is communicatively connected to the steam generator 17, the heat exchange unit of the Stirling engine 170, and the heat exchanger 111 to transfer steam generated from the steam generator 17 to the second flow path of the heat exchanger 111 through the heat exchange unit of the Stirling engine 170.

The circulation fan 113 may be provided at the outlet of the heat exchange casing 112 to provide forced flow of the external atmosphere of the containment 12 to introduce it into the heat exchange casing 112.

The Stirling engine 170 is provided with the cylinder 1710 to generate power.

The high-temperature section 1711 and the low-temperature section 1712 are provided within the cylinder 1710, and working gas is filled in the high-temperature section 1711 and the low-temperature section 1712, respectively.

The heat exchange unit is provided with a first heat exchange unit 1720 and a second heat exchange unit 1730.

The first heat exchange unit 1720 is connected to the steam pipe 121b and the high-temperature section 1711 of the cylinder 1710 to transfer the heat of the passive residual heat removal system 110, namely, the heat of steam generated from the steam generator 17, to the high-temperature section 1711 of the cylinder 1710.

The first heat exchange unit 1720 may be provided with a first heat exchange fin 1721 integrally formed into the working flow path 1717 connected to the high-temperature section 1711 of the cylinder 1710 to expand a heat exchange area. The first heat exchange fin 1721 may have a structure in which a plurality of protrusions with a low thickness are spaced apart from each other.

The first heat exchange unit 1720 may be provided within a separate heat exchange housing 1722.

The steam pipe 121b may be connected to an entrance formed on the heat exchange housing 1722.

For example, steam may be introduced from the steam pipe 121b through the inlet of the heat exchange housing 1722, and as the steam exchanges heat with the first heat exchange fin 1721 of the first heat exchange unit 1720 incorporated into the heat exchange housing 1722, the heat of the steam may be transferred to the heat exchange fin, and then the steam may be moved to the steam pipe 121b through the outlet of the heat exchange housing 1722.

Furthermore, the second heat exchange unit 1730 may be provided with a second heat exchange fin 1731 formed integrally into the working flow path 1717 connected to the low-temperature section 1712 of the cylinder 1710.

The second heat exchange unit 1730 may be provided within a separate heat exchange housing 1732 or exposed to the external atmosphere of the containment.

When the second heat exchange unit 1730 is provided within a separate heat exchange housing 1732, the separate heat exchange housing 1732 may release the heat of working gas transferred from the low-temperature section 1712 of the cylinder 1710 to an outside of the containment 12 as emergency cooling water is received from the emergency cooling water storage section through a pipe, and heat is exchanged between the second heat exchange unit 1730 and the emergency cooling water.

Hereinafter, an operation due to a coupling between the passive residual heat removal system 110 and the Stirling engine 170 will be described.

The left side (direction of arrow B) of the drawing symmetrically illustrated in FIG. 1 illustrates a state of the passive residual heat removal system 110 when an accident occurs.

The secondary system fluid described in the first embodiment is steam, and the cooling fluid refers to the external atmosphere of the containment 12.

When an accident such as a loss of coolant accident or non-loss of coolant accident (such as a steam pipe break accident) occurs in the nuclear power plant 100, the passive residual heat removal system 110 is operated.

In other words, the isolation valves 21 provided in the main engine 16 and the main feedwater pipe 15 are closed by a related signal. Then, isolation valve 122 provided on the feedwater pipe 121a of the passive residual heat removal system 110 is opened by a related signal, and a check valve 123 provided on the feedwater pipe 121a is also opened as the isolation valve 122 is opened. As a result, the supply of water from the feedwater system 13 to the steam generator 17 is suspended, and the secondary system fluid circulates within the passive residual heat removal system 110.

The secondary system fluid sequentially passes through the feedwater pipe 121a and the main feedwater pipe 15 and flows into the inlet of the steam generator 17. The secondary system fluid supplied to the steam generator 17 receives sensible heat and residual heat in the core 18 from the primary system fluid within the reactor coolant system 11 in the steam generator 17, and the temperature of the secondary system fluid rises to allow at least part thereof to evaporate.

The secondary system fluid discharged through the outlet of the steam generator 17 rises along the main steam line 16 and the steam pipe 121b of the passive residual heat removal system 110, and passes through the Stirling engine 170.

At this time, the heat of steam (secondary system fluid) flowing along the steam pipe 121b is transferred to the Stirling engine 170 (power generator). The Stirling engine 170 receives the heat of steam through the first heat exchange unit 1720. In other words, the heat of steam is transferred to the high-temperature section 1711 of the cylinder 1710 through heat exchange with the first heat exchange unit 1720.

The cylinder 1710 of the Stirling engine 170 may generate power as it is driven by the heating, expansion, cooling, and compression processes of the working gas.

Further, the heat remaining after driving the piston of the cylinder 1710 is discharged to the low-temperature section 1712 of the cylinder 1710. The low-temperature section 1712 of the cylinder 1710 discharges steam flowing along an inside of the heat exchange casing 112 through heat exchange with the second heat exchange section 1730 to the external atmosphere of the containment 12.

The power generated in the cylinder 1710 is transferred to the rotating portion and converted into rotational kinetic energy.

The rotational kinetic energy generated by the Stirling engine 170 may be directly transmitted to a rotating shaft of the circulation fan 113 by the power transmission portion connecting the rotating portion and the circulation fan 113.

The secondary system fluid passes through the first heat exchange unit 1720 of the Stirling engine 170, and then flows into the inlet of the second flow path of the heat exchanger 111.

Subsequently, the secondary system fluid is heat-exchanged with the cooling fluid introduced into the inlet of the first flow path of the heat exchanger 111, and cooled, condensed and descended, and then, the secondary system fluid moves along the feedwater pipe 121a to circulate through the steam generator 17. Since the circulation of the secondary system fluid is caused by a natural phenomenon due to a density difference, the circulation of the secondary system fluid continues until the sensible heat of the reactor coolant system 11 and the residual heat of the core 18 are sufficiently removed and a sufficient density difference required for the circulation of the secondary system fluid disappears Here, the secondary system fluid passing through the Stirling engine 170 heats the first heat exchange unit 1720 of the Stirling engine 170 to drive the Stirling engine 170, and the circulation fan 113 is driven by power generated by the Stirling engine 170.

As described above, the passive residual heat removal system 110 may circulate the secondary system fluid by a passive method due to natural forces, and remove the sensible heat of the reactor coolant system 11 and the residual heat of the core 18. In addition, since the heat exchanger 111 is configured to exchange heat by passing the secondary system fluid and the cooling fluid through different channels, thereby preventing a pressure boundary from being damaged, and inducing sufficient heat exchange through micro-flow paths.

Meanwhile, when heat is transferred from the secondary system fluid to the cooling fluid within the heat exchanger 111, the temperature of the cooling fluid gradually increases, the density decreases, and buoyancy is generated to form a flow by natural convection at the inlet of the heat exchange casing 112, the heat exchanger 111, and the outlet of the casing 112. At this time, as the circulation fan 113 operates, a circulating flow amount of the external atmosphere of the containment 12 increases.

According to a first embodiment of the present disclosure, the sensible heat and residual heat of the reactor coolant system 11 may be used to drive the Stirling engine 170 to generate power so as to obtain power or produce electricity using the generated power. Furthermore, the circulation fan 113 may be driven using power or electricity obtained by the Stirling engine 170, and used to circulate the external atmosphere of the containment 12 for cooling the air-cooling type heat exchanger 111, thereby enhancing performance and efficiency.

In addition, power may be produced using the heat of the reactor coolant system 11 to be removed in the event of an accident, and thus it may be employed as a very useful configuration option.

Furthermore, it may be configured to form a forced flow using the circulation fan 113 or the like on a flow path having a low heat transfer coefficient or in which a circulating flow is hardly formed, using the power produced by the Stirling engine 170, to increase a heat transfer coefficient, thereby reducing a size of the heat exchanger 111 to enhance economic efficiency. Moreover, when the heat exchanger 111 is downsized, it may be possible to greatly alleviate a problem of arrangement and structural load at an inside and outside of the containment 12.

In general, the plate type heat exchanger has a very high heat transfer performance but a large flow resistance. When the power or electricity of the Stirling engine is used as a fluid circulation power of the heat exchanger, it may be possible to alleviate a problem of increase in the flow path resistance.

When the air-cooling type heat exchanger 111 is applied as in the present embodiment, it may not be required to replenish emergency cooling water, and thus its function may be maintained semi-permanently, and very advantageous in the aspect of safety.

Second Embodiment

Figure 2:
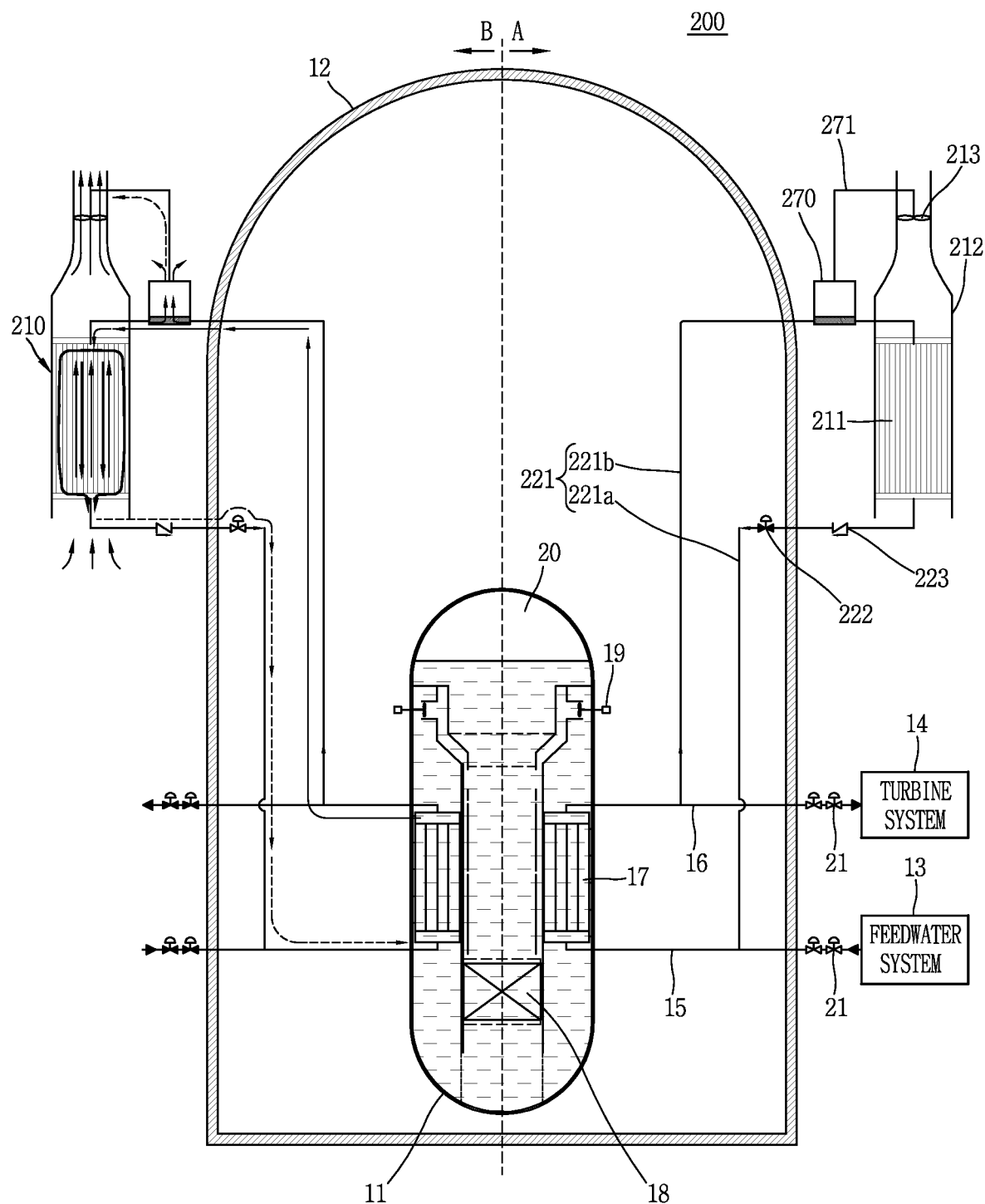
FIG. 2 is a conceptual view illustrating a passive residual heat removal system to which a Stirling engine associated with a second embodiment of the present disclosure is applied, and a nuclear power plant having the same.

FIG. 2 is a conceptual view illustrating a passive residual heat removal system 210 to which a Stirling engine 270 associated with a second embodiment of the present disclosure is applied, and a nuclear power plant 200 having the same.

The Stirling engine 270 according to the second embodiment is provided at an outside of the containment 12 and an outside of a heat exchange casing 212. Other configurations are the same as or similar to those of the first embodiment described above, and thus the description thereof will be omitted for clarity of explanation.

However, when the Stirling engine 270 is exposed to an external environment of the heat exchange casing 212, it is easy for an operator's access, thereby having an advantage of facilitating maintenance.

Third Embodiment

Figure 3:
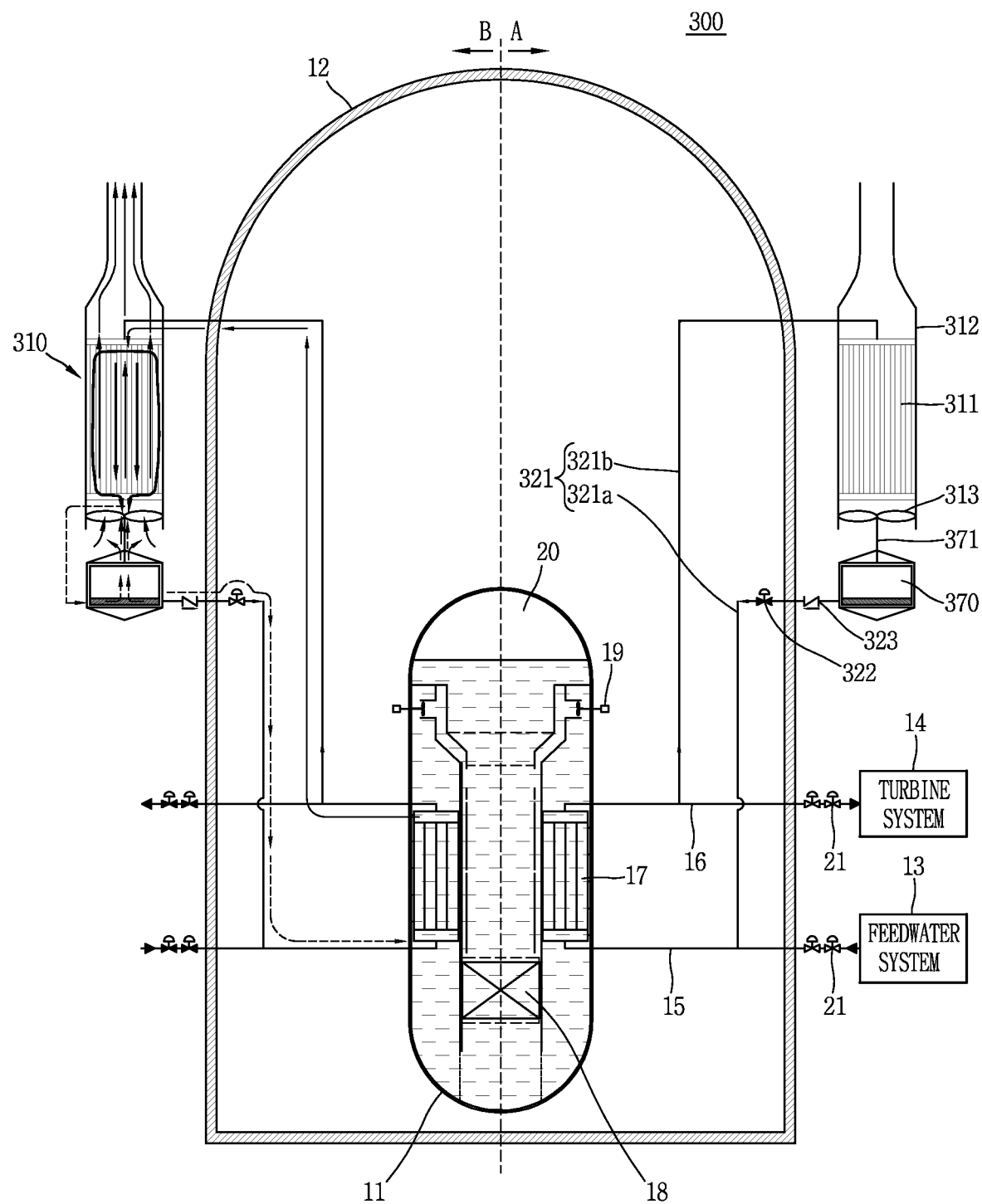
FIG. 3 is a conceptual view illustrating a passive residual heat removal system to which a Stirling engine associated with a third embodiment of the present disclosure is applied, and a nuclear power plant having the same.

FIG. 3 is a conceptual view illustrating a passive residual heat removal system 310 to which a Stirling engine 370 according to a third embodiment of the present disclosure is applied, and a nuclear power plant having the same.

The Stirling engine 370 according to the third embodiment may be provided at a first flow path inlet side of a heat exchanger 311 and a second flow path outlet side of the heat exchanger 311 through which a cooling fluid is introduced. Steam introduced into the second flow path of the heat exchanger 311 may be cooled and condensed by the external atmosphere of the containment 12 introduced into the first flow path of the heat exchanger 311 and collected at the outlet side of the second flow path, and the collected cooling water may be transferred to the steam generator 17 along a feedwater pipe 321a. The Stirling engine 370 is provided on the feedwater pipe 321a to receive heat from the cooling water flowing along the feedwater pipe 321a so as to generate power. Other configurations are the same as or similar to those of the first embodiment described above, and thus the description thereof will be omitted for clarity of explanation.

However, a steam pipe 321b is communicably connected to an outlet of the steam generator 17 and an inlet of the second flow path of the heat exchanger 311 without passing through the Stirling engine 370, thereby transferring the steam of the steam generator 17 to the heat exchanger 311.

Furthermore, the feedwater pipe 321a is connected to an outlet of the second flow path of the heat exchanger 311, the first heat exchange unit 1720 of the Stirling engine 370 and an outlet of the second flow path of the heat exchanger 311 the heat exchanger 311 to circulate the cooling water condensed in the heat exchanger 311 to the steam generator 17 through the first heat exchange unit 1720 of the Stirling engine 370.

Furthermore, the circulation fan 313 may be provided on a first flow inlet side of the heat exchanger 311, and driven by receiving power through the power transmission portion 371 connecting the rotating portion of the Stirling engine 370 and the rotating shaft of the circulation fan 313.

Considering a path of the secondary system fluid, the steam discharged from the outlet of the steam generator 17 rises along the steam pipe 321b and flows into the inlet of the second flow path of the heat exchanger 311 to be cooled and condensed by the external atmosphere of the containment 12 in the heat exchanger 311, and moves downward along the second flow path. The cooling water discharged through the outlet of the second flow path of the heat exchanger 311 flows downward along the feedwater pipe 321a to pass through the first heat exchange unit 1720 of the Stirling engine 370 so as to heat the high-temperature section 1711 of the Stirling engine 370 by heat transmitted through the heat exchange unit 1720, and then circulates to the inlet of the steam generator 17 along the feedwater pipe 321a.

Considering an external atmosphere path of the containment 12, the external atmosphere of the containment 12 introduced into the inlet of the heat exchange casing 312 while receiving a driving force of the Stirling engine 370 to drive the circulation fan 313 exchanges heat with the low-temperature section 1712 of the Stirling engine 370 through the second heat exchange unit 1730 of the Stirling engine 370 to cool the low-temperature section 1712. Subsequently, the external atmosphere of the containment 12 is introduced into the inlet of the first flow path of the heat exchanger 311 to receive the heat of the secondary system fluid so as to increase the temperature of the external air, and moved upward along the first flow path to pass through the outlet of the second flow path of the heat exchanger 311, and discharged to an outlet of the heat exchange casing 312.

The Stirling engine 370 illustrated in FIG. 3 may receive a heat source of cooling water flowing along the feedwater pipe 321a in the heat exchanger 311 to generate power.

Fourth Embodiment

Figure 4:
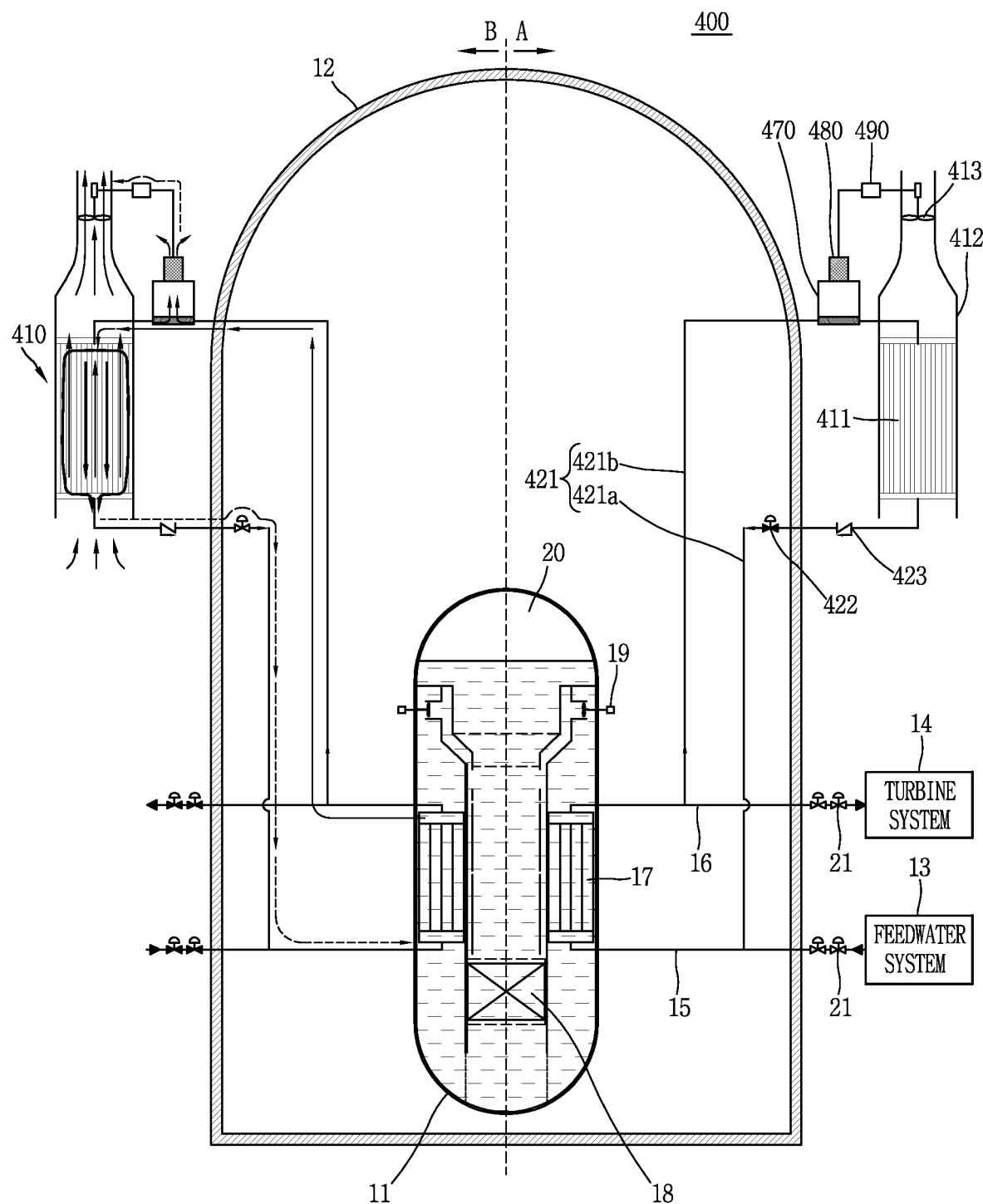
FIG. 4 is a conceptual view illustrating a passive residual heat removal system to which a Stirling engine associated with a fourth embodiment of the present disclosure is applied, and a nuclear power plant having the same.

FIG. 4 is a conceptual view illustrating a passive residual heat removal system 410 to which a Stirling engine 470 according to a fourth embodiment of the present disclosure is applied, and a nuclear power plant 400 having the same.

The Stirling engine 470 according to the fourth embodiment is provided at an outside of the heat exchange casing 412 and at an outside of the containment 12 to convert power obtained from the Stirling engine 470 into electric energy and drive the circulation fan 413 using the converted electric energy. The circulation fan 413 may be provided at an outlet or inlet (not shown) of the heat exchange casing 412. Other configurations are the same as or similar to those of the second embodiment described above, and thus the description thereof will be omitted for clarity of explanation.

However, the Stirling engine 470 may further include a generator 480 and a charger 490.

The generator 480 may be connected to the rotating portions 1750, 1760 to convert power obtained from the Stirling engine 470 into electric energy.

The charger 490 stores electrical energy converted from the power of the Stirling engine 470 in an energy storage device such as a battery or the like.

According to the present embodiment, electricity may be produced using power generated by the Stirling engine 470, and the circulation fan 413 may be driven by this power to obtain the same effect as in the first embodiment. In addition, electricity produced by the Stirling engine 470 may be used as an emergency battery power source for the operation (particularly, an operation of valves or the like), monitoring and management of a passive safety system during a nuclear accident. Furthermore, when the power of the Stirling engine is used, the battery capacity may be reduced, thereby enhancing economic efficiency.

Fifth Embodiment

Figure 5:
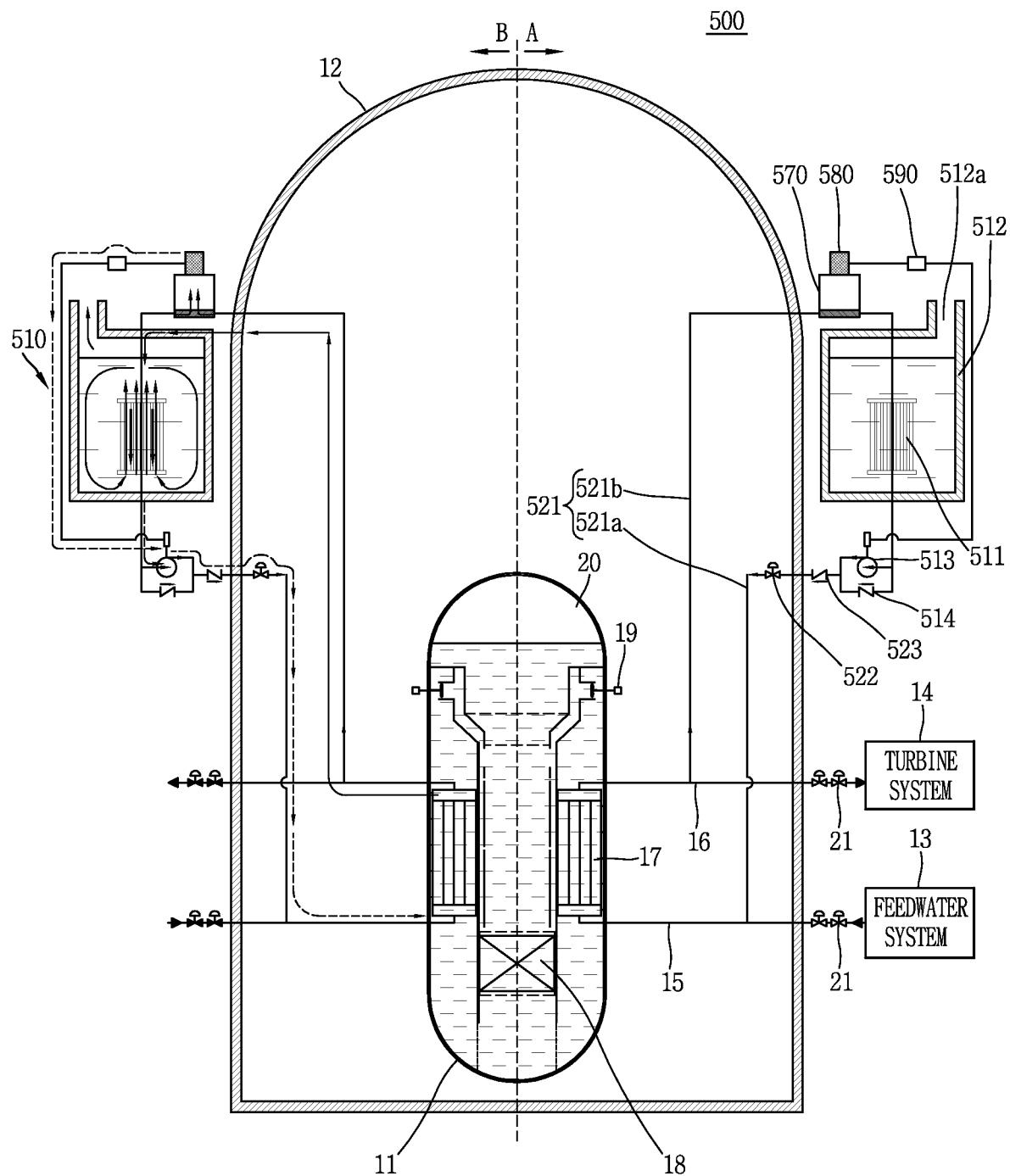
FIG. 5 is a conceptual view illustrating a passive residual heat removal system to which a Stirling engine associated with a fifth embodiment of the present disclosure is applied, and a nuclear power plant having the same.

FIG. 5 is a conceptual view illustrating a passive residual heat removal system 510 to which a Stirling engine 570 according to a fifth embodiment of the present disclosure is applied, and a nuclear power plant 500 having the same.

The passive residual heat removal system 510 according to the fifth embodiment may convert power generated by the Stirling engine 570 into electric energy, and the converted electric energy may be used as a power source of the circulation pump 513 to provide forced flow of a circulating fluid between the heat exchanger 511 and the steam generator 17. In the fifth embodiment, the description of the same or similar configuration as that of the first embodiment will be substituted by the description the first embodiment, and the remaining differences will be described in detail.

The passive residual heat removal system 510 illustrated in FIG. 5 employs a water-cooling type heat exchanger 511 in place of the air-cooling type heat exchanger 511 of the first embodiment.

The water-cooling type heat exchanger 511 may be cooled by emergency cooling water stored within an emergency cooling water storage section 512.

The emergency cooling water storage section 512 may store emergency cooling water such that the heat exchanger 511 is immersed therein, and may include a steam outlet 512a formed at an upper end portion of the emergency cooling water storage section 512.

The emergency cooling water may be evaporated as it is heated by the heat of steam flowing into the second flow path of the heat exchanger 511 from the emergency cooling water storage section 512.

The emergency cooling water storage section 512 is provided at an outside of the containment 12, and the emergency cooling water storage section 512 is positioned to be higher than an upper end of the reactor to transfer the cooling water of the heat exchanger 511 to the steam generator 17 by gravity.

The steam pipe 521b may be connected to the steam generator 17, the first heat exchange unit 1720 of the Stirling engine 570, and a second flow path of the heat exchanger 511 to transfer the steam of the steam generator 17 to the second flow path of the heat exchanger 511 through first heat exchange unit 1720 of the Stirling engine 570. At this time, at least part of the steam pipe 521b may be connected to a second flow path of the heat exchanger 511 through the emergency cooling water storage section 512.

The feedwater pipe 521a may be connected to an outlet of the first flow path of the heat exchanger 511, the circulation pump 513, and the steam generator 17 to circulate cooling water cooled and condensed in the heat exchanger 511 to the steam generator 17 through the circulation pump 513.

The circulation pump 513 may be provided on the feedwater pipe 521a to provide forced flow of cooling water condensed in the heat exchanger 511 from the heat exchanger 511 to the steam generator 171.

A bypass line may be separately provided in parallel with the circulation pump 513 on the feedwater pipe 521a, and a check valve 514 may be provided on the bypass line, and a flow may be formed when the circulation pump 513 is not operated.

The Stirling engine 570 may be disposed at an outside of the emergency cooling water storage section 512 and at an outside of the containment 12, and provided on the steam pipe 521b.

The Stirling engine 570 may receive the heat of steam transmitted through the steam pipe 521b in the event of an accident to generate power.

The power generated by the Stirling engine 570 may be converted into electric energy in the generator 580 to drive the circulation pump 513 by the electric energy. Furthermore, surplus electrical energy may be charged to the charger 590.

The circulation pump 513 may provide power to a circulating fluid circulating between the heat exchanger 511 and the steam generator 17, namely, cooling water condensed in the heat exchanger 511, thereby enhancing the performance of the heat exchanger 511 and reducing a size of the heat exchanger 511.

Considering a movement path of a secondary system fluid, steam rises along the steam pipe 521b at the outlet of the steam generator 17, and heats the high-temperature section of the Stirling engine 570 through the first heat exchange unit 1720 of the Stirling engine 570 while passing through the Stirling engine 570. After passing through the Stirling engine 570, the steam flows into the inlet of the second flow path of the heat exchanger 511, and is cooled and condensed by heat exchange with emergency cooling water flowing into the first flow path of the heat exchanger 511, and moved downward along the feedwater pipe 521a by the power of the circulation pump 513 and circulated to the inlet of the steam generator 17.

Considering a movement path of emergency cooling water, the emergency cooling water is introduced into the inlet of the first flow path of the heat exchanger 511, and heated or evaporated by the heat of steam transferred from an inside of the heat exchanger 511, and the evaporated is circulated back to the emergency cooling water storage section 512 through the outlet of the first flow path, and steam evaporated due to an increase of the temperature of the emergency cooling water storage section 512 is discharged to an external environment of the emergency cooling water storage section 512 through the steam outlet 512a.

Here, a separate heat exchanger may be provided to cool the cooling water of the emergency cooling water storage section 512.

Since the heat exchanger performs heat transfer between two fluids, when two fluids have different fluids and different flow conditions as in the present embodiment, the heat transfer coefficients of the two fluids are different, and a fluid having a smaller heat transfer coefficient between them becomes a factor that dominates a size of the heat exchanger to increase the size of the heat exchanger. The present disclosure may form a forced flow using the circulation pump 513 or the like on a flow path (second flow path of the heat exchanger into which steam is introduced in the present embodiment) having a low heat transfer coefficient or in which a circulating flow is hardly formed, using power or electricity produced by the Stirling engine 170, to increase a heat transfer coefficient, thereby reducing a size of the heat exchanger 511 to enhance economic efficiency.

Sixth Embodiment

Figure 6:
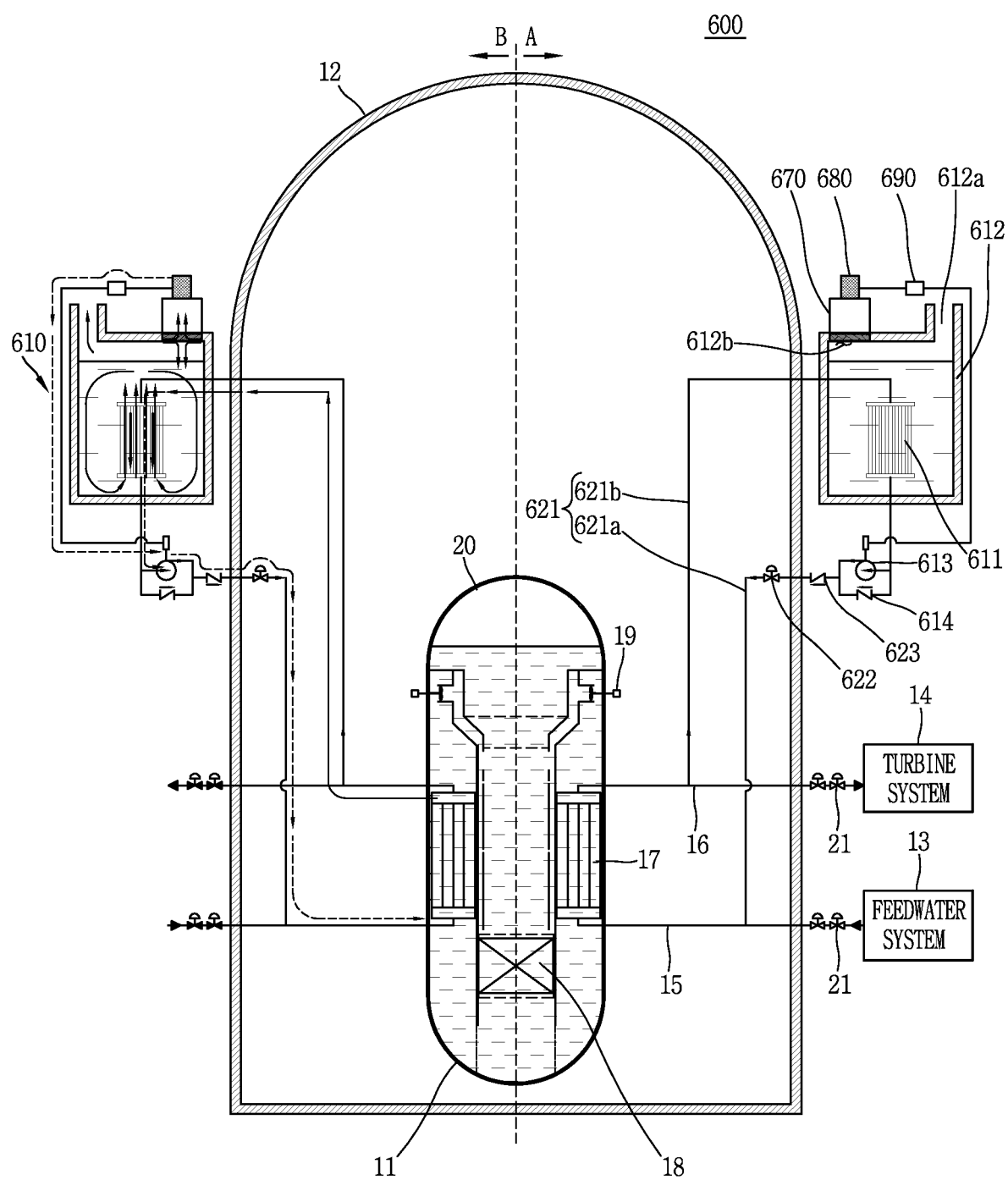
FIG. 6 is a conceptual view illustrating a passive residual heat removal system to which a Stirling engine associated with a sixth embodiment of the present disclosure is applied, and a nuclear power plant having the same.

FIG. 6 is a conceptual view illustrating a passive residual heat removal system 610 to which a Stirling engine 670 according to a sixth embodiment of the present disclosure is applied, and a nuclear power plant 600 having the same.

The Stirling engine 670 according to the sixth embodiment may receive the heat of the emergency cooling water of an emergency cooling water storage section 612 or the heat of steam of the emergency cooling water to generate power. In the sixth embodiment, the description of the same or similar configuration as that of the fifth embodiment will be substituted by the description of the fifth embodiment.

The emergency cooling water storage section 612 may be provided with an emergency cooling water heat exchange unit 612b at an upper end portion thereof to transmit the heat of the emergency cooling water or the heat of steam of the emergency cooling water to the first heat exchange unit 1720 of the Stirling engine 670.

The first heat exchange unit 1720 of the Stirling engine 670 may be immersed in emergency cooling water through the emergency cooling water heat exchange unit 612b or provided within the emergency cooling water storage section 612, and in this case, the heat of the emergency cooling water of the heat of steam of the emergency cooling water may be transferred to the first heat exchange unit 1720 of the Stirling engine 670 and the high-temperature section 1711 of the cylinder 1710.

Furthermore, the emergency cooling water and the steam of the emergency cooling water may transmit heat to the first heat exchange unit 1720 of the Stirling engine 670 disposed at an outside of the emergency cooling water storage section 612 through the emergency cooling water heat exchanger 612b (e.g., pipe) extended from the emergency cooling water storage section 612.

The low-temperature section 1712 of the Stirling engine 670 or the second heat exchange unit 1730 may be exposed to an external environment of the storage portion and cooled.

The steam pipe 621b may be connected to the steam generator 17 and the inlet of the second flow path of the heat exchanger 611 to transfer the steam of the steam generator 17 to the inlet of the second flow path of the heat exchanger 611. In this case, at least part of the steam pipe 621b may pass through a lateral surface of the emergency cooling water storage section 612.

When the heat exchanger 611 is cooled by emergency cooling water as described above, since a heat transfer coefficient of the emergency cooling water is larger than that of air, it may be possible to enhance the heat exchange performance as compared to the air-cooling type heat exchanger 611.

Seventh Embodiment

Figure 7:
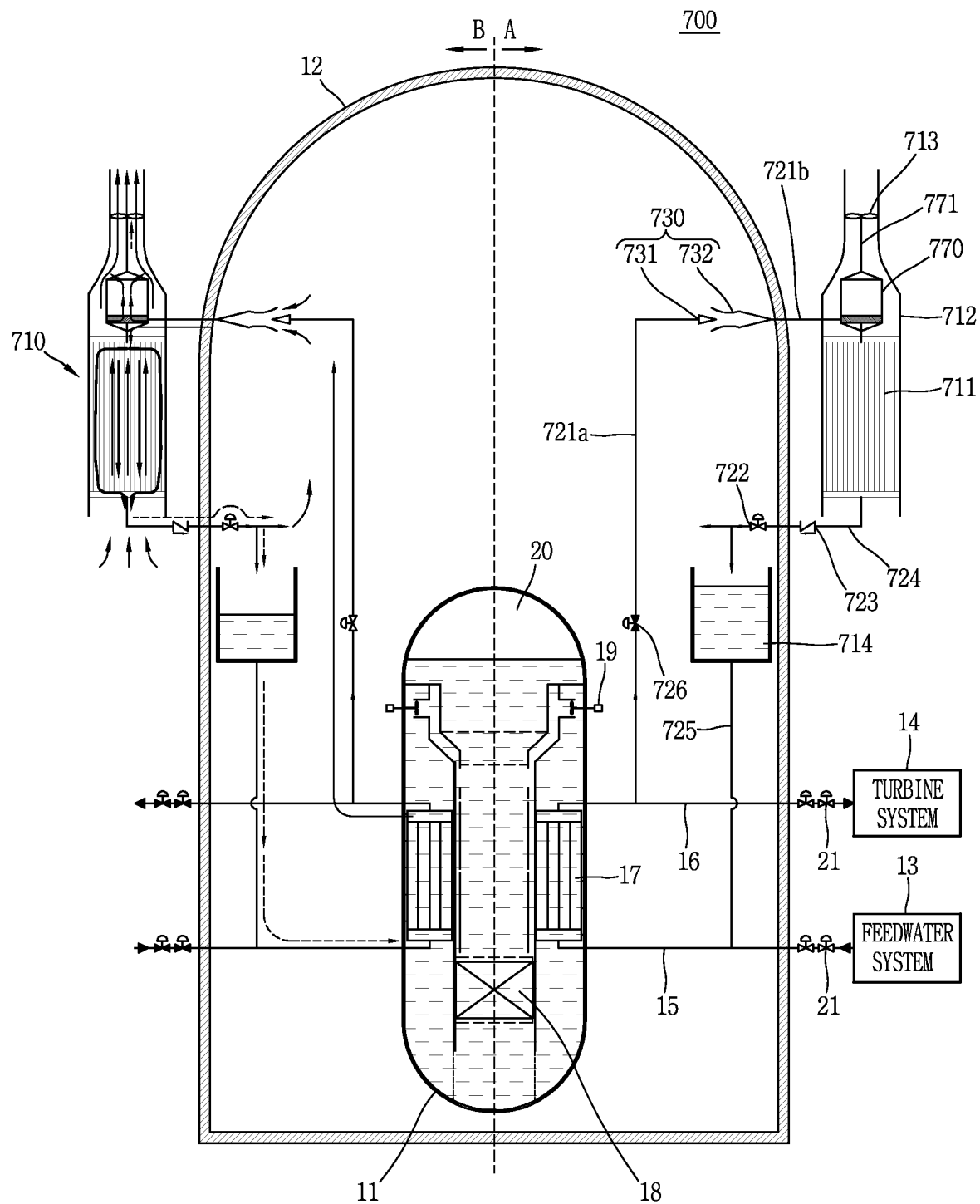
FIG. 7 is a conceptual view illustrating a passive safety system to which a Stirling engine according to a seventh embodiment of the present disclosure is applied, and a nuclear power plant having the same.

FIG. 7 is a conceptual view illustrating a passive residual heat system 710 to which a Stirling engine 770 according to a seventh embodiment of the present disclosure is applied, and a nuclear power plant 700 having the same.

The passive safety system according to the seventh embodiment may include a passive residual heat removal system 710 and a passive containment 12 cooling system.

The passive safety system may include a heat exchanger 711, a heat exchange casing 712, a first connection pipe 721a, a second connection pipe 721b, a circulation induction unit 730, a cooling water connection pipe 724, a first cooling water storage section 714, and a feedwater pipe 725.

The heat exchanger 711 may be provided at an outside of the containment 12. The heat exchanger 711 may be accommodated into the heat exchange casing 712 and cooled by air cooling.

The heat exchange casing 712 may be provided at an outside of the containment 12 in the form of enclosing the heat exchanger 711, and an inlet thereof may be formed at a lower end portion of the heat exchange casing 712 to introduce the external atmosphere of the containment 12 into the casing 712, and an outlet thereof may be formed at an upper end portion of the heat exchange casing 712 to discharge the external atmosphere of the containment 12 to an outside of the casing 712.

A circulation fan 713 may be installed at the outlet of the heat exchange casing 712 to forcibly circulate the external atmosphere of the containment 12 into the heat exchange casing 712.

The circulation fan 713 and the Stirling engine 770 may be provided at an outlet side of the first flow path of the heat exchanger 711 and an inlet side of the second flow path of the heat exchanger 711, respectively.

The circulation fan 713 and the Stirling engine 770 may be provided within the heat exchange casing 712.

The circulation fan 713 may be driven by receiving power from the Stirling engine 770.

The Stirling engine 770 may receive the heat of the passive residual heat removal system and the heat of the passive containment cooling system to generate power.

A lower end portion (one end portion) of the first connection pipe 721a is communicably connected to the inlet of the steam generator 17 to transfer the steam of the steam generator 17 to the Stirling Engine 770, and an upper end portion (the other end portion) thereof is extended in an upper direction up to a predetermined height (the height of the Stirling engine 770) so as to be communicated with the internal atmosphere of the containment 12.

One end portion of the second connection pipe 721b may be formed to be separated from an upper end portion of the first connection pipe 721a in a horizontal direction within the containment 12, and the other end portion thereof may be connected to the first heat exchange unit 1720 of the Stirling engine 770 to transfer a mixed fluid obtained by mixing the steam of the steam generator 17 with the internal atmosphere of the containment 12 to the Stirling engine 770.

The other end portion of the second connection pipe 721b may be connected to an inlet of the second flow path of the heat exchanger 711 through the Stirling engine 770.

The circulation induction unit 730 may include an injection nozzle 731 and an inlet guide 732 so as to forcibly circulate the internal atmospheric circulation of the containment 12.

The injection nozzle 731 may be formed at an upper end portion of the first connection pipe 721a to spray steam rising along the first connection pipe 721a at a high speed.

The inlet guide 732 may be formed at one end portion of the second connection pipe 721b to flow a mixed fluid obtained by mixing the steam injected from the injection nozzle 731 and the internal atmosphere of the containment 12 into the second connection pipe 721b.

The inlet guide 732 may be formed such that an inflow sectional area of the internal atmosphere of the containment 12 gradually increases as it goes from one end portion of the second connection pipe 721b to an upper end portion of the first connection pipe 721a. In this case, the mixed fluid is easily transferred from the first connection pipe 721a to the second connection pipe 721b.

The steam injected at a high speed from the injection nozzle 731 to the second connection pipe 721b may cause the internal atmosphere of the containment 12 to flow into the inlet guide 732 by the principle of a jet pump. As a result, it may be possible to enhance the circulation of the internal atmosphere of the containment 12 through the inlet guide 732 and increase a flow rate and inflow amount of the internal atmosphere of the containment 12.

The cooling water connection pipe 724 is a pipe for transferring at least one of condensed cooling water in the heat exchanger 711 and non-condensed steam or non-condensable gas in the heat exchanger 711 to an inside of the containment 12.

One end portion of the cooling water connection pipe 724 is connected to an outlet side of the second flow path of the heat exchanger 711, and the other end portion of the cooling water connection pipe 724 is communicably connected to an inside of the containment 12. The steam that has flowed into the second flow path of the heat exchanger 711 is cooled and condensed by the external atmosphere of the containment 12 flowing into the first flow path of the heat exchanger 711, and the condensed cooling water and non-condensable gas are transferred to an inside of the containment 12 along the cooling water connection pipe 724.

At least part of the upper portion of the first cooling water storage section 714 may be open, and the first cooling water storage section is a storage tank for storing cooling water to be supplied to the steam generator 17 at an early stage of the accident and storing to supply the condensed cooling water in the heat exchanger 711 to the steam generator 17.

The first cooling water storage section 714 is positioned lower than the heat exchanger 711 to move cooling water by gravity from the heat exchanger 711.

The other end portion of the cooling water connection pipe 724 may be connected to the first cooling water storage section 714 such that cooling water flowing along the cooling water connection pipe 724 is dropped into the first cooling water storage section 714 and stored.

A check valve 723 may be provided on the cooling water connection pipe 724 to prevent the flow backward.

An isolation valve may be provided in a switchable manner on the cooling water connection pipe 724 and the second connection pipe 721b to be opened by an actuation signal in the event of an accident or closed by a related signal when isolation is required.

The cooling water stored in the first cooling water storage section 714 may be used as the feedwater of the steam generator 17.

One end portion of the feedwater pipe 725 is communicably connected to a bottom surface of the first cooling water storage section 714, and the other end portion thereof is communicably connected to the inlet of the steam generator 17.

The first cooling water storage section 714 may be positioned higher than an upper end of the reactor, and the cooling water of the first cooling water storage section 714 is moved downward along the feedwater pipe 725 by gravity and transferred to the inlet of the steam generator 17.

Considering a movement path of the secondary system fluid, the secondary system fluid of the steam generator 17 evaporates due to the heat of the core, and the evaporated steam rises along the first connection pipe 721a. Subsequently, the steam is injected into the inlet guide 732 by the injection nozzle 731 formed at an upper end portion of the first connection pipe 721a. The internal atmosphere of the containment 12 is introduced into the inlet guide 732 by a flow rate of the sprayed steam, and a mixed fluid obtained by mixing the internal atmosphere of the containment 12 with the sprayed steam is transferred to the first heat exchange unit 1720 of the Stirling engine 770 along the second connection pipe 721b. The steam passing through the first heat exchange unit 1720 of the Stirling engine 770 is introduced into an inlet of the second flow path of the heat exchanger 711, and cooled and condensed by the external atmosphere of the containment 12. The cooling water condensed in the heat exchanger 711 is transferred to the steam generator 17 through the first cooling water storage section 714 along the cooling water connection pipe 724.

Considering a movement path of the external atmosphere of the containment 12, the external atmosphere of the containment 12 is introduced into the casing 712 through a lower end inlet of the heat exchange casing 712 by a driving force of the circulation fan 713, and the introduced external atmosphere rises by receiving heat from the steam flowing from the first flow path to the second flow path of the heat exchanger 711, and is discharged to an outside of the heat exchange casing 712 through the circulation fan 713 by receiving heat from the low-temperature section 1712 of the cylinder 1710 through the second heat exchanger 1730 of the Stirling engine 770.

According to the present embodiment, the circulation induction unit 730 may be introduced into the containment 12 to condense and cool the atmosphere within the containment 12 together with the steam of the passive residual heat removal system 710, thereby enhancing atmospheric circulation within the containment 12.

The circulation induction unit 730 according to the present embodiment may be integrated with the passive residual heat removal system 710 using a primary system or secondary system, or may be configured using the steam of an automatic decompression system.

The circulation induction unit 730 illustrated in FIG. 7 illustrates a configuration integrated into the passive residual heat removal system 710 using a secondary system.

Eighth Embodiment

Figure 8:
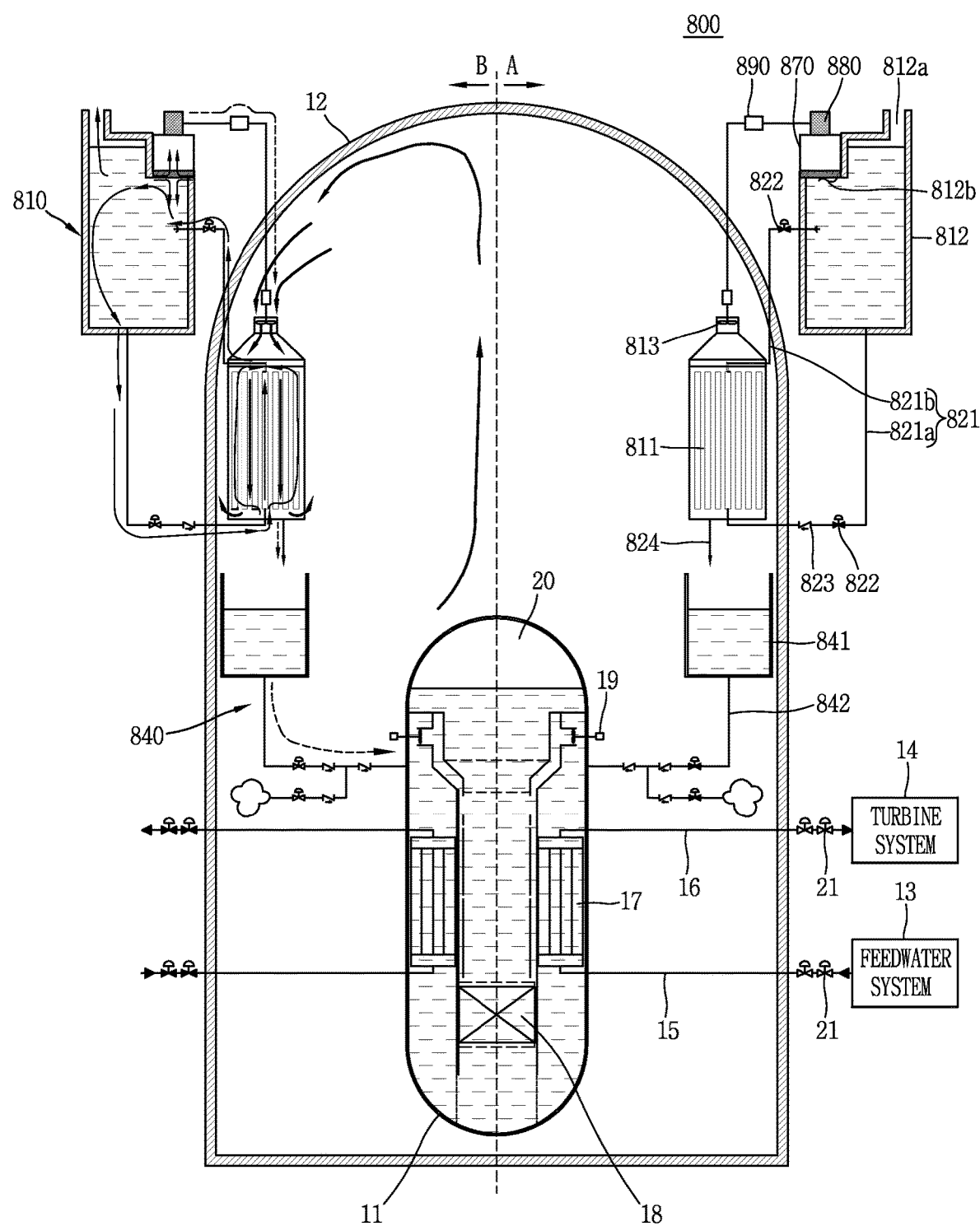
FIG. 8 is a conceptual view illustrating a passive containment cooling system to which a Stirling engine according to an eighth embodiment of the present disclosure is applied, and a nuclear power plant having the same.

FIG. 8 is a conceptual view illustrating a passive containment cooling system 810 to which a Stirling engine 870 according to an eighth embodiment of the present disclosure is applied, and a nuclear power plant 800 having the same.

The nuclear safety system illustrated in FIG. 8 may include a passive containment cooling system 810 for removing heat transferred from the reactor coolant system 11 to an inside of the containment 12, and a passive safety injection system 840 for securely injecting cooling water into the reactor coolant system 11.

In the event of an accident such as a loss of coolant accident or a steam line break accident, steam is discharged into the containment 12 to increase a temperature of the internal atmosphere of the containment 12 and increase an internal pressure. In order to reduce the temperature and pressure of the internal atmosphere of the containment 12, the passive containment cooling system 810 may have various facilities.

For example, the passive containment cooling system 810 may include a heat exchanger 811, an emergency cooling water storage section 812, a first cooling water storage section 841, and the like.

The heat exchanger 811 may be provided at an inside or outside of the containment 12. The heat exchanger 811 may suck and cool the internal atmosphere of the containment 12, and then discharge it to an inside of the containment 12.

The heat exchanger 811 illustrated in FIG. 8 illustrates a shape it is provided within the containment 12.

The heat exchanger 811 may be a water-cooling type heat exchanger 811. The heat exchanger 811 may receive emergency cooling water from the emergency cooling water storage section 812 to cool the internal atmosphere of the storage containment 12.

The heat exchanger 811 may include a circulation fan 813 within an inlet guide portion provided at the upper end portion thereof. The circulation fan 813 sucks the internal atmosphere of the containment 12 into an inlet of the second flow path of the heat exchanger 811 and then discharges it to an outlet of the second flow path to provide forced flow of the circulation of the internal atmosphere of the containment 12. At this time, an upper end portion of the inlet guide portion is formed to have a relatively small sectional area as compared to a lower end portion thereof to mount the circulation fan 813 so as to increase a suction flow rate of the internal atmosphere of the containment 12. The cross-sectional area of a lower end portion of the inlet guide portion gradually increases as it goes from an upper end portion thereof to a lower end portion thereof to evenly distribute the introduced internal atmosphere of the containment 12 to the inlet of the second flow path of the heat exchanger 811.

The emergency cooling water storage section 812 is provided at an outside of the containment 12. The emergency cooling water storage section 812 stores emergency cooling water therein. The emergency cooling water storage section 812 is disposed at a higher position than the heat exchanger 811 to supply emergency cooling water into the heat exchanger 811 by gravity. The emergency cooling water storage section 812 may receive steam evaporated from the heat exchanger 811 or emergency cooling water whose temperature has risen to cool it. The emergency cooling water may be evaporated by receiving heat from the heat exchanger 811, and in this case, the steam of the emergency cooling water may be discharged through the steam outlet 812a formed at an upper end portion of the emergency cooling water storage section 812.

The heat exchanger 811 and the emergency cooling water storage section 812 may be connected by a circulation pipe 821. The circulation pipe 821 forms a flow path of the cooling fluid circulating between the heat exchanger 811 and the emergency cooling water storage section 812. The circulation pipe 821 may include a discharge pipe 821b and a supply pipe 821a. One end portion of the supply pipe 821a is connected to a bottom surface of the emergency cooling water storage section 812, and the other end portion of the supply pipe 821a is connected to an inlet of the first flow path of the heat exchanger 811. As a result, emergency cooling water moves downward along the supply pipe 821a and is uniformly distributed to the inlet of the first flow path of the heat exchanger 811. An isolation valve 822 is provided on at least part of the supply pipe 821a to switch the flow path of the emergency cooling water flowing along the supply pipe 821a. Furthermore, one end portion of the discharge pipe 821b is connected to an outlet of the first flow path of the heat exchanger 811, and the other end portion of the discharge pipe 821b is communicatively connected to an inside of the emergency cooling water storage section 812 through the emergency cooling water storage section 812. Accordingly, as the emergency cooling water receives the heat of the internal atmosphere of the containment 12 in the heat exchanger 811 to evaporate or increase the temperature, the emergency cooling water may rise along the discharge pipe 821b and flow into the emergency cooling water storage section 812. An isolation valve 822 may be provided on at least part of the discharge pipe 821b to switch the flow path of the discharge pipe 821b.

Considering a movement path of the circulating fluid, the emergency cooling water is introduced into an inlet of the first flow path of the heat exchanger 811 from the emergency cooling water storage section 812 through the supply pipe 821a and then heated and evaporated by receiving heat from the internal atmosphere of the containment 12 from the heat exchanger 811, the cooling water or evaporated steam heated in the heat exchanger 811 is circulated to the emergency cooling water storage section 812 through the discharge pipe 821b. The circulating fluid is circulated until a sufficient density difference required for circulation disappears. In this case, the cooling water in the emergency cooling water storage section 812 is circulated until it becomes exhausted.

Considering a movement path of the internal atmosphere of the containment 12, the internal atmosphere of the containment 12 is introduced to an inlet guide portion of the heat exchanger 811 by a driving force due to natural convection and circulation power due to the circulation fan 813, and the introduced internal atmosphere of the containment 12 is distributed to an inlet of the second flow path of the heat exchanger 811, and cooled and condensed by emergency cooling water flowing into an inlet of the first flow path, and the condensed cooling water is moved downward and stored in the first cooling water storage section 841. Then, non-condensable gas that has cooled down while flowing along the second flow path of the heat exchanger 811 is discharged into the internal atmosphere of the containment 12 from an outlet of the second flow path. As a result, the internal atmosphere of the containment 12 may be cooled by transferring heat to the circulating fluid, and the steam discharged into the containment 12 may be condensed, thereby reducing the internal pressure of the containment 12.

The passive safety injection system 840 may include a cooling water return pipe 824, a first cooling water storage section 841, and a cooling water injection pipe 842.

The first cooling water storage section 841 has a storage space for storing cooling water therein, and is disposed at a lower position than the heat exchanger 811, and at least part of the upper portion thereof can be open.

The cooling water stored in the first cooling water storage section 841 may be used for long-term safety injection by gravity when a pressure within the reactor coolant system 11 and the containment 12 reaches a pseudo-equilibrium state as the safety system (not shown) is operated after an accident.

One end portion of the cooling water return pipe 824 is connected to an outlet of the second flow path of the heat exchanger 811, and the other end portion of the cooling water return pipe 824 is communicatively connected to an opening portion of the first cooling water storage section 841. As a result, the cooling water condensed in the heat exchanger 811 is returned to the first cooling water storage section 841.

The Stirling engine 870 may be mounted on an upper end portion of the emergency cooling water storage section 812 to receive the heat of the emergency cooling water and the heat of steam of the emergency cooling water to generate power.

The first heat exchange unit 1720 of the Stirling engine 870 may receive heat through the emergency cooling water heat exchange unit 812b provided at an upper end portion of the emergency cooling water storage portion 812.

The first heat exchange unit 1720 of the Stirling engine 870 is inserted into the emergency cooling water storage section 812 through the emergency cooling water heat exchange unit 812b, and the emergency cooling water and the steam of the emergency cooling water is directly brought into contact with the first heat exchange unit 1720 to allow heat transfer through heat exchange.

In addition, the first heat exchange unit 1720 of the Stirling engine 870 may be provided at an outside of the emergency cooling water storage section 812. In this case, the emergency cooling water heat exchange unit 812b is provided as a pipe extended outward from the emergency cooling water storage section 812 to transfer the heat of the emergency cooling water or the heat of steam of the emergency cooling water to the first heat exchange unit 1720.

The second heat exchange portion of the Stirling engine 870 may be exposed to an external environment of the containment 12 to release heat at the low-temperature section of the cylinder.

The power of the Stirling engine 870 is converted into electric energy by the generator 880, and the electric energy of the generator 880 may be used to drive the circulation fan 813. The surplus electrical energy may also be charged to the charger 890.

According to the present embodiment, when a loss of coolant accident occurs, safety injection is carried out by the passive safety injection system 840 to maintain a water level of the reactor coolant system 11 including the core 18.

Furthermore, when the circulation fan 813 is driven by power or electricity obtained through the Stirling engine 870 and used for internal air circulation of the containment 12, a flow rate of the internal atmosphere of the containment 12 may be increased to increase a heat transfer coefficient, and the performance of the heat exchanger may be enhanced by excluding the influence of non-condensable gas, thereby reducing a size of the heat exchanger 811 as well as alleviating an installation space and load problem within the containment 12.

Furthermore, when an accident occurs in which the internal pressure of the storage containment 12 rises, such as a loss of coolant accident or steam line break accident, the passive containment cooling system 810 may be operated together with the passive safety injection system 840 to prevent an internal pressure of the containment 12 from rising.

Ninth Embodiment

Figure 9:
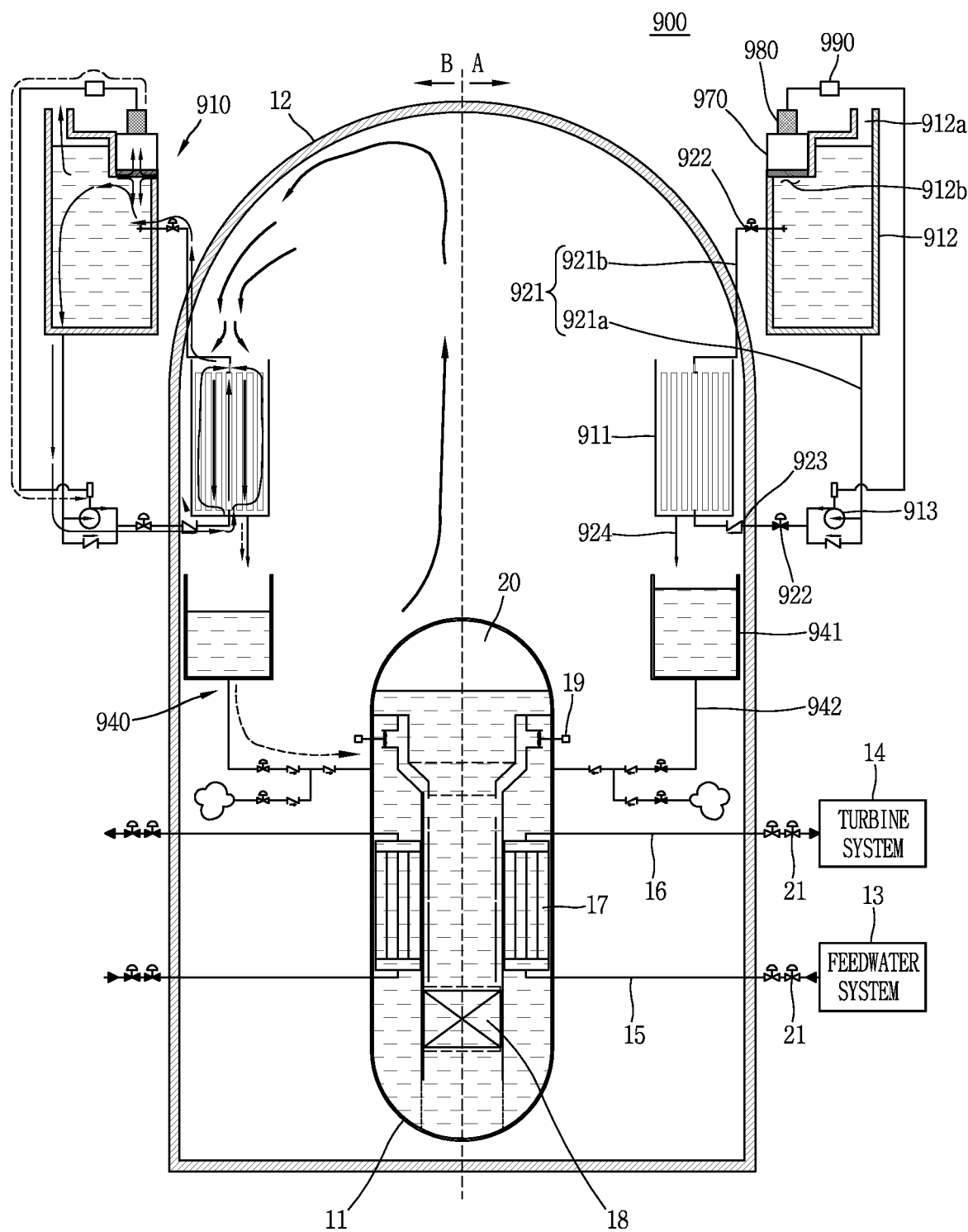
FIG. 9 is a conceptual view illustrating a passive containment cooling system to which a Stirling engine associated with a ninth embodiment of the present disclosure is applied, and a nuclear power plant having the same.

FIG. 9 is a conceptual view illustrating a passive containment cooling system 910 to which a Stirling engine 970 according to a ninth embodiment of the present disclosure is applied, and a nuclear power plant 900 having the same.

Power generated by the Stirling engine 970 illustrated in FIG. 9 may be used as a power source for driving a circulation pump 913 after being converted into electric energy through power generation. Other configurations are the same as or similar to those of the eighth embodiment described above and thus the description thereof will be omitted for clarity of explanation.

However, in the ninth embodiment, an inlet of the second flow path of the heat exchanger 911 may be exposed to the internal atmosphere of the containment 12, and thus the circulation fan illustrated in FIG. 8 may be omitted. In this case, the internal atmosphere of the containment 12 may be introduced into the inlet of the second flow path of the heat exchanger 911 by a driving force due to natural convection.

The circulation pump 913 may be provided on a supply pipe 921a to forcibly circulate emergency cooling water to an inlet of the first flow path of the heat exchanger 911. An isolation valve 922 may be provided on a downstream side supply pipe 921a of the circulation pump 913 to switch the flow path of the emergency cooling water. A bypass line is provided in parallel with the circulation pump 913 on the supply pipe 921a, and when the circulation pump 913 is not driven, emergency cooling water may be bypassed without passing through the circulation pump 913 at an upstream side of the circulation pump 913. The circulation pump 913 may include a driving motor and be driven by a driving motor. The driving motor may be driven by receiving electric energy produced by the Stirling engine 970 or power from the charger.

Tenth Embodiment

Figure 10:
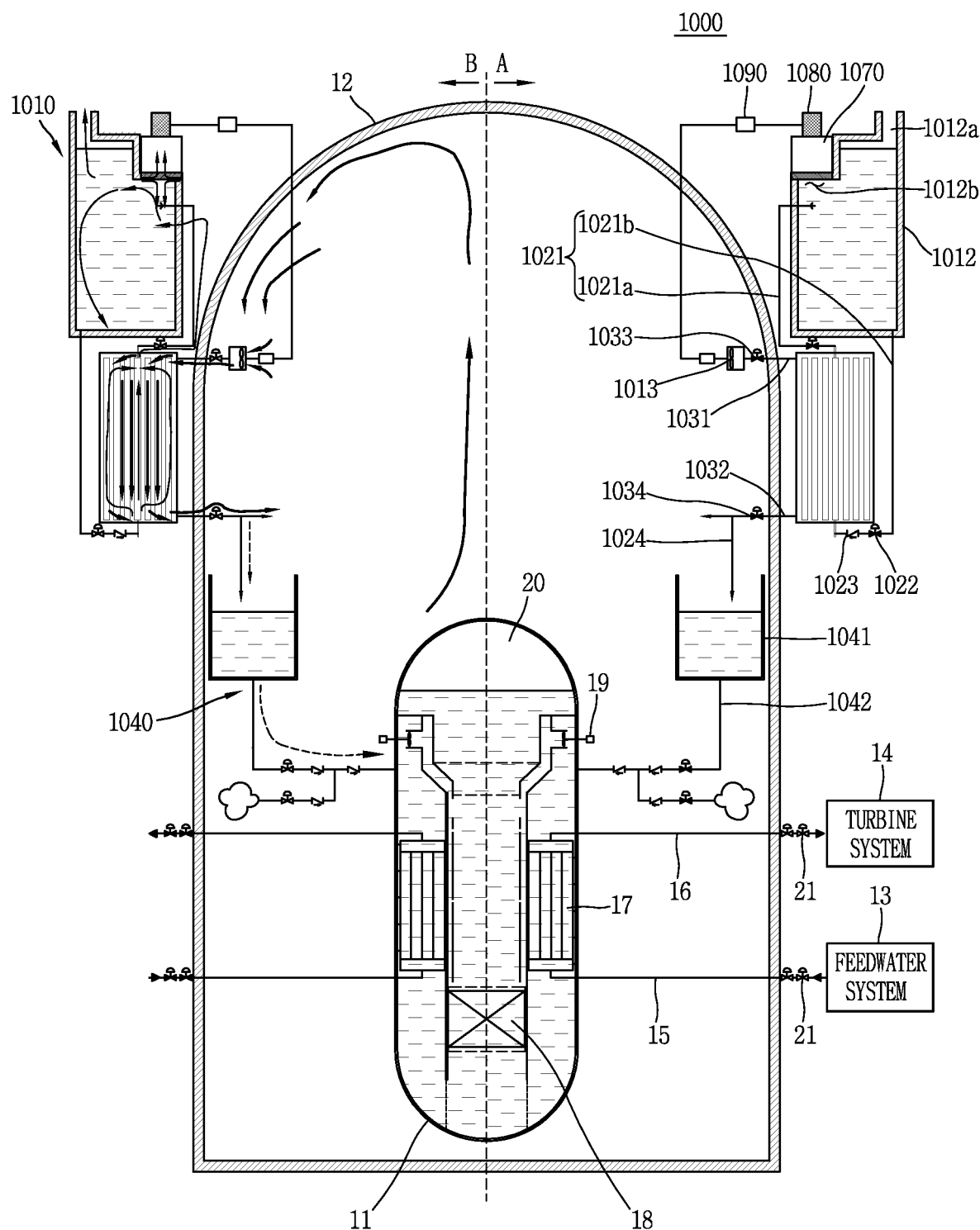
FIG. 10 is a conceptual view illustrating a passive containment cooling system to which a Stirling engine associated with a tenth embodiment of the present disclosure is applied, and a nuclear power plant having the same.

FIG. 10 is a conceptual view illustrating a passive containment cooling system 1010 to which a Stirling engine 1070 according to a tenth embodiment of the present disclosure is applied, and a nuclear power plant 1000 having the same.

Power generated in the Stirling engine 1070 illustrated in FIG. 10 may be used to drive a circulation fan 1013 for circulating the internal atmosphere of the containment 12 and supplying internal atmosphere into the containment 12. The containment 12 illustrated in FIG. 10 illustrates a shape provided at an outside of the containment 12. The other configurations are the same as or similar to those of the ninth embodiment described above, and thus the description thereof will be omitted for clarity of explanation.

However, in the tenth embodiment, emergency cooling water is supplied to the containment 12 by gravity, and thus the circulation pump illustrated in FIG. 9 will be omitted.

The containment 12 may include a first containment connection pipe 1031 and a second containment connection pipe 1032 to receive the internal atmosphere of the containment 12.

One end portion of the first containment connection pipe 1031 may be communicably connected to an inside of the containment 12, and the other end portion thereof may be connected to an inlet of the second flow path of the containment 12. As a result, the internal atmosphere of the containment 12 may be introduced into the inlet of the second flow path of the containment 12 along the first containment connection pipe 1031.

One end portion of the second containment connection pipe 1032 may be connected to an outlet of the second flow path of the containment 12, and the other end portion thereof may be communicably connected to an inside of the containment 12. As a result, cooling water that has been cooled and condensed in the containment portion 12 may be stored in the first cooling water storage section disposed within the containment portion 12. In addition, non-condensable gas may be cooled in the containment 12 and then discharged into the internal atmosphere of the containment 12.

The circulation fan 1013 may be provided at one end portion of the first containment connection pipe 1031 to provide a circulation power to the internal atmosphere of the containment 12.

The circulation fan 1013 may be driven by directly receiving power generated by the Stirling engine 1070 or receiving electrical energy converted using the power.

The circulation fan 1013 illustrated in FIG. 10 illustrates a shape driven by receiving the converted electric energy using the power. In this case, the electric energy is energy charged to the charger 1090, and when electric energy is supplied from the charger 1090, more stable electricity may be supplied, thereby ensuring the reliability and safety of the operation of the circulation fan 1013.

As a result, circulation power may be provided to the internal atmosphere of the containment 12 using the circulation fan 1013, it may be possible to solve a problem of size increase or flow path resistance increase of a flow path side heat exchanger within the containment 12 of the passive containment cooling system 1010 with a low heat transfer coefficient, thereby greatly contributing to the performance enhancement and downsizing of the passive containment cooling system 1010.

Eleventh Embodiment

Figure 11:
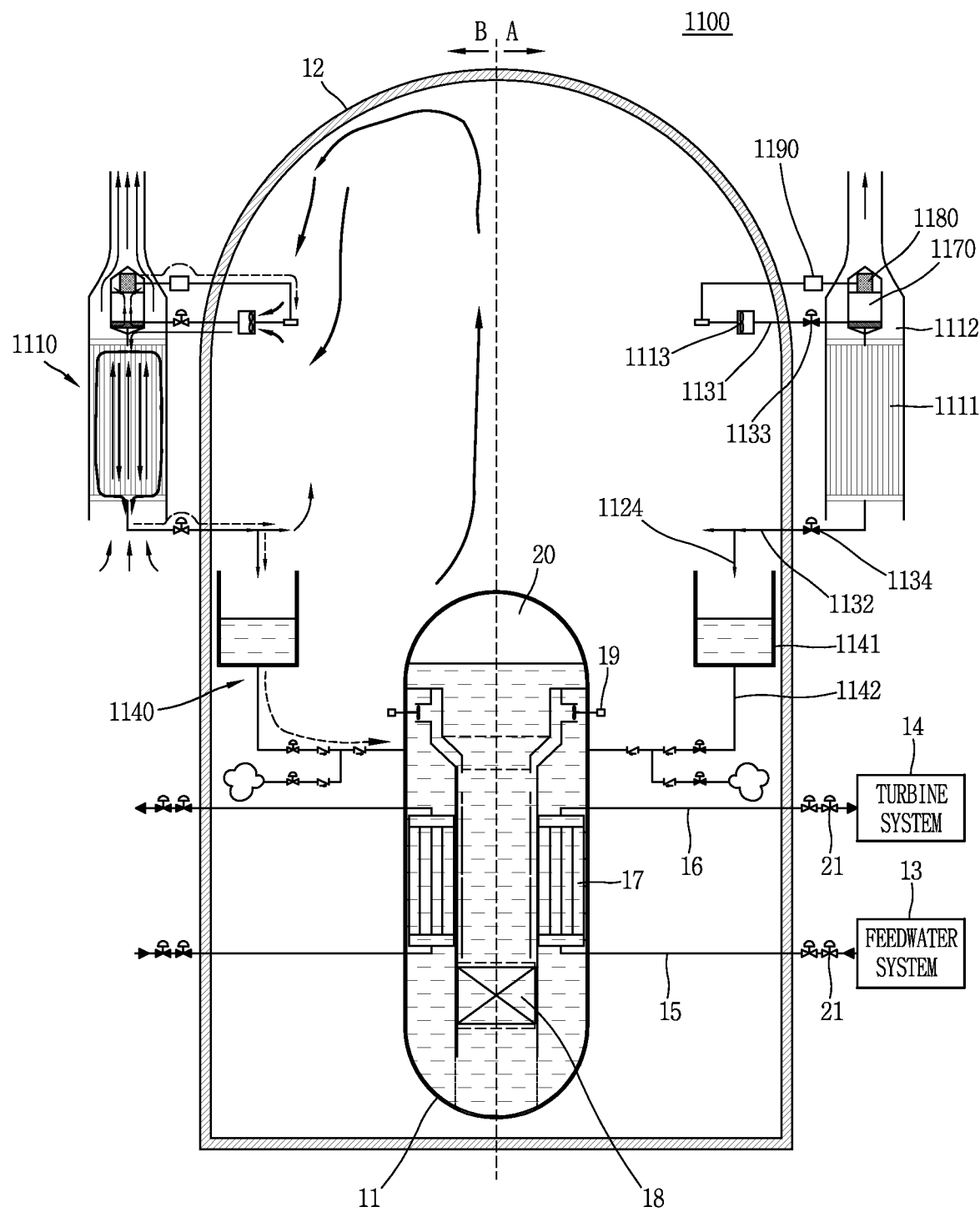
FIG. 11 is a conceptual view illustrating a passive containment cooling system to which a Stirling engine associated with an eleventh embodiment of the present disclosure is applied, and a nuclear power plant having the same.

FIG. 11 is a conceptual view illustrating a passive containment cooling system 1110 to which a Stirling engine 1170 according to an eleventh embodiment of the present disclosure is applied, and a nuclear power plant 1100 having the same.

The passive containment cooling system 1110 according to the eleventh embodiment may cool the internal atmosphere of the containment 12 using an air-cooling type heat exchanger 1111.

The air-cooling type heat exchanger 1111 may be provided so as to be accommodated into a heat exchange casing 1112.

The heat exchange casing 1112 is configured to surround the heat exchanger 1111. An inlet is formed at a lower end portion of the heat exchange casing 1112, and an outlet is formed at an upper end portion of the heat exchange casing 1112. As a result, the heat exchange casing 1112 guides the external atmosphere of the containment 12 to an inlet of the first flow path of the heat exchanger 1111. Furthermore, at least part of the outlet of the heat exchange casing 1112 may be formed to be relatively smaller in cross-sectional area and relatively higher in height than the inlet, thereby enhancing the cooling performance of the air-cooling type heat exchanger 1111 by a chimney effect.

The air-cooling type heat exchanger 1111 has an advantage capable of unlimitedly receiving a cooling fluid, namely, the external atmosphere of the containment 12, to use it without additional cooling water makeup as compared to the water-cooling type heat exchanger.

The air-cooling type heat exchanger 1111 may be provided with a first containment connection pipe 1131, a second containment connection pipe 1132 and a circulation fan 1113 so as to receive the internal atmosphere of the containment 12. The first and second containment connection pipe 1131, 1132 and the circulation fan 1113 illustrated in FIG. 11 are the same as or similar to those of the tenth embodiment, and thus the description thereof will omitted for clarity of explanation.

However, the first containment connection pipe 1131 is connected to an inlet of the second flow of the heat exchanger 1111 through the first heat exchange unit 1720 of the Stirling engine 1170 within the containment 12.

The Stirling engine 1170 may be provided within the heat exchange casing 1112. In particular, the Stirling engine 1170 may be provided at the outlet side of the first flow path of the heat exchanger 1111 and at the inlet side of the second flow path of the heat exchanger 1111. The outlet of the first flow path and the inlet of the second flow path are located at an upper end portion of the heat exchanger 1111.

The Stirling engine 1170 may receive the heat of the internal atmosphere of the containment 12 flowing along the first containment connection pipe 1131 through the first heat exchange unit 1720 to generate power.

The circulation fan 1113 may be driven by directly using power generated by the Stirling engine 1170 or by receiving power obtained through the generation of the power.

The circulation fan 1113 illustrated in FIG. 11 illustrates a shape in which it is driven by receiving power obtained by the generation of the power.

Considering a movement path of the internal atmosphere of the containment 12, the internal atmosphere of the containment 12 may be circulated by the circulation fan 1113 to the second flow path of the heat exchanger 1111 along the first containment connection pipe 1131, and cooled and condensed by a cooling fluid introduced into the first flow path of the heat exchanger 1111, namely, the external atmosphere of the containment portion 12, and the condensed cooling water is moved downward along the second containment connection pipe 1132 and stored in the first cooling water storage section 1141 disposed within the containment 12, and then securely injected into the reactor coolant system 11 when a pressure within the containment 12 and a pressure within the containment 12 are in equilibrium. Non-condensable gas cooled and moved downward in the second flow path of the heat exchanger 1111 flows along the second containment connection pipe 1132 and then is discharged to the internal atmosphere of the containment 12 through a manifold branched from the second containment connection pipe 1132.

Considering a movement path of the external atmosphere of the containment 12, the external atmosphere of the containment 12 is introduced into an inlet of the first flow path of the heat exchanger 1111 through an inlet of the heat exchange casing 1112. Then, the external atmosphere of the containment 12 introduced into the first flow path of the heat exchanger 1111 receives the heat of the internal atmosphere of the containment 12 flowing into the second flow path of the heat exchanger 1111 rises along the first flow path. Subsequently, the external atmosphere of the raised containment 12 is discharged from the heat exchanger 1111 through the outlet of the first flow path, and discharged to an external environment of the containment 12 through the outlet of the heat exchange casing 1112 by way of the second heat exchange section of the Stirling engine 1170.

Since the external atmospheric circulation of the containment 12 is generated by a natural phenomenon due to a density difference by receiving the heat of the internal atmosphere of the containment 12 introduced into the second flow path of the heat exchanger 1111, it continues until the heat of the internal atmosphere of the containment 12 is removed and the density difference required for circulating the circulating fluid disappears.

Twelfth Embodiment

Figure 12:
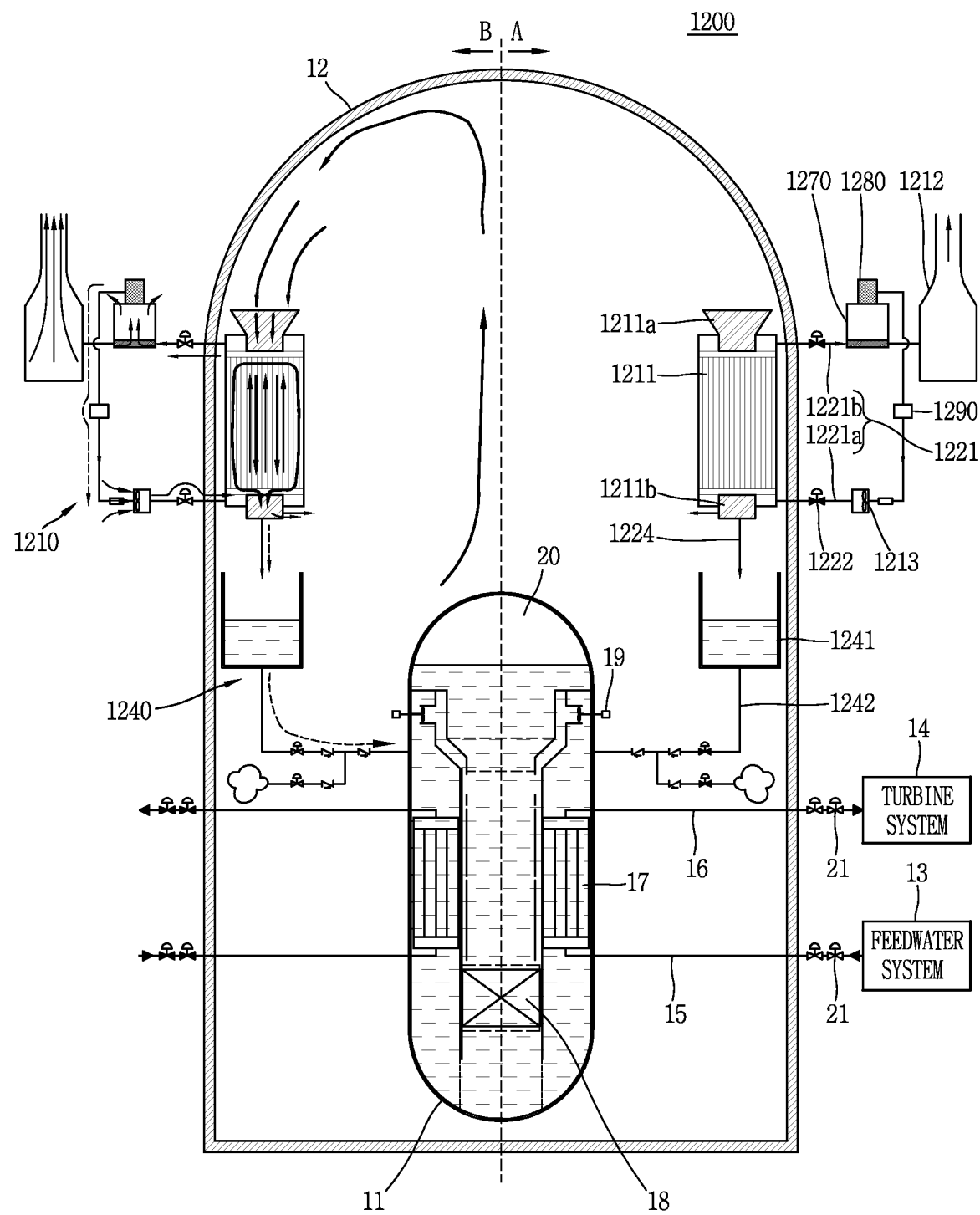
FIG. 12 is a conceptual view illustrating a passive containment cooling system to which a Stirling engine associated with a twelfth embodiment of the present disclosure is applied, and a nuclear power plant having the same.

FIG. 12 is a conceptual view illustrating a passive containment cooling system 1210 to which a Stirling engine 1270 according to a twelfth embodiment of the present disclosure is applied, and a nuclear power plant 1200 having the same.

The passive containment cooling system 1210 may include an air-cooling type heat exchanger 1211 and a heat exchange casing 1212.

The air-cooling type heat exchanger 1211 illustrated in FIG. 12 is provided within the containment 12 to receive the external atmosphere of the containment 12 to cool the internal atmosphere of the containment 12. An inlet guide portion 1211a is formed at an inlet side of the second flow path of the air-cooling type heat exchanger 1211 to have a large cross-sectional area within the containment 12 to guide the inflow of the internal atmosphere of the containment 12. At this time, a lower portion of the inlet guide portion 1211a may be formed to have a smaller cross-sectional area than an upper end portion thereof, thereby increasing an atmosphere inflow amount within the containment 12. Furthermore, an outlet guide portion 1211b may be formed on an outlet side of the second flow path of the heat exchanger 1211 to extend to an inside of the containment 12 so as to guide the internal atmosphere outflow of the containment 12.

The heat exchange casing 1212 illustrated in FIG. 12 is provided at an outside of the containment 12 and has an outlet and an inlet formed at an upper and lower end portions of the heat exchange casing 1212, respectively, and thus the external atmosphere of the containment 12 may be discharged to an outside of the heat exchange casing 1212 through an inside of thereof.

Furthermore, the heat exchange casing 1212 may receive and discharge the heated external atmosphere of the containment 12 from the heat exchanger 1211.

The air-cooling type heat exchanger 1211 is provided with a first external atmosphere connection pipe 1221a to receive the external atmosphere of the containment 12. One end portion of the first external atmosphere connection pipe 1221a may communicably connected to an outside of the containment 12 and the other end portion thereof may be connected to an inlet of the first flow of the heat exchanger 1211. As a result, the external atmosphere of the containment 12 may be introduced into the inlet of the first flow path of the heat exchanger 1211 along the first external atmosphere connection pipe 1221a.

Furthermore, the air-cooling type heat exchanger 1211 is provided with a second external atmosphere connection pipe 1221b to transfer the external atmosphere of the containment 12 heated by the heat exchanger 1211 to the heat exchange casing 1212. One end portion of the second external atmosphere connection pipe 1221b is connected to an outlet of the first flow path of the heat exchanger 1211, and the other end portion thereof is communicably connected to an inside of the heat exchange casing 1220 by way of the first heat exchange unit 1720 of the Stirling engine 1270. Due to this, the external atmosphere of the containment 12 heated by the heat exchanger 1211 may be transferred to the heat exchange casing 1212 by way of the first heat exchange unit 1720 of the Stirling engine 1270. As a result, the Stirling engine 1270 may generate power by receiving the heat of the heated external atmosphere of the containment 12 flowing along the second external atmosphere connection pipe 1221b.

The circulation fan 1213 may be provided at one end portion of the first external atmosphere connection pipe 1221a to provide circulation power to the external atmosphere of the containment 12.

The circulation fan 1213 may be driven by directly receiving power generated by the Stirling engine 1270 or receiving electrical energy converted using the power.

The circulation fan 1213 illustrated in FIG. 12 illustrates a shape in which it is driving by receiving electrical energy converted using the power of the Stirling engine 1270. Stable power supply may be maintained when the electric energy is supplied to the circulation fan 1213 after being charged to the charger.

Considering the internal atmosphere of the containment 12, the internal atmosphere of the containment 12 is introduced into an inlet of the second flow path of the heat exchanger 1211 through the inlet guide portion 1211a of the heat exchanger 1211, and cooled and condensed by the external atmosphere of the containment 12 introduced into the first flow path of the heat exchanger 1211, and the condensed cooling water is stored in the first cooling water storage section provided within the containment 12. Non-condensable gas cooled down in the second flow path of the heat exchanger 1211 is discharged to an inside of the containment 12 through the outlet guide portion 1211b formed at an outlet of the second flow path.

Considering a movement path of the external atmosphere of the containment 12, the external atmosphere of the containment 12 is introduced into the first external atmosphere connection pipe 1221a by the circulation fan 1213, and introduced into the heat exchanger 1211 along the first external atmosphere connection pipe 1221a. Subsequently, a temperature of the external atmosphere of the containment 12 introduced into the first flow path of the heat exchanger 1211 increases by receiving heat from the internal atmosphere of the containment 12 introduced into the second flow path of the heat exchanger 1211, and the heated external atmosphere rises along the first flow path by a density difference. The external atmosphere of the containment 12 heated in the first flow path is passed through the first heat exchange unit 1720 of the Stirling engine 1270 along the second external atmosphere connection pipe 1221b by way of the outlet of the first flow path, and then discharged into an inside of the heat exchange casing 1212. In this embodiment, the heat exchange casing 1212 is provided to increase a circulating flow rate, but a general duct type may be also used, and the heat exchange casing 1212 may not be necessarily provided.

Accordingly, when power and electricity generated from the Stirling engine 1270 are used as a power source for circulating the external atmosphere of the containment 12 to an inside of the heat exchanger 1211, the heat of the passive containment cooling system 1210 may be rapidly cooled as an inflow rate of the circulating fluid increases, and as a result, a driving force of the passive containment cooling system 1210 increases.

Thirteenth Embodiment

Figure 13A:
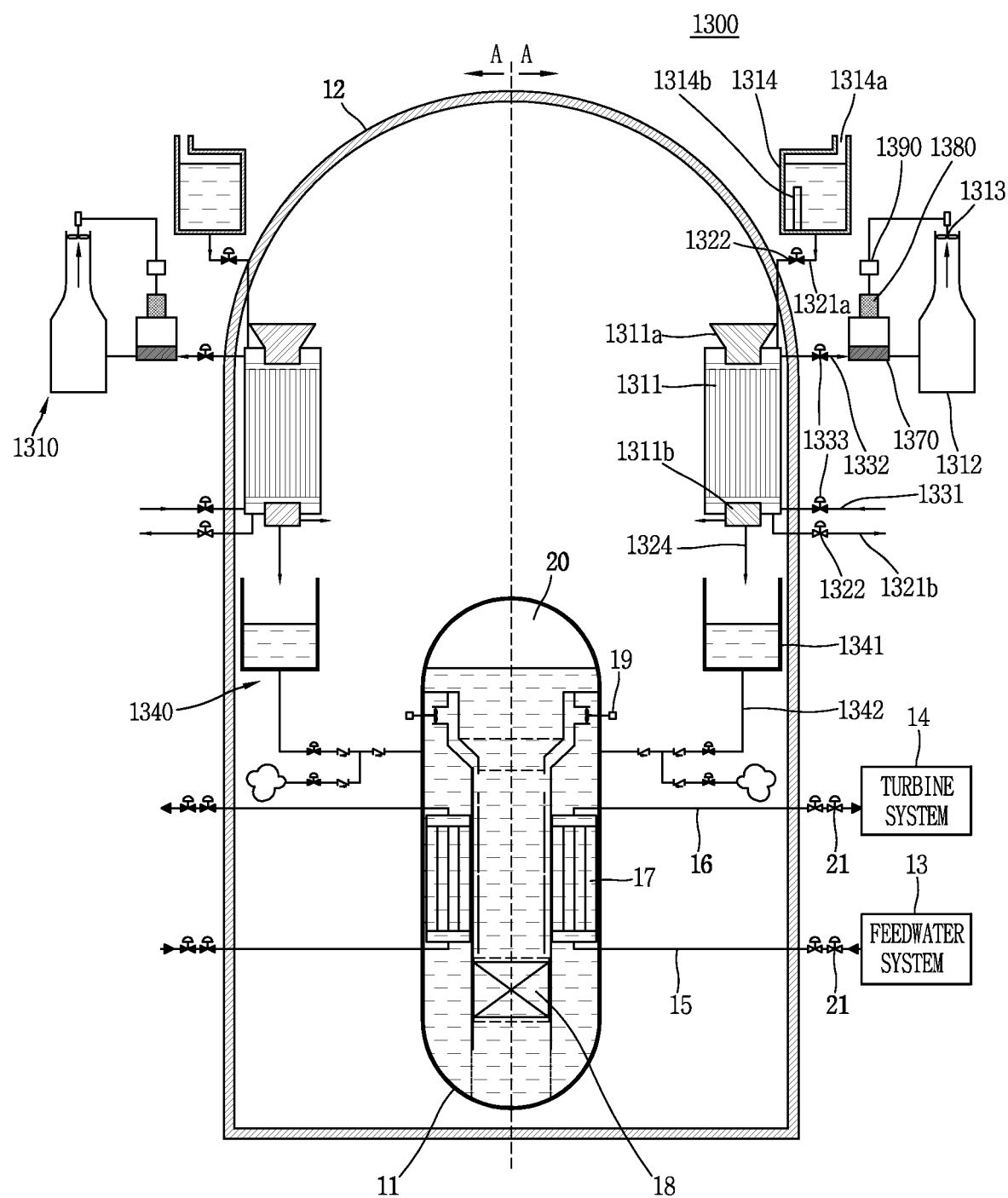
FIG. 13A is a conceptual view illustrating a passive containment cooling system to which a Stirling engine associated with a thirteenth embodiment of the present disclosure is applied during a normal operation, and a nuclear power plant having the same.

FIG. 13A is a conceptual view illustrating a passive containment cooling system 1310 to which a Stirling engine 1370 according to a thirteenth embodiment of the present disclosure is applied during normal operation, and a nuclear power plant 1300 having the same. FIG. 13 is a conceptual view illustrating the operation of a passive containment cooling system 1310 to which a Stirling engine 1370 according to a thirteenth embodiment of the present disclosure is applied in the event of an accident, and a nuclear power plant 1300 having the same.

Figure 13B:
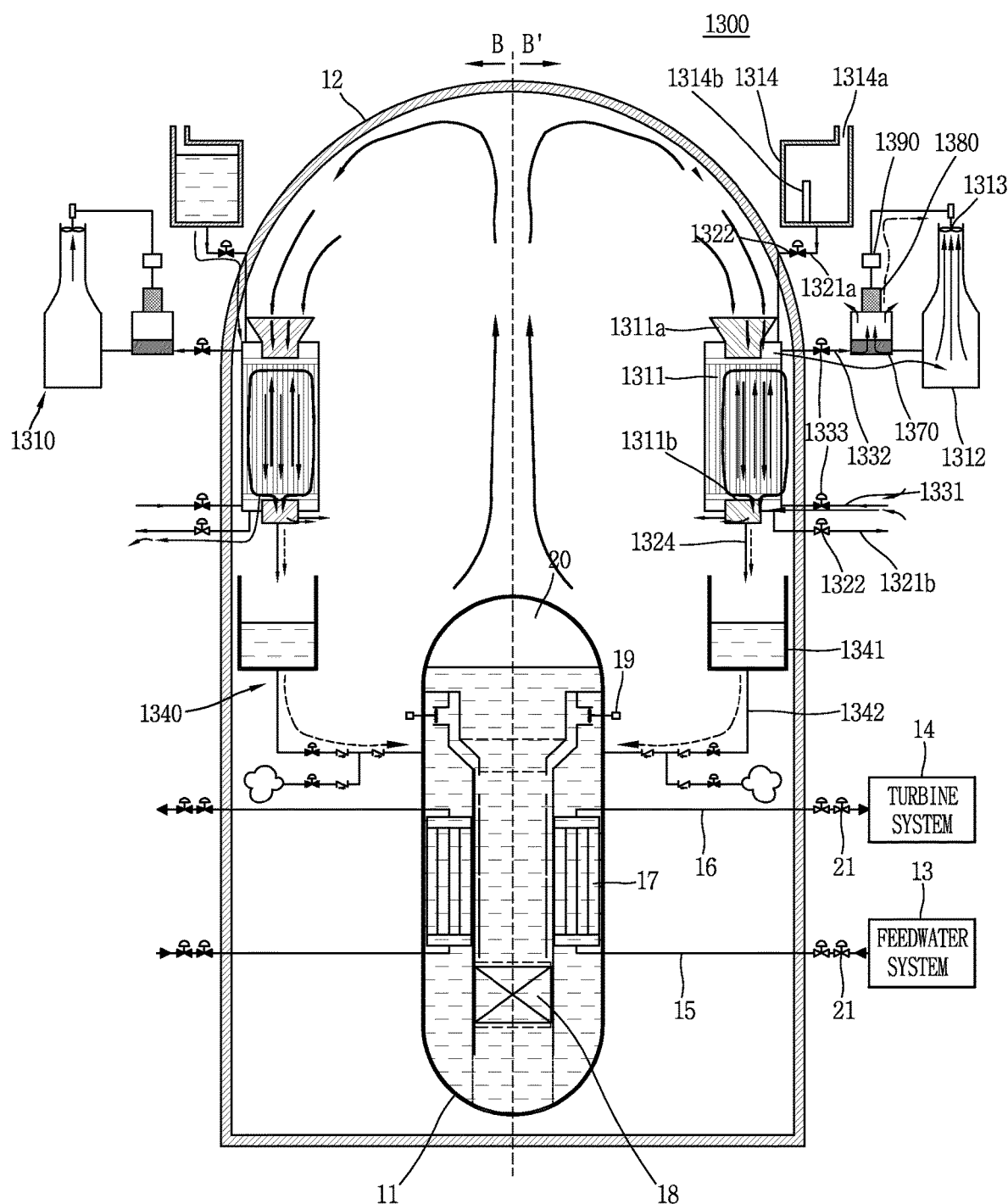
FIG. 13B is a conceptual view illustrating a passive containment cooling system to which a Stirling engine associated with a thirteenth embodiment of the present disclosure is applied in the event of an accident, and a nuclear power plant having the same.

The passive containment cooling system 1310 illustrated in FIGS. 13A and 13B may include a mixed-type heat exchanger 1311 and an emergency cooling water storage section 1314. The other configurations are the same as or similar to those of the twelfth embodiment, and thus the description thereof will be omitted for clarity of explanation.

In FIG. 13B, the left side (direction of arrow B) with respect to the reactor coolant system 11 illustrates an operating state of the passive containment cooling system 1310 in an early stage of an accident, and the right side (direction of arrow B') illustrates an operating state of the passive containment cooling system 1310.

The mixed-type heat exchanger 1311 is provided within the containment 12 to cool the internal atmosphere of the containment 12 by water and air.

In case of the water-cooling or air-cooling type heat exchanger 1311, emergency cooling water or the external atmosphere of the containment 12 may be introduced into the first flow path of the heat exchanger 1311, but in case of the mixed-type heat exchanger 1311, the cooling water and the external atmosphere of the heat exchanger 12 may be selectively introduced into the first flow path of the heat exchanger 1311.

In addition, the emergency cooling water and the external atmosphere of the containment 12 may be simultaneously supplied to the first flow path of the heat exchanger 1311 to enhance heat exchange performance. However, in this case, the first flow path of the heat exchanger 1311 should be separately formed into an emergency cooling water flow path and an external air flow path of the containment 12, thereby increasing a size of the heat exchanger 1311.

The mixed-type heat exchanger 1311 may receive the external atmosphere of the containment 12 through the first external atmosphere connection pipe 1331, and transfer external atmosphere heated through the second external atmosphere connection pipe 1332 to the heat exchange casing 1312.

The heat exchange casing 1312 illustrated in FIGS. 13A and 13B is provided with a circulation fan 1313 at an outlet side formed at an upper end portion of the casing to transfer circulation power to the external atmosphere of the containment 12 passing through the heat exchange casing 1312, and thus the circulation fan 1313 provided in the first external atmosphere connection pipe 1331 in FIG. 12 may be omitted.

The emergency cooling water storage section 1314 may be provided at an outside of the containment 12 to be positioned higher than an upper end portion of the heat exchanger 1311 to introduce emergency cooling water into an inlet of the first flow of the heat exchanger 1311 by gravity.

The emergency cooling water may be supplied from an emergency cooling water storage section 1314 to the heat exchanger 1311 by an emergency cooling feedwater pipe 1321a. One end portion of the emergency cooling feedwater pipe 1321a may be communicably connected to a bottom surface of the emergency cooling water storage section 1314, and the other end portion of the emergency cooling feedwater pipe 1321a may be communicably connected to an upper end portion of the heat exchanger 1311.

The emergency cooling water may be discharged from the heat exchanger 1311 to an outside of the containment 12 by an emergency cooling water discharge pipe 1321b. One end portion of the emergency cooling water discharge pipe 1321b may be communicably connected to a lower end portion of the heat exchanger 1311, and the other end portion of the emergency cooling water discharge pipe 1321b may be communicably connected to an outside of the containment 12.

Here, the first flow path of the heat exchanger 1311 may be shared when the emergency cooling water and the external atmosphere of the containment 12 are selectively supplied to the heat exchanger 1311. In this case, the emergency cooling water may move from an upper end portion of the heat exchanger 1311 to a lower end portion of the heat exchanger 1311 along the first flow path, and the external atmosphere of the accumulator 12 may move from a lower end portion of the heat exchanger 1311 to an upper end portion of the heat exchanger 1311 along the first flow path.

The circulation fan 1313 may be provided at an outlet of the heat exchange casing 1312 to be driven by receiving the power of the Stirling engine 1370 or driven by receiving electric energy generated using the power of the Stirling engine 1370.

The circulation fan 1313 illustrated in FIGS. 13A and 13B exhibits a shape in which it is driven by receiving electric energy generated using the power of the Stirling engine 1370.

The Stirling engine 1370 may be provided on the second external atmosphere connection pipe 1332 to receive the heat of the external atmosphere of the heated containment 12 flowing along the second external atmosphere connection pipe 1332 or the heat of steam of the evaporated emergency cooling water to generate power.

As the power generated by the Stirling engine 1370 according to the thirteenth embodiment and electricity obtained by power generation may be used to drive the circulation fan 1313 provided at an outlet of the heat exchange casing 1312, circulation power may be provided to the external atmosphere (circulating fluid) of the containment 12 circulating an outside of the heat exchanger 1311, the Stirling engine 1370, the heat exchange casing 1312 and the containment 12 at an outside of the containment 12 with no external help.

The power of the Stirling engine 1370 may be generated by a generator 1380 and converted into electrical energy and then charged to a charger 1390, and the charged electrical energy can be used as a power source at the start of the Stirling engine 1370.

In addition, the charged electrical energy may be used as a power source for the switching of a valve for the operation of the passive containment cooling system 1310 or monitoring of the passive containment cooling system 1310.

Considering a movement path of emergency cooling water in an early stage of an accident, an isolation valve 1322 provided on the emergency cooling feedwater pipe 1321 is opened, and the emergency cooling water is introduced into an inlet of a first flow path formed at an upper end portion of the heat exchanger 1311 from the emergency cooling water storage section 1314 in an early stage of the accident. Subsequently, the emergency cooling water introduced into the first flow path of the heat exchanger 1311 receives heat from the internal atmosphere of the containment 12 introduced into a second flow path of the heat exchanger 1311 and moves downward along the first flow path, and is discharged to an outside of the containment 12 through the emergency cooling water discharge pipe 1321b. The flow path of the emergency cooling water may be switched by the isolation valve 1322 of the emergency cooling feedwater pipe 1321a.

Considering a movement path of the external air of the containment 12 in a later stage of an accident in which an amount of heat to be controlled after the occurrence of the accident is reduced, when a water level sensor 1314b provided in the emergency cooling water storage section 1314 senses that an amount of emergency cooling water is insufficient, the isolation valve 1333 provided in the first external atmosphere connection pipe 1331 is opened, and the external atmosphere of the containment 12 is introduced into an inlet of the first flow path formed at a lower end portion of the heat exchanger 1311 along the first external atmosphere connection pipe 1331. Subsequently, the external atmosphere of the containment 12 introduced into the first flow path of the heat exchanger 1311 may rise along the first flow path by receiving heat from the internal atmosphere of the containment 12 introduced into the second flow path of the heat exchanger 1311, and pass through the first heat exchange unit 1720 of the Stirling engine 1370 along the second external atmosphere connection pipe 1332, and then be transferred to an inside of the heat exchange casing 1312.

Considering a movement path of the internal atmosphere of the containment 12, the internal atmosphere of the containment 12 is guided through an inlet guide portion formed at an upper end portion of the heat exchanger, and introduced through an inlet of the second flow path of the heat exchanger 1311, and cooled and condensed by emergency cooling water introduced into the first flow path of the heat exchanger 1311 or the external atmosphere of the containment 12. Subsequently, the condensed cooling water is temporarily stored in the first cooling water storage 1341 through the cooling water return pipe 1324, and then securely injected into the reactor coolant system 11 through a cooling water injection pipe 1342 when a pressure within the reactor coolant system 11 and the containment 12 reaches a pseudo-equilibrium state. In addition, non-condensable gas cooled down in the second flow path of the heat exchanger 1311 may be discharged into an inside of the containment 12 through a separate air discharge pipe.

Accordingly, according to the mixed-type heat exchanger of the thirteenth embodiment, after the heat exchanger is operated by the water-cooling type having excellent cooling performance in an early stage of an accident with a large thermal load, when the lack of the emergency cooling water is sensed in a later stage of the accident in which a thermal load decreases as time elapses, the heat exchanger 1311 may be operated by the air-cooling type, and thus the emergency cooling water may not be necessarily replenished again, a size of the heat exchanger 1311 may be reduced, and a function thereof may be maintained semi-permanently, thereby having an advantage in terms of safety. In case of the air-cooling type heat exchanger 1311, there is a disadvantage of increasing a size of the heat exchanger due to a low heat transfer coefficient of the air, but the power or electricity of the Stirling engine 1370 may be used for the circulation of external air, thereby greatly reducing a size of the heat exchanger 1311.

Fourteenth Embodiment

Figure 14:
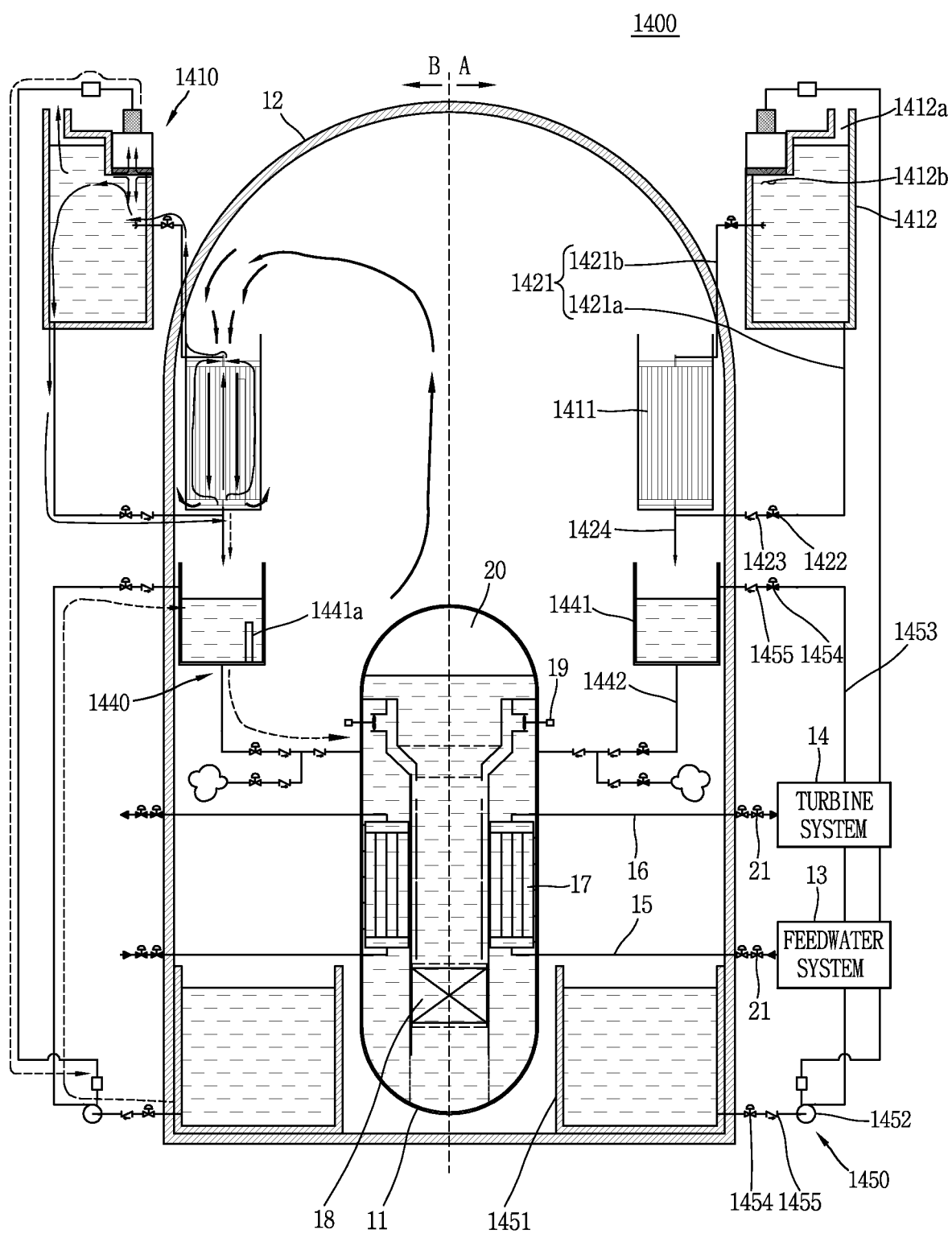
FIG. 14 is a conceptual view illustrating a passive residual heat removal system to which a Stirling engine associated with a fourteenth embodiment of the present disclosure is applied, and a nuclear power plant having the same.

FIG. 14 is a conceptual view illustrating a passive safety system to which a Stirling engine 1470 according to a fourteenth embodiment of the present disclosure is applied, and a nuclear power plant having the same.

The passive safety system illustrated in FIG. 14 may further include a second cooling water storage section 1451, a safety injection water makeup pump 1450 and a coolant makeup pipe 1453 for replenishing the cooling water of a passive safety injection system. The configuration of the passive containment 12 cooling system 1410 illustrated in FIG. 14 is the same as or similar to that of the embodiment illustrated in FIG. 8, and thus the description thereof will be omitted for clarity of explanation.

However, the circulation fan illustrated in FIG. 8 may be omitted in the passive containment 12 cooling system 1410 illustrated in FIG. 14.

The second cooling water storage section 1451 may be provided on an inner bottom surface of the containment 12 or on an outer bottom surface of the containment 12.

The second cooling water storage section 1451 illustrated in FIG. 14 exhibits a shape in which it is provided on an inner bottom surface of the containment 12.

The second cooling water storage section 1451 may store cooling water for replenishing safety injection water for securely injecting the cooling water into the reactor coolant system 11 when a loss of coolant accident occurs therein.

The cooling water stored in the second cooling water storage section 1451 may be supplied to the first cooling water storage section 1441 by the cooling water supplement pipe 1453. One end portion of the cooling water makeup pipe 1453 is communicably connected to the second cooling water storage section 1451, and the other end portion of the cooling water makeup pipe 1453 is communicably connected to the first cooling water storage section 1441.

The safety injection water makeup pump 1450 may be provided on the cooling water makeup pipe 1453 to pressurize cooling water flowing along the cooling water makeup pipe 1453 so as to replenish the cooling water when the cooling water is insufficient in the first cooling water storage section 1441.

An isolation valve 1454 may be provided at an upper end portion of the cooling water makeup pipe 1453 to adjust a makeup amount of the cooling water. Furthermore, a check valve 1455 may be provided at an upper end portion of the cooling water makeup pipe 1453 to prevent the cooling water from flowing back from the first cooling water storage section 1441 to the second cooling water storage section 1451.

The safety injection water makeup pump 1450 may be driven by the power of the Stirling engine 1470 and electricity obtained through the generation of engine power. At this time, the power of the Stirling engine 1470 may be converted into electrical energy in the generator 1480 and then charged to the charger 1490, and in this case, it may be possible to supply stable power to the safety injection water makeup pump 1450.

Accordingly, according to the passive safety injection system according to the fourteenth embodiment, safety injection by gravity may be facilitated from an inside of the containment when a pressure of the reactor coolant system and the containment reaches a pseudo-equilibrium state in the event of an accident, and a nuclear power plant having a configuration with difficulty in replenishing a long-term safety injection water source may use the power or electricity of the Stirling engine to replenish the cooling water of the cooling water storage section, thereby semi-permanently maintaining the performance of the safety injection system.

For example, if a passive safety injection system 1440 operated by gravity to inject safety injection water into the reactor coolant system 11 in the event of a loss of coolant accident is applied to a nuclear power plant 1400, then a large amount of water should be stored in an upper portion of the containment 12 during a normal operation of the nuclear power plant. However, in order to store a large amount of water in an upper portion of the containment 12, a large space is required, and a large load acts on a structure due to the stored water, and thus in reality it is very difficult to provide a water tank that can be used for a long period of time.

Accordingly, when electricity produced by the Stirling engine 1470 is used in a facility for replenishing the cooling water of the passive safety injection system 1440, the passive safety system may be more easily implemented, thereby improving safety and economic efficiency. As described above, power or electrical energy generated by the Stirling engine 1470 may not be necessarily used in the same safety system, but may be used in other safety systems.

Fifteenth Embodiment

Figure 15:
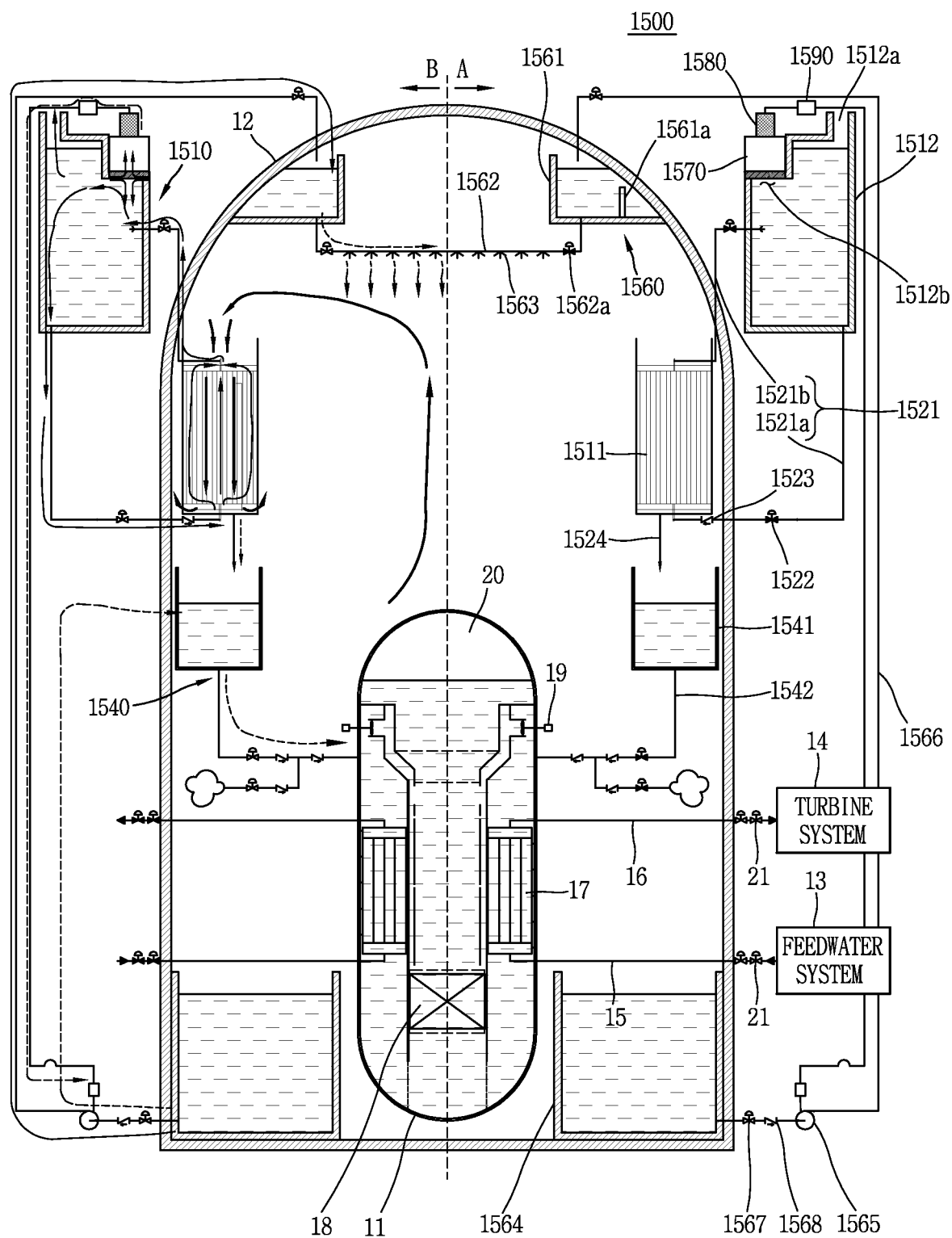
FIG. 15 is a conceptual view illustrating a passive residual heat removal system to which a Stirling engine associated with a fifteenth embodiment of the present disclosure is applied, and a nuclear power plant having the same.

FIG. 15 is a conceptual view illustrating a passive safety system to which a Stirling engine 1570 according to a fifteenth embodiment of the present disclosure is applied, and a nuclear power plant having the same.

The passive safety system illustrated in FIG. 15 may further include a second cooling water storage section 1564 and a passive containment spray system 1560. The configuration of a passive containment cooling system 1510 illustrated in FIG. 15 is the same as or similar to that of the embodiment illustrated in FIG. 8, and thus the description thereof will be omitted for clarity of explanation.

However, the circulation fan illustrated in FIG. 8 may be omitted in the passive containment cooling system 1510 illustrated in FIG. 15.

The passive containment spray system 1560 is a system for spraying cooling water by gravity when an internal pressure of the containment 12 rises in the event of an accident to reduce the internal pressure of the containment 12, and may include spray storage section 1561, a spray distribution pipe 1562, a spray makeup pump 1565, and a spray makeup pipe 1566.

A plurality of spray storage sections 1561 are provided at an inner upper end portion of the containment 12 to store cooling water to be used for the spray of the passive containment spray system 1560 therein.

At least a part of the spray distribution pipe 1562 is communicably connected to a bottom surface of the spray storage section 1561 to receive cooling water from the spray storage section 1561.

A plurality of isolation valves 1567 are provided on the spray distribution pipe 1562 to switch a flow of cooling water flowing along the spray pipe.

A plurality of spray nozzles are formed on the spray pipe 1562 to be spaced apart from each other, and cooling water is sprayed into an inside of the containment 12 through the spray nozzles.

The second cooling water storage section 1564 illustrated in FIG. 15 is provided on an inner bottom surface of the containment 12 to store cooling water to be used for spray replenishment of the passive containment spray system 1560.

The cooling water stored in the second cooling water storage section 1564 may be supplied to the spray storage section 1561 by the spray makeup pipe 1566. One end portion of the spray makeup pipe 1566 is communicably connected to the second cooling water storage section 1564, and the other end portion of the spray makeup pipe 1566 is communicably connected to the spray storage section 1561.

The spray makeup pump 1565 may be provided on the spray makeup pipe 1566 to pressurize cooling water flowing along the spray makeup pipe 1566 so as to replenish the cooling water when the cooling water of the water sprinkler 1561 is insufficient.

Isolation valves 1567 are provided at an upper and a lower end portion of the spray makeup pipe 1566 so as to switch the flow path of the spray makeup pipe 1566. Furthermore, a check valve 1568 may be provided between an isolation valve 1567 provided at a lower end portion of the spray makeup pipe 1566 and the spray makeup pump 1565 to prevent cooling water from flowing backward from the spray makeup pump 1565 to the second cooling water storage 1564.

The spray makeup pump 1565 may be driven by the power of the Stirling engine 1570 and electricity obtained through the generation of engine power. At this time, the power of the Stirling engine 1570 may be converted into electric energy in the power generation section 1580 and then charged to the charger 1590, and in this case, stable power may be supplied to the spray makeup pump 1565.

Considering a movement path of spray water in the event of an accident, the isolation valve 1567 of the passive containment spray system 1560 is opened, and cooling water stored in the spray storage section 1561 is moved along the distribution pipe 1562, and sprayed into the containment 12 through the spray nozzles. As a result, the internal atmosphere of the containment 12 is cooled and condensed to decrease an internal pressure of the containment 12.

The cooling water of the spray storage portion 1561 gradually decreases as time elapses. At this time, an amount of cooling water of the spray storage section 1561 is sensed through a water level sensor 1561*a* provided in the spray storage section 1561. When the cooling water of the spray storage section 1561 reaches a predetermined position, the isolation valve 1567 provided in the spray makeup pipe 1566 is opened. Subsequently, the spray makeup pump 1565 is operated to transfer cooling water for spray makeup stored in the second cooling water storage section 1564 along the spray makeup pipe 1566 to replenish the spray storage portion 1561.

When a gravity-actuated passive containment spray system is applied to the passive containment spray system to reduce an internal pressure of the containment in the event of an accident, a very large amount of water should be stored in an upper portion of the containment during a normal operation of the nuclear power plant. However, it takes a lot of space to store a large amount of water in the upper portion of the containment, and a large load acts on the structure due to the stored water, and thus in reality it is very difficult to provide a water tank that can be used for a long period of time.

Accordingly, as the power and electricity of the Stirling engine 1570 according to the fifteenth embodiment is used to replenish the spray water of the passive containment spray system 1560, a large amount of cooling water may be supplied to the spray storage section 1561 without the help of an external power source for a long period of time. As a result, it may be possible not only to take advantage of a spray method having a higher efficiency of decompression and radioactive material removal than that of the heat exchanger, but also to solve a problem of securing a large amount of cooling water for passive spray and a structural load problem of the spray storage section 1561, and the like, at the same time.

Sixteenth Embodiment

Figure 16:
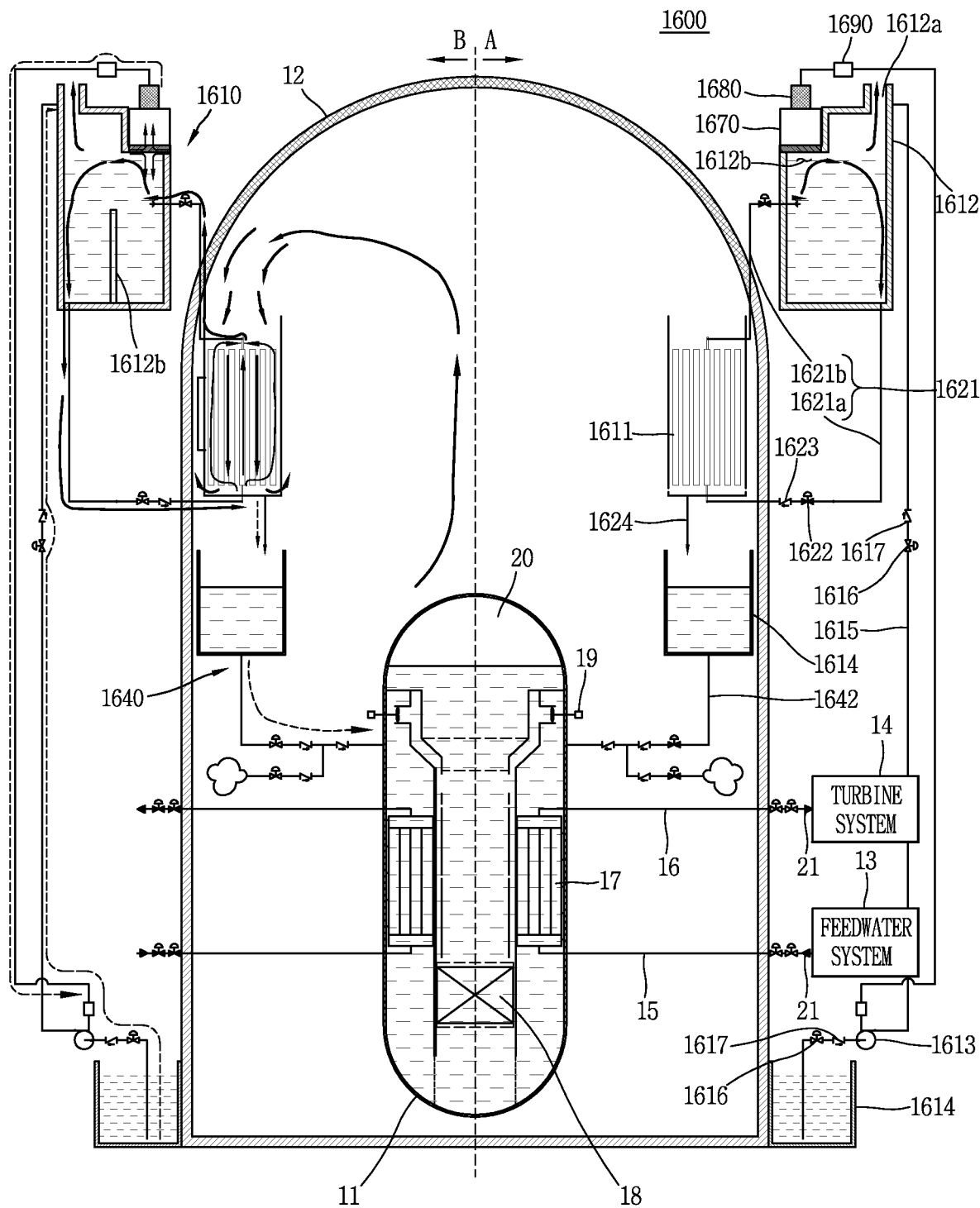
FIG. 16 is a conceptual view illustrating a passive residual heat removal system to which a Stirling engine associated with a sixteenth embodiment of the present disclosure is applied, and a nuclear power plant having the same.

FIG. 16 is a conceptual diagram of a passive containment cooling system 1610 to which a Stirling engine 1670 according to a sixteenth embodiment of the present disclosure is applied, and a nuclear power plant having the same.

FIG. 16 further includes a second cooling water storage section 1614, an emergency cooling water makeup pipe 1615, and an emergency cooling water makeup pump 1613. Other configurations are the same as or similar to those of the passive containment cooling system 910 illustrated in FIG. 9, and thus the description thereof will be omitted for clarity of explanation.

The second cooling water storage section 1614 is provided on an outer bottom surface of the containment to store cooling water used for replenishing emergency cooling water therein when the emergency cooling water stored in the emergency cooling water storage section 1612 is insufficient.

One end portion of the emergency cooling water makeup pipe 1615 is communicably connected to an inside of the second cooling water storage section 1614, and the other end portion thereof is communicably connected to an upper end portion of the emergency cooling water storage section 1612.

The emergency cooling water makeup pump 1613 may be provided on the emergency cooling water makeup pipe 1615 to pressurize cooling water flowing along the emergency cooling water makeup pipe 1615 to replenish the cooling water when the cooling water of the emergency cooling water storage section 1612 is insufficient.

Isolation valves 1616 are provided at an intermediate portion and a lower end portion of the emergency cooling water makeup pipe 1615, respectively, to switch the makeup flow path of the emergency cooling water. A check valve 1617 is provided between the isolation valve 1616 provided at a lower end portion of the emergency cooling water makeup pipe 1615 and the emergency cooling water makeup pump 1613 to prevent cooling water from flowing backward from the emergency cooling water spray pump 1613 to the second cooling water storage section 1614.

The emergency cooling water makeup pump 1613 may be driven by the power of Stirling engine 1670 and electricity obtained through the generation of engine power. At this time, the power of the Stirling engine 1670 may be converted into electric energy in the generator 1680 and then charged to the charger 1690, and in this case, stable power may be supplied to the emergency cooling water makeup pump 1613.

The emergency cooling water stored in the emergency cooling water storage section 1612 gradually decreases as time elapses in the event of an accident. At this time, an amount of cooling water of the emergency cooling water storage section 1612 is sensed through a water level sensor 1612b provided in the emergency cooling water storage section 1612. When the cooling water of the emergency cooling water storage section 1612 reaches a predetermined position, the isolation valve 1616 provided in the emergency cooling water supplement pipe 1615 is opened. Subsequently, the emergency cooling water makeup pump 1613 is operated to transfer cooling water for replenishing emergency cooling water stored in the second cooling water storage section 1614 along the emergency cooling water makeup pipe 1615 to replenish the emergency cooling water storage section 1612.

Accordingly, according to the passive containment cooling system 1610 according to the sixteenth embodiment, the power and electric power of the Stirling engine 1670 may be used to replenish the emergency cooling water of the passive containment cooling system 1610, it may be possible to supply a large amount of cooling water to the emergency cooling water storage section 1612 for a long period of time without the help of an external power source as long as the cooling water of the portion 1614 is secured. As a result, it may be possible to maintain the performance of the passive residual heat removal system for a long period of time.

The configurations and methods according to the above-described embodiments will not limited to the foregoing passive safety system and a nuclear power plant including the same, and all or part of each embodiment may be selectively combined and configured to make various modifications thereto.

What is claimed is:
1. A nuclear power plant, comprising:
a nuclear safety system configured to remove at least one of heat in a reactor coolant system and heat transferred from the reactor coolant system to a containment to an outside of the containment when an accident occurs in the nuclear power plant;
a power generator provided with a heat exchange unit to receive heat removed to an outside of the containment, and provided with a cylinder to generate power by heat received through the heat exchange unit; and
a heat transfer portion configured to provide a flow path of heat transfer fluid between the reactor coolant system and the power generator or between the containment and the power generator to transfer the heat removed to an outside of the containment to the power generator,
wherein the power generator comprises:
a high-temperature section and a low-temperature section filled therein with working gases, respectively, and formed as separate independent spaces in two cylinders, respectively, or formed as spaces partitioned from each other within one cylinder;

a working flow path connecting the high-temperature section and the low-temperature section to allow the working gases filled in the high-temperature section and the low-temperature section to communicate with each other; and a regenerative heat exchanger provided on the working flow path to store the heat of the working gas when the working gas moves from the high-temperature section to the low-temperature section, and transfer the stored heat to the working gas when the working gas returns from the low-temperature section to the high-temperature section.

2. The nuclear power plant of claim 1, wherein the nuclear safety system comprises a passive safety system configured to remove heat in the reactor coolant system or heat transferred from the reactor coolant system to the containment by fluid circulation, and the passive safety system comprises at least one of an air-cooling and a water-cooling heat exchanger.

3. The nuclear power plant of claim 2, wherein the heat exchanger is a plate type or shell-and-tube type heat exchanger.

4. The nuclear power plant of claim 2, wherein the fluid is at least one of air, cooling water, steam, and a mixed fluid obtained by mixing air with steam or steam with cooling water.

5. The nuclear power plant of claim 1, wherein the power generator comprises:
a plurality of pistons movably provided within the two cylinders, respectively, or movably provided within the one cylinder in an independent manner from each other;
a rotating portion configured to receive the power of the piston to rotate; and
a connection member connecting the piston and the rotating portion to transfer the power of the piston to the rotating portion so as to generate mechanical kinetic energy due to a rotational movement.

6. The nuclear power plant of claim 5, wherein the power generator further comprises:
a generator connected to the rotating portion to convert the mechanical kinetic energy into electric energy.

7. The nuclear power plant of claim 6, wherein the power generator further comprises:
a charger configured to charge the electric energy converted by the generator.

8. The nuclear power plant of claim 7, wherein the power generator is initially driven by electric energy stored in the charger.

9. The nuclear power plant of claim 1, wherein the power generator is provided with a Stirling engine.

10. The nuclear power plant of claim 1, wherein the nuclear safety system comprises a passive residual heat removal system configured to operate according to an accident occurrence related signal to remove heat in the reactor coolant system by fluid circulation, and
the passive residual heat removal system comprises:
a heat exchanger disposed at an outside of the containment to receive steam from a steam generator forming a boundary between a primary system and a secondary system so as to cool and condense the steam, and transfer the condensed cooling water to the steam generator;
a heat exchange casing disposed at an outside of the containment to accommodate the heat exchanger therein so as to guide the external atmosphere of the containment to pass through the heat exchanger; and a circulation fan provided within the heat exchange casing to provide forced flow of the external atmosphere so as to introduce the external atmosphere of the containment into the heat exchange casing, and
the power generator is disposed at an inside or outside of the heat exchange casing and provided with a power transmission portion to directly drive the circulation fan or provided with a generator to generate the electric power to drive the circulation fan by the electric energy.

11. The nuclear power plant of claim 10, wherein the passive residual heat removal system comprises a steam pipe connecting the steam generator and the heat exchanger to transfer steam generated from the steam generator to the heat exchanger, and
the steam pipe passes through a heat exchange unit of the power generator to transfer the heat of steam from the steam generator to the power generator, and the power generator receives the heat of steam flowing through the steam pipe to generate power.

12. The nuclear power plant of claim 10, wherein the power generator is provided at an inlet side of the heat exchanger, and
the circulation fan is disposed between the power generator and the heat exchanger.

13. The nuclear power plant of claim 10, wherein the passive residual heat removal system comprises a feedwater line connecting the heat exchanger and the steam generator to transfer cooling water condensed in the heat exchanger to the steam generator, and
the feedwater line passes through a heat exchange unit of the power generator to transfer the heat of the condensed cooling water from the heat exchanger to the power generator, and the power generator receives heat of cooling water flowing through the feedwater line to generate power.

14. The nuclear power plant of claim 1, wherein the nuclear safety system comprises a passive residual heat removal system configured to operate according to an accident occurrence related signal to remove heat in the reactor coolant system, and
the passive residual heat removal system comprises:
an emergency cooling water storage section disposed at an outside of the containment;
a heat exchanger provided within the emergency cooling water storage section to receive steam from a steam generator forming a boundary between a primary system and a secondary system to cool and condense the steam by emergency cooling water stored in the emergency cooling water storage section, and transfer the condensed cooling water to the steam generator; and
a circulation pump provided on a feedwater line to transfer the cooling water condensed in the heat exchanger to the steam generator, and provide forced flow of the cooling water, and
the power generator is disposed at an outside or inside of the emergency cooling water storage section, and provided with a power generator to generate the electric power so as to drive the circulation pump by the electric energy.

15. The nuclear power plant of claim 14, wherein the heat transfer portion comprises a steam pipe connecting the steam generator, the heat exchange unit of the power generator, and
the heat exchanger to transfer steam generated in the steam generator to the heat exchanger through the power generator, and the power generator receives the heat of steam through the steam pipe to generate power.

16. The nuclear power plant of claim 14, wherein the emergency cooling water storage section is provided with an emergency cooling water heat exchange unit for connecting with the heat exchange unit of the power generator in a heat exchangeable manner to transfer the heat of steam generated in the emergency cooling water storage section to the power generator.

17. The nuclear power plant of claim 10, wherein the heat transfer portion comprises:
a first connection pipe, one end portion of which is connected to the steam generator, and the other end portion of which is extended to an inside of the containment to introduce steam from the steam generator thereinto; and
a second connection pipe communicated with an inside of the containment, one end portion of which is disposed adjacent to the first connection pipe to introduce the internal atmosphere of the containment along with steam discharged from the first connection pipe, and the other end portion of which is connected to the power generator to transfer a mixed fluid obtained by mixing the steam with the internal atmosphere of the containment to the power generator, and
the passive residual heat removal system is provided with a circulation induction unit configured to induce the internal atmosphere circulation of the containment, and
the circulation induction unit comprises:
a jet nozzle formed at the other end portion of the first connection pipe to jet the steam into the second connection pipe so as to introduce the internal atmosphere of the containment into the second connection pipe by a jet speed of the steam; and
an inlet guide formed at one end portion of the second connection pipe to gradually increase an inflow cross-sectional area of the internal atmosphere of the containment toward an inside of the containment so as to guide the inflow of the internal atmosphere of the containment.

18. The nuclear power plant of claim 1, wherein the nuclear safety system comprises a passive containment cooling system configured to operate according to an accident occurrence related signal to remove heat transferred from the reactor coolant system to an inside of the containment by fluid circulation to an outside of the containment, and
the passive containment cooling system comprises:
a heat exchanger disposed at an inside or outside of the containment to be positioned higher than the reactor so as to condense steam discharged from the steam line to an inside of the containment and cool the internal atmosphere of the containment when a loss of coolant accident or a steam line break accident occurs in the reactor; and
an emergency cooling water storage section disposed at an outside of the containment to be positioned higher than the heat exchanger so as to cool and condense the internal atmosphere of the containment transferred from the heat exchanger by emergency cooling water stored therein, and supply the emergency cooling water to the heat exchanger, and
the emergency cooling water storage section is provided with an emergency cooling water heat exchange unit on which the power generator is mounted to exchange heat at an upper end portion thereof, and
the power generator receives the heat of the emergency cooling water or the heat of steam evaporated in the emergency cooling water through the emergency cooling water heat exchange unit to generate power.

19. The nuclear power plant of claim 18, wherein the passive containment cooling system further comprises:
a circulation fan provided at an inlet header formed at an upper end portion of the heat exchanger to provide forced flow of the internal atmosphere so as to introduce the internal atmosphere of the containment into the heat exchanger, and
the power generator is provided with a power transmission portion to directly drive the circulation fan or provided with a generator to generate the electric power so as to drive the circulation fan by the electric energy.

20. The nuclear power plant of claim 18, wherein the passive containment cooling system comprises:
a supply pipe connecting the emergency cooling water storage section and the heat exchanger to transfer the emergency cooling water to the heat exchanger; and
a circulation pump provided on the supply pipe to provide forced flow of the emergency cooling water, and
the power generator is provided with a power transmission portion to directly drive the circulation pump or provided with a generator to generate the electric power so as to drive the circulation pump by the electric energy.

21. The nuclear power plant of claim 18, wherein the passive containment cooling system further comprises:
a first containment connection pipe, one end portion of which is communicated with an inside of the containment and the other end portion of which is connected to a heat exchanger to transfer the internal atmosphere of the containment to the heat exchanger disposed at an outside of the containment;
a second containment connection pipe, one end portion of which is connected to the heat exchanger and the other end portion of which is communicated with an inside of the containment to transfer non-condensable gas or condensed cooling water generated in the heat exchanger to an inside of the containment; and
a circulation fan provided at one end portion of the first containment connection pipe to provide forced flow of the internal atmosphere of the containment to the first containment connection pipe, and
the power generator is provided with a power transmission portion to directly drive the circulation fan or provided with a generator to generate the electric power so as to drive the circulation fan by the electric energy.

22. The nuclear power plant of claim 1, wherein the nuclear safety system comprises a passive containment cooling system configured to operate according to an accident occurrence related signal to remove heat transferred from the reactor coolant system by fluid circulation to an outside of the containment, and
the passive containment cooling system comprises:
a heat exchanger disposed at an outside of the containment to be positioned higher than the reactor so as to condense steam discharged from the steam line to an inside of the containment and cool the internal atmosphere of the containment when a loss of coolant accident or a steam line break accident occurs in the reactor;
a heat exchange casing disposed at an outside of the containment to accommodate the heat exchanger therein to guide the external atmosphere of the containment to pass through the heat exchanger;

a first containment connection pipe, one end portion of which is communicated with an inside of the containment and the other end portion of which is connected to the heat exchanger to transfer the internal atmosphere of the containment to the heat exchanger; and a circulation fan provided at one end portion of the first containment connection pipe to provide forced flow of the internal atmosphere of the containment to an inside of the first containment connection pipe, and the first containment connecting pipe passes through a heat exchange unit of the power generator to transfer the heat of steam transferred to an inside of the containment to the power generator disposed at an outside of the containment, and the power generator is disposed at an inside of the heat exchange casing and provided with a power transmission portion to directly drive the circulation fan or provided with a generator to generate the electric power to drive the circulation fan by the electric energy.

23. A nuclear power plant, comprising:

a nuclear safety system configured to remove at least one of heat in a reactor coolant system and heat transferred from the reactor coolant system to a containment to an outside of the containment when an accident occurs in the nuclear power plant;

a power generator provided with a heat exchange unit to receive heat removed to an outside of the containment, and provided with a cylinder to generate power by heat received through the heat exchange unit; and a heat transfer portion configured to provide a flow path of heat transfer fluid between the reactor coolant system and the power generator or between the containment and the power generator to transfer the heat removed to an outside of the containment to the power generator wherein the nuclear safety system comprises a passive containment cooling system configured to operate according to an accident occurrence related signal to remove heat transferred from the reactor coolant system by fluid circulation to an outside of the containment, and the passive containment cooling system comprises:

a heat exchanger disposed at an inside of the containment to be positioned higher than the reactor so as to condense steam discharged from the steam line to an inside of the containment and cool the internal atmosphere of the containment when a loss of coolant accident or a steam line break accident occurs in the reactor;

a heat exchange casing disposed at an outside of the containment to guide the external atmosphere of the containment to pass through an inside thereof;

a first external atmosphere connection pipe, one end portion of which is communicated with an outside of the containment and the other end portion of which is connected to the heat exchanger to supply the external atmosphere of the containment to the heat exchanger; and a second external atmosphere connection pipe connecting the heat exchanger and the heat exchange casing to discharge steam generated in the heat exchanger to the heat exchange casing; and a circulation fan provided on the first external atmosphere connection pipe or at an inside of the heat exchange casing to provide forced flow of the external atmosphere of the containment to an inside of the heat exchanger or the heat exchange casing, and the second external atmosphere connection pipe passes through a heat exchange unit of the power generator to transfer the heat of steam transferred from the heat exchanger to the heat exchange casing to the power generator, and the power generator is disposed at an inside or outside of the heat exchange casing and provided with a power transmission portion to directly drive the circulation fan or provided with a generator to generate the electric power to drive the circulation fan by the electric energy.

24. The nuclear power plant of claim 23, wherein the passive containment cooling system further comprises an emergency cooling water storage section disposed at an outside of the containment to be positioned higher than the heat exchanger so as to supply emergency cooling water stored therein to the heat exchanger, and the heat exchanger is cooled in a water-cooling manner, and then cooled in an air-cooling manner when an accident occurs.

25. The nuclear power plant of claim 18, wherein the nuclear safety system comprises a passive safety injection system configured to inject safety injection water by gravity when a pressure within the reactor coolant system and the containment reaches a pseudo-equilibrium state after an accident, and the passive safety injection system comprises:

a first cooling water storage section disposed at an inside of the containment;

a second cooling water storage section provided at an inside of the containment to be positioned lower than the first cooling water storage section so as to store cooling water therein;

a cooling water connection pipe connecting the heat exchanger and the first cooling water storage section to transfer cooling water condensed in the heat exchanger to the first cooling water storage section;

a cooling water injection pipe connecting the first cooling water storage section and the reactor to inject safety injection water stored in the first cooling water storage section into an inside of the reactor;

a cooling water makeup pipe connecting the first and second cooling water storage sections to replenish cooling water stored in the second cooling water storage section to the first cooling water storage section; and a safety injection water makeup pump provided on the cooling water makeup pipe to forcibly circulate cooling water for the makeup of safety injection water, and the power generator is provided with a generator to generate the electric power to drive the safety injection water makeup pump by the electric energy.

26. The nuclear power plant of claim 18, wherein the nuclear safety system comprises a passive containment spray system provided with a distribution pipe formed with a plurality of spray nozzles spaced apart from each other to spray water into the internal atmosphere of the containment by gravity from the spray nozzles so as to reduce an internal pressure of the containment when an accident increasing internal pressure of the containment occurs, and the passive containment spray system comprises:

a second cooling water storage section provided on a bottom surface of the containment;

a spray storage portion disposed at an upper portion of the containment;

a spray makeup pipe connecting the second cooling water storage section and the spray storage portion to replenish cooling water stored in the second cooling water storage section to the spray storage portion; and a spray makeup pump provided on the spray makeup pipe to provide forced flow of spray makeup cooling water, and the power generator is provided with a generator to generate the electric power so as to drive the spray makeup pump by the electric energy.

27. The nuclear power plant of claim 14, wherein the passive safety system comprises: a second cooling water storage section provided at an outside of a bottom surface of the containment;

an emergency cooling water storage section disposed at an outside of the containment to be positioned higher than the heat exchanger;

an emergency cooling water makeup pipe connecting the second cooling water storage section and the emergency cooling water storage section to replenish cooling water stored in the second cooling water storage section to the emergency cooling water storage section; and an emergency cooling water makeup pump provided on the emergency cooling water makeup pipe to provide forced flow of cooling water for emergency cooling water makeup, and the power generator is provided with a power generator to generate the electric power so as to drive the emergency cooling water makeup pump by the electric energy.

28. The nuclear power plant of claim 14, further comprising:

a charger configured to charge electricity generated from the generator.

29. The nuclear power plant of claim 7, wherein electric energy stored in the charger is supplied to an emergency power system or an emergency charger to replenish the power of the emergency power system or the emergency charger.

30. The nuclear power plant of claim 29, wherein the emergency power system or the emergency charger is used as a power source for operating the nuclear safety system or switching a valve for the operation of the nuclear safety system or monitoring the nuclear safety system.

* * * * *